US008856733B2

(12) United States Patent
Lovisa et al.

(10) Patent No.: US 8,856,733 B2
(45) Date of Patent: Oct. 7, 2014

(54) CODE GENERATION TECHNIQUES

(75) Inventors: Noel William Lovisa, Townsville (AU); Eric Phillip Lawrey, Townsville (AU)

(73) Assignee: Code Valley Corp Pty Ltd, Mt. St. John, Queensland (AU)

( * ) Notice: Subject to any disclaimer, the term of this patent is extended or adjusted under 35 U.S.C. 154(b) by 1805 days.

(21) Appl. No.: 11/569,356

(22) PCT Filed: May 20, 2005

(86) PCT No.: PCT/AU2005/000729
§ 371 (c)(1),
(2), (4) Date: Apr. 22, 2008

(87) PCT Pub. No.: WO2005/114387
PCT Pub. Date: Dec. 1, 2005

(65) Prior Publication Data
US 2008/0201690 A1   Aug. 21, 2008

(30) Foreign Application Priority Data

May 20, 2004   (AU) ................................ 2004902675

(51) Int. Cl.
*G06F 9/44*   (2006.01)
(52) U.S. Cl.
CPC ... *G06F 8/36* (2013.01); *G06F 8/34* (2013.01)
USPC ........................................................ 717/107
(58) Field of Classification Search
USPC ........................................................ 717/107
See application file for complete search history.

(56) References Cited

U.S. PATENT DOCUMENTS 5,517,584 A * 5/1996 Jennings .................... 382/276
6,189,138 B1 2/2001 Fowlow et al.
6,226,692 B1 5/2001 Miloushev et al.
(Continued)

FOREIGN PATENT DOCUMENTS

EP  0817032 A2  1/1998
EP  1246054 A1  10/2002
(Continued)

OTHER PUBLICATIONS

H.R. Frost and M.R. Cutkosky: "Design for manufacturability via agent interaction" Proceedings of the 1996 ASME Design Engineering Technical Conferences and Computers in Engineering Conference [Online] Aug. 1996, pp. 1-2.
(Continued)

*Primary Examiner* — Li B Zhen
*Assistant Examiner* — Bradford Wheaton
(74) *Attorney, Agent, or Firm* — Arent Fox LLP; J D Harriman

(57) ABSTRACT

A method of generating executable code for performing desired functionality. The method includes defining a component combination based on the desired functionality, the component combination being indicative of components to be implemented and connections between the components. The component combination is then used to cause components in the component combination to be implemented, with the components communicating using the connections and generating code fragments. At least two of the components communicate to determine a context, with one or more of the code fragments being at least partially based on the determined context. The generated code fragments are combined to thereby form the executable code which when executed by a suitable a processing system, causes the processing system to perform the desired functionality.

44 Claims, 23 Drawing Sheets

(56) References Cited

U.S. PATENT DOCUMENTS

| | | | |
|---|---|---|---|
| 6,256,771 B1 | 7/2001 | O'Neil et al. | |
| 6,401,114 B1 | 6/2002 | Jenkins | |
| 6,405,361 B1 * | 6/2002 | Broy et al. | 717/104 |
| 6,434,738 B1 * | 8/2002 | Arnow | 717/106 |
| 6,973,638 B1 * | 12/2005 | Gangopadhyay et al. | 717/104 |
| 7,139,728 B2 * | 11/2006 | Rigole | 705/7.31 |
| 7,206,846 B1 * | 4/2007 | Dini et al. | 709/228 |
| 2002/0047865 A1 | 4/2002 | Bozionek et al. | |
| 2002/0055956 A1 | 5/2002 | Krasnoiarov | |
| 2002/0059078 A1 * | 5/2002 | Valdes et al. | 705/1 |
| 2002/0060566 A1 | 5/2002 | Debbins et al. | |
| 2003/0158915 A1 * | 8/2003 | Gebhart | 709/219 |
| 2004/0268327 A1 * | 12/2004 | Burger | 717/140 |

FOREIGN PATENT DOCUMENTS

| | | |
|---|---|---|
| EP | WO2004042639 A1 | 5/2004 |
| WO | WO 98/24020 | 7/1998 |
| WO | WO 98/39698 | 12/1998 |
| WO | 9945464 | 9/1999 |
| WO | WO 01/08002 | 11/2001 |
| WO | WO02069086 A2 | 9/2002 |
| WO | WO 0175593 | 7/2003 |

OTHER PUBLICATIONS

Raje et al., "A Unified Approach for the Integration of Distributed Heterogeneous Software Components," Proceedings of the Monterey Workshop on Engineering Automation for Software Intensive System Integration, 109-119, 2001.

Nanditha et al., "An Architecture for the Uniframe Resource Discovery Service," Software Engineering and Middleware (Springer Berlin Heidelberg), 2596:20-35, 2002.

Hashimoto et al., "Flexible Multimedia System Architecture with Adaptive Qos Guarantee Functions," Parallel and Distributed Systems, 119-126, 2000.

Kebbal, D. and Bernard, G., "Component Search Service and Deployment of Distributed Applications," Distributed Objects and Applications, 2001. DOA '01. Proceedings. 3rd International Symposium on Sep. 17-20, 2001, Piscataway, NJ, USA, IEEE, Sep. 17, 2001 (pp. 125-134).

Kebbal et al., "Component Search Service and Deployment of Distributed Applications" Proceedings of IEEE 3rd International Symposium, pp. 125-134, Sep. 17, 2001.

Partial European search report dated Mar. 26, 2012 issued in corresponding European application 11175802.5.

* cited by examiner

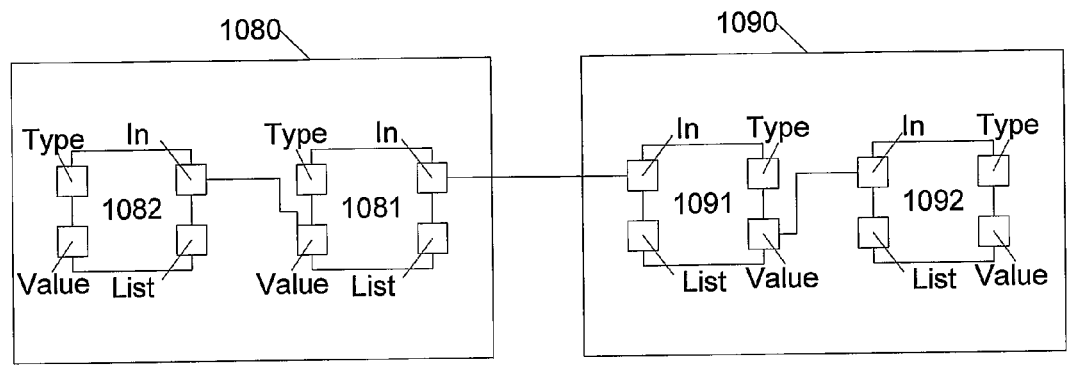
Fig. 9
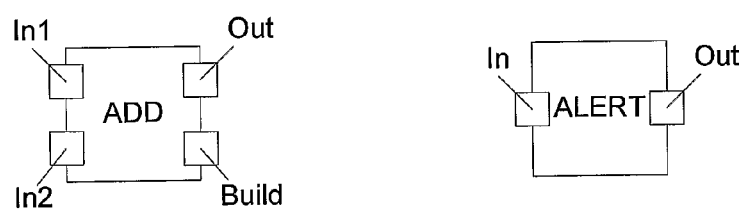
Fig. 10  Fig. 11A
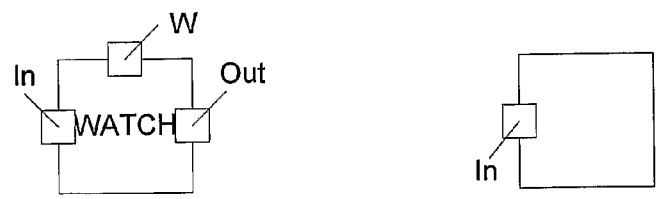
Fig. 11B  Fig. 13

CODE GENERATION TECHNIQUES

BACKGROUND OF THE INVENTION

The present invention relates to a method and apparatus for generating computer executable code, and in particular, to generating computer executable code using components, each of which corresponds to a respective service for manipulating data, such as the generation of a respective code fragment.

DESCRIPTION OF THE BACKGROUND ART

The reference to any prior art in this specification is not, and should not be taken as, an acknowledgment or any form of suggestion that the prior art forms part of the common general knowledge.

Current software development techniques suffer from a number of problems including for example:
  Bugs or mistakes—high levels of software defects;
  Software bloating—significantly increasing size of executable code in disproportion to its functionality;
  Complexity limits—growing requirements complexity threatens the ability to design such systems; and,
  Unpredictability—there is an inability to predict development costs, schedules, performance or resource usage
  Productivity—there have been no significant gains in developer productivity in the past decade In particular, these problems are symptomatic of current software generation techniques in which a skilled programmer is required, to a large extent, to create code from scratch, with only limited levels of code re-use through the use of generalised, and hence, unoptimised libraries. The emphasis is on producing highly portable and context independent code.

A number of attempts have been made to solve the problems, including:
  Development of 3rd, 4th and 5th Generation Languages, which seek to abstract the programmer away from machine code, and are responsible for some of the early successes in productivity. So successful was the early productivity increases that languages continue today as the main thrust in the quest for productivity improvement.
  Object Oriented Programming, a new type of abstraction encapsulating data with code used to process that data, is achieving acceptance but also fails to deliver any significant productivity improvements.
  Computer Aided Software Engineering (CASE), which seeks to assist in managing the complexity of large software development.
  Code Reuse, which is an effort to reuse previous intellectual endeavour.
  Formal Methods, which use mathematical proofs to verify correctness and to acutely address the large numbers of defects and bugs synonymous with software development.
  Decompilers that extract intellectual content from historical code.

Despite these initiatives however, little headway is being made in improving software production.

Co-pending application PCT/AU03/01474 describes a technique for performing data manipulations which allow executable code to be generated. In particular, this system utilises components to encapsulate data manipulation services. By combining the components, this allows sequences of data manipulations to be performed, thereby allowing computer executable code to be generated.

SUMMARY OF THE PRESENT INVENTION

In a first broad form the present invention provides a method of generating executable code for performing desired functionality, the method including:
  (a) defining a component combination based on the desired functionality the component combination being indicative of:
    (i) components to be implemented;
    (ii) connections between the components;
  (b) causing components in the component combination to be implemented, wherein at least some of the components communicate using the connections and generate code fragments, at least two of the components communicating to determine a context, and one or more of the code fragments being at least partially based on the determined context;
  (c) combining generated code fragments to thereby form the executable code; and,
  (d) providing the executable code to a processing system, such that execution of the executable code by the processing system causes the processing system to perform the desired functionality.

Typically the executable code is used to implement a component.

Typically the code fragments are fragments of executable code.

Typically the executable code is formed by concatenating the code fragments in a predetermined manner defined by at least one of:
  (a) the context;
  (b) the component combination;
  (c) agreements between the components; and,
  (d) one or more negotiation positions.

Typically the combination is performed by at least one of:
  (a) one or more of the components; and,
  (b) a processing system.

Typically the method includes causing the components to manipulate data portions provided in a data sequence, the data portions being fragments of executable code, and wherein the manipulations include:
  (a) Adding data portions into the sequence at a predetermined location;
  (b) Moving data portions from a first location to a second location within the sequence;
  (c) Removing data portions from the sequence; and,
  (d) Modifying data portions in the sequence.

Typically the method includes causing the components to negotiate to determine their respective contexts.

Typically the method is performed using a processing system including at least a memory, stack and registers, and the context includes at least one of the state of at least one of the registers, stack and memory.

Typically the context includes at least one of:
  (a) other components in the defined component combination;
  (b) agreements with other components in the defined component combination;
  (c) a result of negotiation with other components in the defined component combination and,
  (d) random factors.

Typically the method includes making the data manipulation context dependent by at least one of:
(a) dithering;
(b) meshing; and,
(c) obscuring.

Typically the method includes, for at least one component, generating one or more agents for communicating with one or more agents of other components.

Typically the agent communicates with the two or more other agents in a determined order.

Typically the order is defined by at least one of:
(a) the component combination; and,
(b) one or more negotiation positions.

Typically the method is performed using a processing system coupled to one or more component processing systems via a communications network each component processing system being adapted to implement one or more respective components.

Typically each component processing system implements a component server formed from executable code, and which causes the component processing system to perform at least one of:
(a) a predetermined data manipulation service; and,
(b) generation of a respective code fragment.

Typically the component servers are formed from executable code generated using the method of the first broad form of the invention.

Typically the method includes, in the processing system, and for each component in the component combination:
(a) receiving a component specification; and,
(b) generating, using the component specification, a component request, the component request being transferred to a component processing system, thereby causing the implementation of a component server corresponding to the component.

Typically the method includes, causing each component processing system to:
(a) implement at least one agent; and,
(b) cause the at least one agent to communicate with one or more agent implemented by one or more other component processing systems.

Typically the method includes providing connection data representing agent connections to the component processing systems, thereby allowing the at least one agent to communicate with the one or more other agents.

Typically the connection data includes addresses for the one or more other agents, the addresses being indicative of an address to which an agent message can be transferred to thereby allow the agents to communicate.

Typically the component request includes the connection data.

Typically the method of determining the component combination includes, in the processing system:
(a) selecting components from a list of available components; and,
(b) defining connections between respective agents of the components.

Typically the method includes causing the processing system to:
(a) generate a graphical representation of the one or more selected components; and,
(b) manipulate the graphical representation in response to input commands received from a user to thereby define the component combination.

Typically the method includes:
(a) determining if a selected component has one or more options; and,
(b) in response to a successful determination:
  (i) setting one or more of the options; and,
  (ii) transferring an indication of each set option to the component processing system used in implementing the corresponding component.

Typically the method includes:
(a) determining one or more options from a component specification;
(b) setting one or more of the options; and,
(c) determining an updated component specification based on the set options.

Typically the method includes, causing a second processing system to:
(a) determine details of a number of components; and,
(b) provide the list of available components to the user via the first processing system, using the details.

Typically the details include component specifications, including at least one of:
(a) an indication of a respective data manipulation service;
(b) a graphical representation of the component; and,
(c) an indication of any connections required with other components.

Typically the method includes causing the second processing system to:
(a) determine performance information, the performance information being representative of one or more criteria regarding the implementation of the components;
(b) provide the performance information to a user, the user selecting the components in accordance with the performance information.

Typically the performance information includes at least one of:
(a) An indication of the entity implementing the component;
(b) An indication of the geographical location of the entity;
(c) An indication of the duration for implementing the component;
(d) An indication of a cost associated with implementing the respective component; and,
(e) A rating, the rating being indicative of the success of the component.

Typically the method includes generating revenue by charging a cost for the use of each component.

Typically the method includes:
(a) providing at least some of the revenue to a respective entity implementing the component; and,
(b) having the operator of the second processing system retain at least some of the revenue.

In a second broad form the present invention provides a method of generating executable code for performing desired functionality by implementing a component combination, the component combination being based on the desired functionality, the method including, in a processing system:
(a) determining from the component combination;
  (i) components to be implemented;
  (ii) connections between respective ones of the components;
(b) for each component, generate a component request, requesting the implementation of the component, the component request including connection data representing any required connections;
(c) transferring the component requests to component processing systems thereby causing at least some of the component processing systems to communicate using the connections and generate code fragments, at least two of the component processing systems communicating to determine a context, one or more of the code fragments being at least partially based on the determined context;
(d) receiving the code fragments from the component processing systems, the code fragments when combined, forming the executable code.

Typically the method includes at least one of:
(a) combining the code fragments to form the executable code; and,
(b) receiving the fragments in a predetermined order.

Typically the method of determining the component combination includes:
(a) selecting components from a list of available components; and,
(b) defining connections between respective agents of the components.

Typically the method is performed using a processing system, and wherein the method includes, in the processing system and for each component in the component combination:
(a) receiving a component specification; and,
(b) generating, using the component specification, a component request, the component request being transferred to a component processing system, thereby causing the implementation of a component server corresponding to the component.

In a third broad form the present invention provides a method of providing a component for use in generating executable code for performing desired functionality, the method using a component combination indicative of components to be implemented and connections between the components, the method including, in a processing system:
(a) receiving a component request including connection data representing any required connections;
(b) communicating with other component processing systems, using the connections, to thereby determine a context;
(c) generating a code fragment based on the determined context; and,
(d) transferring the code fragment to another processing system, the code fragment when combined with other code fragments, forming the executable code, which when executed by a suitable processing system causes the processing system to perform the desired functionality.

In a fourth broad form the present invention provides a method of generating executable code for implementing a component server for providing a data manipulation service, the method including:
(a) determining a component combination, the component combination including at least two component sequences, each component sequence representing a respective manner of providing the data manipulation service, the component combination being indicative of:
(i) components to be implemented;
(ii) connections between the components;
(b) causing components in the component combination to be implemented, wherein at least some of the components communicate using the connections and generate code fragments including at least one code fragment corresponding to each component sequence;
(c) combining the generated code fragments to thereby generate executable code; and,
(d) providing the executable code to a processing system, such that execution of the executable code by the processing system causes the processing system to implement the component server by executing at least one of the generated code fragments corresponding to each component sequence, to thereby provide the data manipulation in the respective manner.

Typically the executable code includes a mechanism for selecting which code fragment is executed.

Typically the component combination includes a selection component sequence which when implemented causes the generation of a selection code fragment, and wherein when the component server is implemented, the selection code fragment selects one of the code fragments for execution.

Typically the code fragment selection is context dependent.

Typically the context reflects the context in which the data manipulation is to be performed.

Typically the code fragment selection is achieved dependent on the result of negotiation between the component server and one or more other component servers.

Typically the code fragment selection corresponds to an option associated with the manner in which the data manipulation service is to be provided.

Typically the option is selected by an entity requesting implementation of the component server.

Typically the component server is used to implement a resulting component which is used as part of a resulting component combination.

Typically the resulting component includes one or more associated options definable by an entity implementing the resulting component combination, and wherein the options are used to select which code fragment is executed.

Typically the data manipulation service includes the generation of a resulting code fragment, and wherein the resulting code fragment is dependent on the code fragment which is executed.

Typically each component is implemented by implementing a corresponding component server, each component server being formed from executable code which when executed on a suitable processing system causes the processing system to perform at least one of:
(a) a predetermined data manipulation service; and,
(b) generation of a respective code fragment.

In a fifth broad form the present invention provides a method of providing a service embodied in a component using a processing system, the method including causing the processing system to:
(a) receive a component request; and,
(b) execute applications software generated by the method of the first broad form of the invention.

In a sixth broad form the present invention provides a method of generating executable code for implementing a component server by implementing a component combination, the component combination being based on desired data manipulation service, and including at least two component sequences, each component sequence representing a respective manner of providing the data manipulation service, the method including, in a processing system:
(a) determining from the component combination;
(i) components to be implemented;
(ii) connections between respective ones of the components;
(b) for each component, generate a component request, requesting the implementation of the component, the component request including connection data representing any required connections;
(c) transferring the component requests to component processing systems thereby causing at least some of the component processing systems to communicate using the connections and generate at least one code fragment corresponding to each component sequence; and, (d) receiving the code fragments from the component processing systems, the code fragments when combined, forming the executable code, which when executed by a suitable processing system causes the processing system to implement a component server, the component server executing at least one of the generated code fragments to thereby provide the data manipulation service.

In a seventh broad form the present invention provides a method of providing a component for use in generating executable code for implementing a component server, to thereby allow the component server to provide a data manipulation service, the method using a component combination indicative of components to be implemented and connections between the components, the component combination including at least two component sequences, each component sequence representing a respective manner of providing the data manipulation service; the method including, in a processing system:

(a) receiving a component request including connection data representing any required connections;
(b) communicating with other component processing systems, using the connections; and,
(c) generating a code fragment based on the determined context; and,
(d) transferring the code fragment to another processing system, the code fragment when combined with other code fragments, forming the executable code, which when executed by a suitable processing system causes the processing system to implement a component server, the component server executing at least one of the generated code fragments to thereby provide the data manipulation service.

In an eighth broad form the present invention provides a method of performing negotiation between first and second components, each component embodying a respective data manipulation service, the method including, in a processing system:

(a) determining first negotiation data associated with the first component, the first negotiation data being indicative of a first negotiation list including:
  (i) at least one negotiation option; and,
  (ii) a respective weighting associated with each negotiation option;
(b) determining second negotiation data associated with the second component, the second negotiation data being indicative of a second negotiation list including:
  (i) at least one negotiation option; and,
  (ii) a respective weighting associated with each negotiation option;
(c) compare the first negotiation list to the second negotiation list; and,
(d) select one of the negotiation options using the results of the comparison and the respective weightings.

Typically the method includes select one of the negotiation options using a predetermined algorithm.

Typically the method includes comparing the negotiation lists in the processing system by:
(a) selecting any negotiation option common to both negotiation lists; and,
(b) for each selected common negotiation option, determine a combined weighting formed from the respective weightings in each negotiation list; and,
(c) selecting one of the common negotiation options in accordance with the determined combined weightings.

Typically the method includes, in the processing system:
(a) normalising the weightings in each negotiation list;
(b) determining the combined weighting by determining an average of the respective weightings in each negotiation list.

Typically the method includes selecting the one common negotiation option in the processing system by:
(a) selecting the common negotiation option with the highest combined weighting; and,
(b) if at least two common negotiation options have an equal highest combined weighting, using at least one of:
  (i) a mean square error determined for each of the at least two common negotiation options; and,
  (ii) using arbitrary rules.

Typically the method includes, in the processing system, implementing a negotiation component to thereby perform the negotiation.

Typically the processing system implements a first component server corresponding to the first component.

Typically the method includes, in the processing system:
(a) receiving a component request; and,
(b) implementing the first component server in response to the component request.

Typically the method includes, in the processing system, receiving the second negotiation data from a second processing system implementing a second component server corresponding to the second component.

Typically the method includes, in the processing system:
(a) implementing at least one agent; and,
(b) causing the at least one agent to communicate with one or more agents implemented by the second component server to thereby determine the second negotiation data.

Typically the method includes, in the computer system:
(a) receiving connection data as part of a connection request, the connection data including an agent address of the one or more agents associated with the second component server; and,
(b) implementing the first component server in response to the Typically the method includes, in the processing system, generating a code fragment, the code fragment being dependent on the results of the negotiation.

Typically each component is implemented by implementing a corresponding component server, each component server being formed from executable code which when executed on a suitable processing system causes the processing system to perform at least one of
(a) negotiation;
(b) a predetermined data manipulation service; and,
(c) generation of a respective code fragment.

In a ninth broad form the present invention provides a method of generating executable code for performing desired functionality, the method including:
(a) defining a component combination based on the desired functionality, the component combination including at least two components which perform negotiation; and,
(b) causing components in the component combination to be implemented, at least some of the components interacting to generate code fragments which when combined form the executable code, the at least two components being adapted to communicate to determine a common negotiation option, at least one of the code fragments being generated at least partially in reliance on the determined negotiation option.

Typically the method includes selecting the common negotiation options from a number of possible negotiation options using a predetermined algorithm.

Typically the negotiation data is defined in accordance with a protocol, the protocol defining a number of minimum predetermined negotiation options.

Typically the method is used to determine context regarding the relative implementation of the at least two components.

In a tenth broad form the present invention provides a method of generating executable code for performing desired functionality by implementing a component combination, the component combination being based on the desired functionality and including at least two components which perform negotiation, the method including:
 (a) determining from the component combination;
   (i) components to be implemented;
   (ii) connections between respective ones of the components;
 (b) for each component, generate a component request, requesting the implementation of the component, the component request including connection data representing any required connections; and,
 (c) transferring the component requests to component processing systems thereby causing at least some of the component processing systems to communicate using the connections and generate code fragments, at least two of the component processing systems communicating to determine a common negotiation option from a number of available negotiation options, one or more of the code fragments being at least partially based on the common negotiation option;
 (d) receiving the code fragments from the component processing systems, the code fragments when combined, forming the executable code.

In an eleventh broad form the present invention provides a component which performs negotiation with at least one other component in a component combination, wherein the component is embodied by computer executable code which when implemented on a suitably programmed processing system, causes the processing system to:
 (a) determine first negotiation data associated with a first component, the first negotiation data being indicative of a first negotiation list including:
   (i) at least one negotiation option; and,
   (ii) a respective weighting associated with each negotiation option;
 (b) determine second negotiation data associated with the component, the second negotiation data being indicative of a second negotiation list including:
   (i) at least one negotiation option; and,
   (ii) a respective weighting associated with each negotiation option;
 (c) compare the first negotiation list to the second negotiation list; and,
 (d) select one of the negotiation options using the results of the comparison and the respective weightings.

In another broad form the present invention provides a method of performing negotiation between first and second component groups, each component embodying a respective data manipulation service, the method including, in a processing system:
 (a) determining first negotiation data associated with the first component group, the first negotiation data being indicative of a first negotiation list including:
   (i) at least one negotiation option; and,
   (ii) a respective weighting associated with each negotiation option;
 (b) determining second negotiation data associated with the second component group, the second negotiation data being indicative of a second negotiation list including:
   (i) at least one negotiation option; and,
   (ii) a respective weighting associated with each negotiation option;
 (c) compare the first negotiation list to the second negotiation list; and,
 (d) select one of the negotiation options using the results of the comparison and the respective weightings.

In another broad form the present invention provides a method of generating executable code for performing desired functionality, the method including:
 (a) defining a component combination based on the desired functionality, the component combination including at least two component groups which perform negotiation, the component combination being indicative of:
   (i) components to be implemented;
   (ii) connections between the components; and,
 (b) causing components in the component combination to be implemented, wherein at least some of the components communicate using the connections and generate code fragments which when combined form the executable code, the at least two component groups being adapted to communicate to determine a common negotiation option, at least one of the code fragments being generated at least partially in reliance on the determined negotiation option.

Typically each component group is formed from at least one of:
 (a) One or more components; and,
 (b) One or more groups of components.

In a twelfth broad form the present invention provides a method of implementing a component representing a multi-stage data manipulation service, the method including, in a processing system:
 (a) determining an internal schematic representing a combination of at least one sub-component;
 (b) causing the implementation of each sub-component in accordance with the internal schematic;
 (c) causing the termination of each sub-component once each sub-component has been implemented;
 (d) repeat steps (a) to (c) as required.

In a thirteenth broad form the present invention provides a method of defining a multi-stage component embodying a multi-stage data manipulation service, wherein the method includes:
 (a) defining at least one internal schematic representing a combination of one or more sub-components, each sub-component representing a respective data manipulation service, such that the defined combination represents the required service;
 (b) defining a number of agents, at least one of the agents being adapted to select the internal schematic in response to received data, the agents being adapted to persist upon termination of the internal schematic; and,
 (c) generating a specification defining the at least one internal schematic and the agents.

The method usually includes, in the processing system:
 (a) communicating with one or more other components; and,
 (b) selecting the internal schematic in accordance with the communication.

The method generally includes selecting the internal schematic from one of a number of predetermined internal schematics.

The method generally includes communicating using agents.

The method typically includes:
(a) causing each of the sub-components to generate a notification;
(b) transferring an indication of the notifications to a termination component;
(c) causing the termination component to generate a termination instruction in response to receipt of the indication; and,
(d) transferring the termination instruction to the sub-components.

In a fourteenth broad form the present invention provides a method of implementing a component representing a data manipulation service, wherein the method includes, in a processing system:
(a) determine an internal schematic representing a combination of sub-components, the sub-components including at least one local primitive component;
(b) cause the implementation of each of the sub-components by:
(i) transferring a component request to a respective processing system associated with each non-local primitive component; and,
(ii) implementing predetermined executable code representing the local primitive components; and,
(c) causing the sub-components to interact in accordance with the internal schematic, to thereby perform the data manipulation service.

In a fifteenth broad form the present invention provides a method of generating code using components, each component corresponding to a respective data manipulation service, the method including, in a processing system:
(a) determining a combination of components that define the code requirements, the components including at least one local primitive component; and,
(b) implementing the component combination to thereby perform the defined sequence of data manipulations, such that the computer code is generated, the local primitive component being implemented by executing predetermined code using the processing system.

The local primitive component is typically formed from executable code embedded within executable code representing the component instance.

The method typically includes, causing the local primitive component to interact with at least one of the component instance, the processing system and other components.

The local primitive component typically embodies a predetermined data manipulation service.

The method typically includes using the local primitive component to:
(a) monitor data being transferred between sub-components within the internal schematic.
(b) load data from the processing system; and,
(c) save data to the processing system.

In a sixteenth broad form the present invention provides a method of performing termination for a component within a schematic, the component representing a data manipulation service, wherein the method includes, in a processing system:
(a) receiving a notification indicative of the completion of the component; and,
(b) causing a termination instruction to be transferred to the component, the number of component being responsive to the termination instruction to terminate.

The component is implemented by a second processing system and wherein the method includes, in the processing system, transferring the termination indication to the second processing system, the second processing system being responsive to the termination indication to:
(a) generate a termination instruction in response to receipt of the notification indication; and,
(b) transfer the termination instruction to at least one of the number of components, the components being responsive to the termination instruction to thereby terminate.

The method typically includes, in the processing system:
(a) determining a number of predetermined rules; and,
(b) generating the termination instruction in accordance with the predetermined rules.

The method typically includes, in the processing system:
(a) receiving the notification indication; and
(b) determining the number of predetermined rules using the notification indication.

The method typically includes terminating:
(a) one of a number of components;
(b) a plurality of the number of components; and,
(c) each of the number of components.

In a seventeenth broad form the presentation provides a method of providing an agent bundle associated with a number of agents provided in a first component, to thereby allow the first component to communicate with a second component, each component embodying a respective data manipulation service, the method including, in the first component:
(a) providing a respective bundling component associated with each of the agents;
(b) causing each bundling component to:
(i) determine connection information for the respective agent;
(ii) add the connection information to an agent bundle;
(iii) increment a counter provided in the agent bundle; and,
(c) transferring the agent bundle to the second component, the second component being responsive to the agent bundle to determine the connection information.

In an eighteenth broad form the presentation provides a method of adding an agent to an agent bundle associated with a number of agents, wherein the method includes, in a processing system:
(a) receiving an agent bundle;
(b) determining connection information for the respective agent;
(c) adding the connection information to the agent bundle;
(d) incrementing a counter provided in the agent bundle; and,
(e) providing the modified agent bundle.

The connection information typically includes an agent address.

The method can include, in the second component:
(a) receiving agent bundle;
(b) determine from the counter the number of agents; and,
(c) implement a corresponding number of agents, thereby allowing the number of agents to be processed.

In a further broad form, the present invention provides a method of generating code using components, each component embodying a respective data manipulation service, the method including:
(a) Determining a component combination, the component combination defining a series of data manipulations and being defined in accordance with requirements to allow a desired functionality to be achieved; and, (b) Implementing the component combination to generate the computer code by:
   (i) Causing the implementation of a component server corresponding to each component in the combination, each component server being implemented by a processing system; and,
   (ii) Causing each component server to perform the respective data manipulation service in accordance with the defined series of data manipulations, at least some of the component servers performing the respective service by interacting with a data sequence, and at least some of the component servers performing service by at least one of:
      (1) interacting with one or more component servers; and,
      (2) causing the implementation of further components; and,
(c) obtaining, as a result of performing the series of data manipulations and from the data sequence, a resultant data sequence, the resultant data sequence being the computer code; and
(d) Providing the computer code to a processing system, such that execution of the computer code by the processing system causes the processing system to perform the desired functionality.

Typically the method of any broad form of the invention may be performed using the method of any one of the other broad forms of the invention.

BRIEF DESCRIPTION OF THE DRAWINGS

An example of the present invention will now be described with reference to the accompanying drawings, in which:—

FIG. 9 is a schematic diagram of an example of the operation of multiple negotiate components;

FIG. 10 is a schematic diagram of an examples of an ADD component;

FIGS. 11A and 11B are schematic diagrams of example of ALERT and WATCH components;

FIG. 13 is a schematic diagram of an example of a terminate component;

DETAILED DESCRIPTION OF THE PREFERRED EMBODIMENTS

Figure 1:
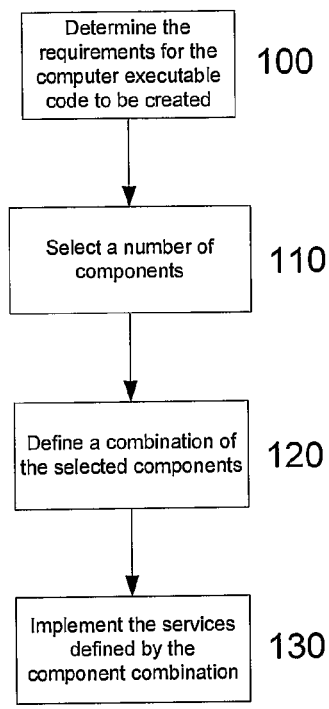
FIG. 1 is a flow diagram outlining an example of the production of software in accordance with the present invention.

An example of the process for producing computer executable code will now be described in outline with reference to FIG. 1.

As shown, the first step is to determine the requirements for the computer executable code to be created at step 100. This is achieved by considering the functionality that needs to be implemented by the resulting computer executable code. Once the desired functionality has been determined, a number of components are selected, at step 110.

Each component embodies a respective data manipulation service such that suitable combinations of components allow computer executable code to be produced. In use, the components interact with each other by transferring data therebetween. Thus, for example, an output of one component may be connected to an input of another component, to allow two services to be performed in sequence. Combining appropriate ones of the more basic level components in a hierarchical structure can also be used to allow more complicated services to be implemented as a collection of more basic services.

Accordingly, at step 120, a combination of the selected components is defined, which specifies how the components should be interconnected, such that when the services provided by the components are implemented at step 130, the interaction results in the generation of the desired computer executable code.

Figure 2:
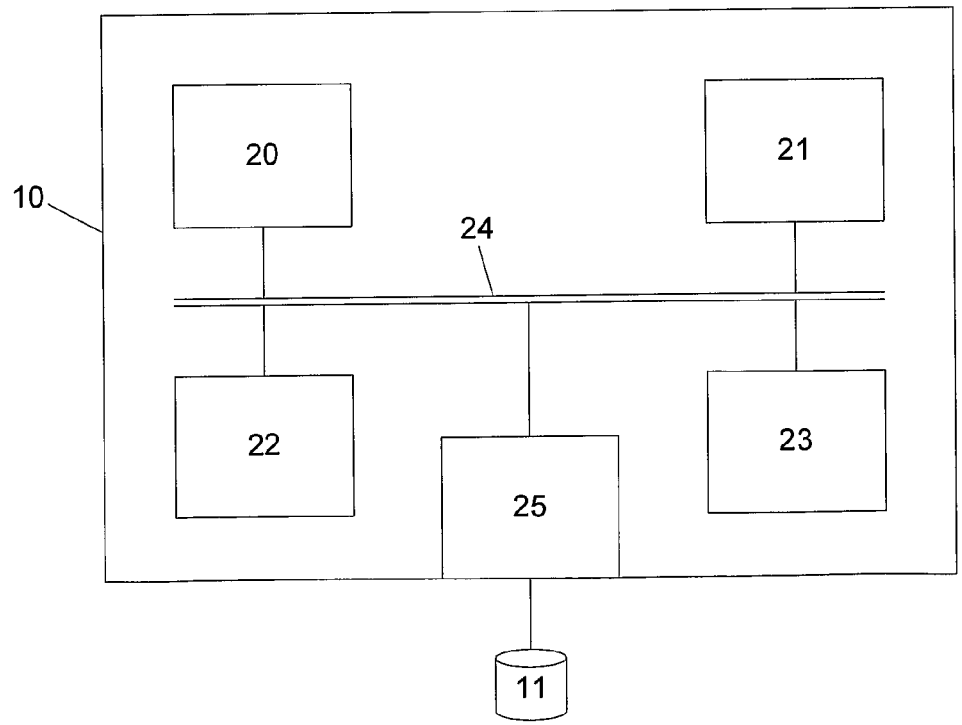
FIG. 2 is a schematic diagram of an example of a processing system for generating computer executable code.

It will be appreciated that the implementation of this technique can be achieved in a number of ways. However, in its broadest form, this process can be performed using a single processing system an example of which is shown in FIG. 2.

In particular, the processing system 10 generally includes at least a processor 20, a memory 21, and an input device 22, such as a keyboard, an output device 23, such as a display, coupled together via a bus 24 as shown. An external interface may also be provided as shown at 25, for coupling the processing system to a store, such as a database 11.

In use, the processing system is adapted to allow details of available components to be stored in the database 11. A user can then define a combination of selected components using the input and output devices 22, 23, allowing the processing system 10 to generate the computer executable code. From this, it will be appreciated that the processing system 10 may be any form of processing system such as a computer, a laptop, server, specialised hardware, or the like.

The manner in which the processing system 10 may be used to generate computer executable code is described in more detail in the co-pending application PCT/AU03/01474.

Figure 3:
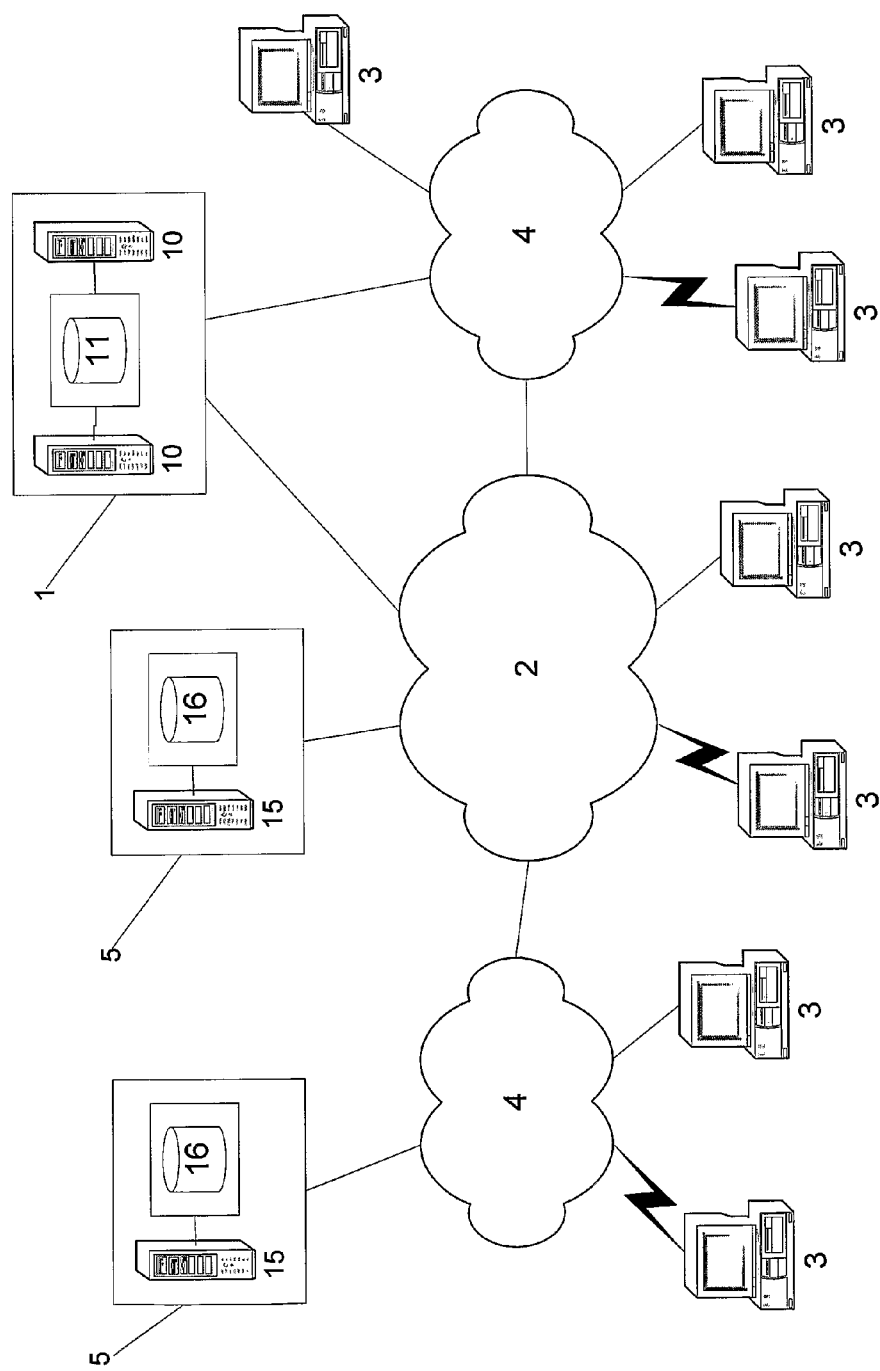
FIG. 3 is a schematic diagram of an example of a web based system for generating computer executable code.

Typically, the system is implemented using a distributed architecture, an example of which is shown in FIG. 3. In particular, in this example, one or more central processing systems 10 (two shown in this example for clarity purposes only) are provided at a base station 1, which is coupled via a communications network, such as the Internet 2, and/or a number of local area networks (LANs) 4, to a number of end stations 3.

In use, the components may be provided at, and implemented by, the processing system 10, as described above. Alternatively, the components may be provided by one or more respective entities, each of which operates one or more respective entity stations 5 (only two shown for clarity), which are also coupled to the Internet 2, and/or the LANs 4, as shown. In this example, each entity station 5 is formed from an entity processing system 15, coupled to a store, such as a database 16, as shown.

In use, users of the system can use the end stations 3 to communicate with the base station 1 to thereby obtain the provision of services embodied in suitable components.

This may be achieved in a number of manners however in this example, access to the services is provided through the use of web pages, although this is for illustrative purposes only. In order to achieve this, each end station 3 is therefore formed from a processing system that is adapted to access web pages and transfer data to the end station 1, as required.

Figure 4:
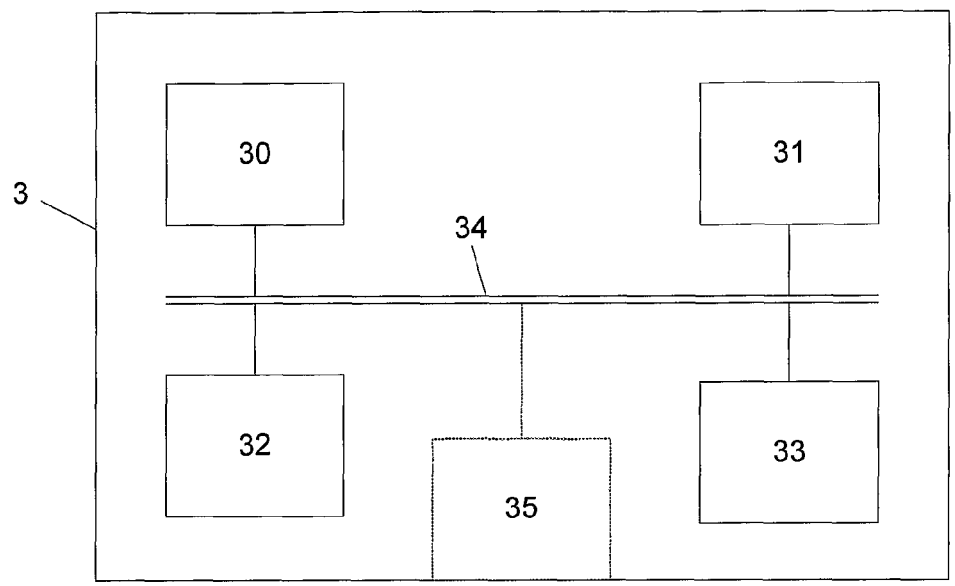
FIG. 4 is a schematic diagram of an example of an end station of FIG. 3.

An example of a suitable end station 3 is shown in FIG. 4. As shown the end station 3 includes a processor 30, a memory 31, an input device 32, such as a keyboard, or the like, an output device 33, such as a display, which are coupled together via a bus 34. The processing system is also provided with an external interface 35 for coupling the end station 3 to the Internet 2, or the LAN 4, as required.

In use, the processor 30 is adapted to communicate with the processing system 10 provided in the base station 1 via the communications networks 2, 4 to allow the processing system services to be accessed. Accordingly, it will be appreciated that the end stations 3 may be formed from any suitable processing system, such as a suitably programmed PC, Internet terminal, lap-top, hand-held PC, or the like, which is typically operating applications software to enable data transfer and in some cases web-browsing.

The components can be implemented either at the processing system 10 itself, or at one of the entity processing systems 15, depending on the nature of the component and the service provided therein.

Figure 5:
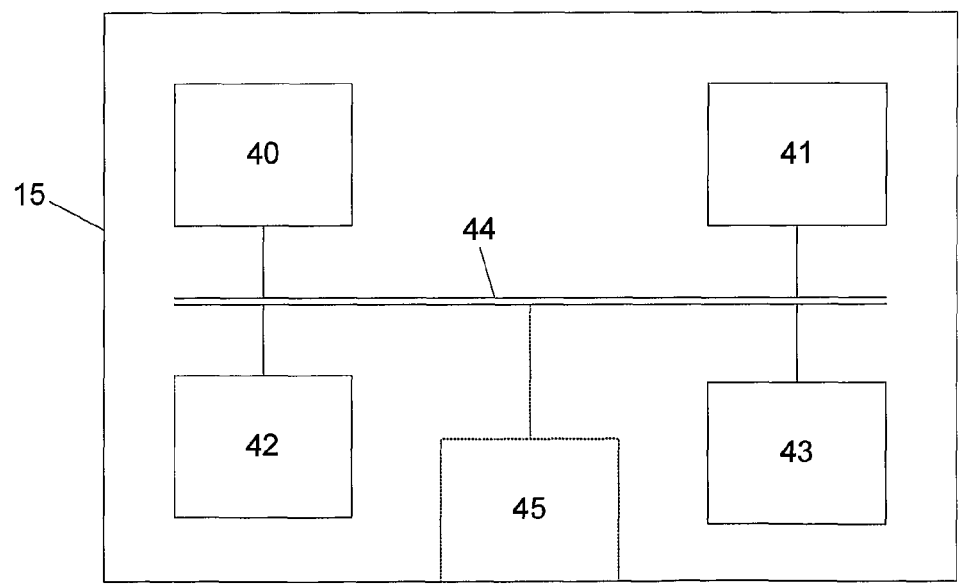
FIG. 5 is a schematic diagram of an example of an entity processing system of FIG. 3.

The entity processing system 15 must therefore be able to communicate with the processing system 10 via the communications networks 2, 4. In order to achieve this, the entity processing system 15 would generally be similar to the processing system shown in FIG. 5.

As shown the entity processing system 15 includes a processor 40, a memory 41, an input device 42, such as a keyboard, or the like, an output device 43, such as a monitor, which are coupled together via a bus 44. The processing system is also provided with an external interface 45 for coupling the entity station 5 to the Internet 2, or the LAN 4, as well as the database 16, as required.

In use, the processor 40 is adapted to allow the entity to perform the services encapsulated in respective components. Accordingly, it will be appreciated that the entity stations 5 may be formed from any suitable processing system, such as a suitably programmed PC, Internet terminal, lap-top, hand-held PC, or the like. As the services may be data intensive, the entity processing systems 15 are often formed from servers, or the like.

In any event, it will be appreciated that the end station 3 and the entity stations may be implemented using common processing systems, and the distinction between end stations 3 and entity stations 5 is primarily for the purpose of explanation only.

To allow components to be implemented by the entity stations 5, whilst still allowing users of the end stations 3 to access the services provided therein via the base station 1, it is typical for at least some details of the components to be stored in the database 11, in the form of component specifications.

The component specifications may be in any one of a number of forms, and may include graphical representations, or the like. However, in general the component specifications include sufficient information for a user to determine the type of service embodied by the respective component. It should be noted that the component specification provides enough information to allow the component to be selected and used. Thus, it will include an indication of the data manipulation that can be performed, but not necessarily how this achieved.

The base station 1 is then able to provide a forum which allows users to perform data manipulation or generate computer code by defining combinations of components. In one example, this is achieved by defining a schematic which sets out the components to be used, and the interactions therebetween. The schematic is typically defined via the end station 3, using a suitable GUI, which therefore allows users to select components presented on the forum, drag and drop these into the schematic, and define suitable connections between the components to define the component interactions. In this regard the forum operates as a portal to provide access to the component specifications.

Once the schematic is completed, this may then be implemented in a process known as a build. During a build a respective component instance can be generated for each component in the schematic. Each component instance may be created on a respective component server which is typically implemented using a respective one of the entity stations 5. In use, when the system is implemented, data may be transferred between the respective component instances with at least some of the component instances performing required data manipulations on received data, so as to provide an output of manipulated data as required.

It will be appreciated that the component instances can be capable of communicating with each other, and in particular, can be capable of transferring information and data in a form that can be understood by both components.

In one example, this is achieved using agents, with a respective agent being provided for each port on a component. Thus, an agent associated with a port on one component will cooperate with an agent associated with a port on another component. Whilst the ports are generally used for bi-directional exchanges of information, there is often a directionality associated with the transfer of data and the ports are therefore commonly referred to as inputs and outputs.

Communication between agents is typically achieved by transferring messages including a header with address information and a payload containing any data to be transferred. The interaction between the agents can be as simple as causing one agent to send a message to another agent, with no further communication occurring. Alternatively additional stages of interaction may be performed depending on the implementation.

When a schematic is to be built during a build process, purchase orders are sent to each entity providing components within the schematic. Each entity can then construct a respective component server including a respective component instance together with any associated agents. Once this has been completed, the agents communicate data between the components to allow the components to perform the respective data manipulations embodied therein.

The data manipulations can be any one of a number of types, but will generally fall into one of two categories known as processing components and code generation components. During the build process, processing components process data to provide an output, or perform another action. Thus, for example, this could include receiving and adding two numbers to provide an output.

In contrast code generation for components generate a portion of code (known as a code fragment), which when executed as part of a larger executable file, will provide data manipulation. Thus, the component may generate a code fragment which when executed causes addition of two numbers to be performed. Whilst the two layers of components may be used in different manners, the general principles apply to both types of component. Accordingly, for the purpose of clarity, distinction will not necessarily be drawn between the component types in the following description. Thus, processing described to be performed by a component may be performed by the component itself, or by code fragments generated by the component.

In this example, an entity receives a purchase order for a respective component that will specify connections that need to be formed between agents associated with the component, and the agents of other components. In particular, this will include the agent addresses of the other agents so that when the component instance and corresponding agents are constructed, the agents will be able to communicate directly with the other agents.

In one example the generated code can be context dependent code, in that the code generated will depend on factors such as:

Known state of the executable at start-up. Thus, for example, if the resulting computer executable code is an application, then the known state of the application at start up is determined by the operating system.
Known state of registers from the previous instructions
Known state of the stack and memory
Allocation of registers, stack and memory
Number of myself (component) in the project
What components are connected to my component
Location where our code is to be placed Context dependant code exploits the fact that there are many ways of performing the same task, some of which are dependant on other parts of the system. By creating context dependant code a third party is prevented from easily reusing or reverse engineering the code without extensive rewriting. Past some level of dependency it becomes more economical to simply repurchase the component, rather than to reverse engineer and rewrite.

Context dependency is achieved by the supplier examining the context in which the outcome is to be delivered. Since each context is unique, it is possible to customise for each context.

By generating code which is context dependent, substantial reductions in code size compared to conventional code can be achieved. Furthermore, the specialisation that can be achieved by allowing component suppliers to focus on small but detailed aspects of the code generation process enable a dramatic increase in reliability, productivity, and optimisation.

A number of additional features of the invention will now be described.

Negotiation

In use, components operate to provide predetermined data manipulation services. The data manipulation service may involve processing of data or the generation of a portion of an executable file. The manner in which the component is implemented will therefore depend on a number of factors, such as the type of the data to be manipulated, the type of manipulation to be performed and the context in which the data is to be manipulated.

For example, the component may be adapted to perform addition of numbers, in which case, the implementation may depend on factors such as the format of the numbers, or whether the numbers are provided in registers, as a part of a payload received from another component.

Similarly, the component may generate a code fragment which when executed as part of a complete executable program, will operate to perform addition of two numbers. In this case, the executable code generated will again depend on the numbers to be added and will therefore be context dependent.

Figure 6A:
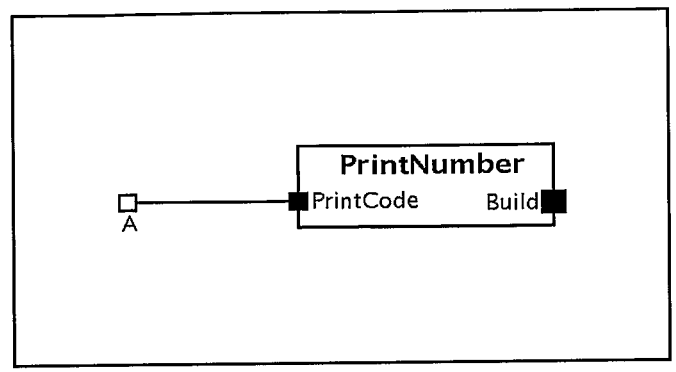
FIGS. 6A and 6B are schematic diagrams of examples of schematics using a PrintNumber component.

Thus, for example, FIG. 6A shows a PrintNumber component which is responsible for creating a code fragment that prints a number. In order to achieve this, the component must determine from its context how that number will be delivered when the computer executable code is executed.

In general, the type of data and context will typically depend on other components within the schematic, which in turn influences the operation of different parts of the resulting executable code. Accordingly, if a component is to be sufficiently robust to interact with a number of different components, it must be sufficiently flexible to handle different data types and/or contexts.

Whilst this can be achieved by providing generalised functionality which allows any situation to be handled using the same component implementation, this is typically less efficient, and generally more complex to implement. Accordingly, it is typical for components to utilise negotiation to determine types of data and/or the context during the build process. In FIG. 6A, a dedicated communication connection (PrintCode) on Component PrintNumber is reserved for this purpose, with the agent A being responsible for communicating the method of number delivery for the PrintNumber component via the communications channel between Agent A and Agent PrintCode.

The context may also be determined by what peers the component is connected to. These peer components must also determine their respective context as well. Thus as is often the case, components must interact to determine their mutual context. This interaction will vary depending on the complexity of the service being provided.

Figure 6B:
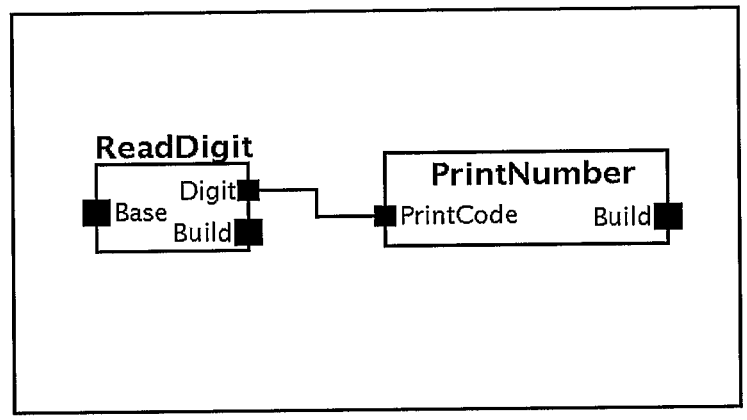

In FIG. 6B the component PrintNumber embodies knowledge that can produce an appropriate code fragment for printing digits provided using a variety of number transport options. Similarly the ReadDigit component may be responsible for creating a code fragment that reads a number from a keyboard but must also determine from its context how the number can be delivered when the code is ultimately run.

The PrintNumber component has an Agent PrintCode which is connected to the ReadDigit component via its Agent Digit, allowing the components to communicate to discover the context for the number delivery/supply.

The communication is however complicated by Component PrintNumber and Component ReadDigit possessing several workable solutions in this context. This is a result of the need for components to be sufficiently flexible so as to operate in a range of contexts. These components can complete their service successfully by generating code fragments for transporting the number in any one of several methods. However, some methods would cost more than others since some methods may be more complex or deliver more code than others. Also the relative costs for determining the code fragment for each Component given a transport method may be different.

To overcome this problem, a process known as negotiation is used. An example of a negotiation process utilising a negotiate component will now be described. For the purpose of this example, the negotiation components will be considered to be processing components, which therefore provide a negotiation service during a build. However, as an alternative, the PrintNumber and ReadDigit servers could have been constructed in part with negotiation code components which built negotiation processing natively into the servers. These servers when in operation can cause negotiation to be performed. This techniques can be used in implementing higher level components as will be described in more detail below.

Figure 7A:
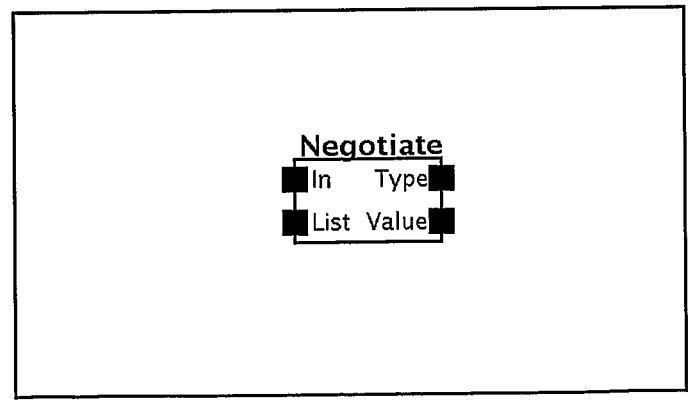
FIG. 7A is a schematic diagram of an example of a negotiate component.

In particular, FIG. 7A shows a negotiate component, having an In agent, a List agent, a Type agent, and a Value agent. The component is adapted to retrieve a list of negotiation positions using the List agent, which is then exchanged with another negotiation component via the In agent, which will in return provide a similar list.

Each negotiation component can then compare the two lists to determine a common negotiation position. By performing this in accordance with a predetermined algorithm, each negotiation component can determine a mutual outcome.

Following this, an indication of the negotiation position can be transferred to subsequent components in a schematic via the Type agent, with data values being provided via the Value agent if required.

An example of use of the negotiation component will now be described in more detail with respect to FIG. 7B.

In this example, two components 1000, 1050 are provided which allow some sequence of data manipulations to be performed. In this case, each component is formed from two sub-components 1010, 1020, and 1060, 1070, also shown. The components 1000, 1050 also include an external agent 1001, 1051, which allow the components 1000, 1050 to be interconnected, and respective internal agents 1002, 1052, as shown.

The components 1010, 1060 are negotiation components having respective In agents 1011, 1061, List Agents 1012, 1062, Type agents 1013, 1063 and Value agents 1014, 1064, whilst the components 1020, 1070 each include two agents 1021, 1022; 1071, 1072. In general the components 1000, 1020, 1050, 1070 may include other agents and sub-components for providing respective data manipulation, but this is omitted from this explanation for clarity purposes.

Operation of the negotiation component will now be described.

In this example it will be assumed that each component is implemented as a respective component instance by a respective component server, in response to receipt of a purchase order by one of the entity stations 5.

In particular, when purchase orders are received and the components 1000 and 1050 are constructed, the agents 1001, 1051 will interconnect, and each component server will generate purchase orders resulting in the generation of the components 1010, 1020, 1050, 1060, as shown.

Following this, the agents 1001, 1051 will determine no further action is required by themselves, and these agents will therefore hand-off, allowing the agents 1011, 1061 to interconnect directly. Simultaneously, the List agents 1012, 1062 will connect with respective internal agents 1002, 1052 and obtain a list representing the negotiation position therefrom, whilst the agents 1013, 1014; 1063, 1064 will interconnect with the agents 1021, 1022; 1071, 1072, respectively, as shown in FIG. 7C.

The negotiation position will typically include a number of options and an indication of their preference. As the list is based on the implementation of the respective data manipulation service by the respective component, it will be determined when the component is initially designed, and can therefore be either hard coded within the software used to implement the component instance, provided as part of the component specification or the like. In any event, the agent 1002, 1052 operates to provide the respective list to the List agent 1012, 1062 as part of a message payload in accordance with agent to agent communication.

Thus, for example, if the negotiation relates to the use of registers, each list will indicate the registers which can be supported by the respective component 1000, 1050, and the preferred order, indicated by a respective weighting.

At this point, the agents 1011, 1061 exchange messages containing their respective lists as payloads. Following this, it will be appreciated that each negotiate component therefore has a copy of both lists. The negotiate components 1010, 1060 then execute a predetermined algorithm to arrive at an agreement. In one example, this is based on the implementation of a best match game theory algorithm. An example of this will now be described in more detail below.

Once an agreement has been reached, then each negotiation component 1010, 1060 can provide an indication to the components 1020, 1070, via the respective agents 1013, 1063. The agents 1014, 1064 typically under go a hand-off procedure, such that the agents 1022, 1072 interconnect directly, as shown in FIG. 7D. At this point, data can be transferred directly between the components 1020, 1070, by inclusion of the data in the payload of message exchanged by the agents 1022, 1072.

It will be appreciated by persons skilled in the art, that the implementation of either one of the components 1020, 1070 may be dependent on the result of the negotiation position. Accordingly, it is typical for the components 1020, 1070, to implement a dynamic construction approach, as described in co-pending application PCT/AU03/01474.

This is achieved by making one of the agents 1021, 1022, 1071, 1072 a selector agent, to thereby allow the manner of implementation of the components 1020, 1070, and hence the components 1000, 1050 to depend on the results of the negotiation. This may depend on either the negotiation position selected, or the respective value of received data, and is irrelevant as long as the component is able to support all outcomes of the negotiation.

For example, the negotiation may determine that numbers are to be exchanged as integers, but the design of the internal schematic of the component may depend not only on the numbers being transferred as integers, but also on the value of the numbers.

Figure 8:
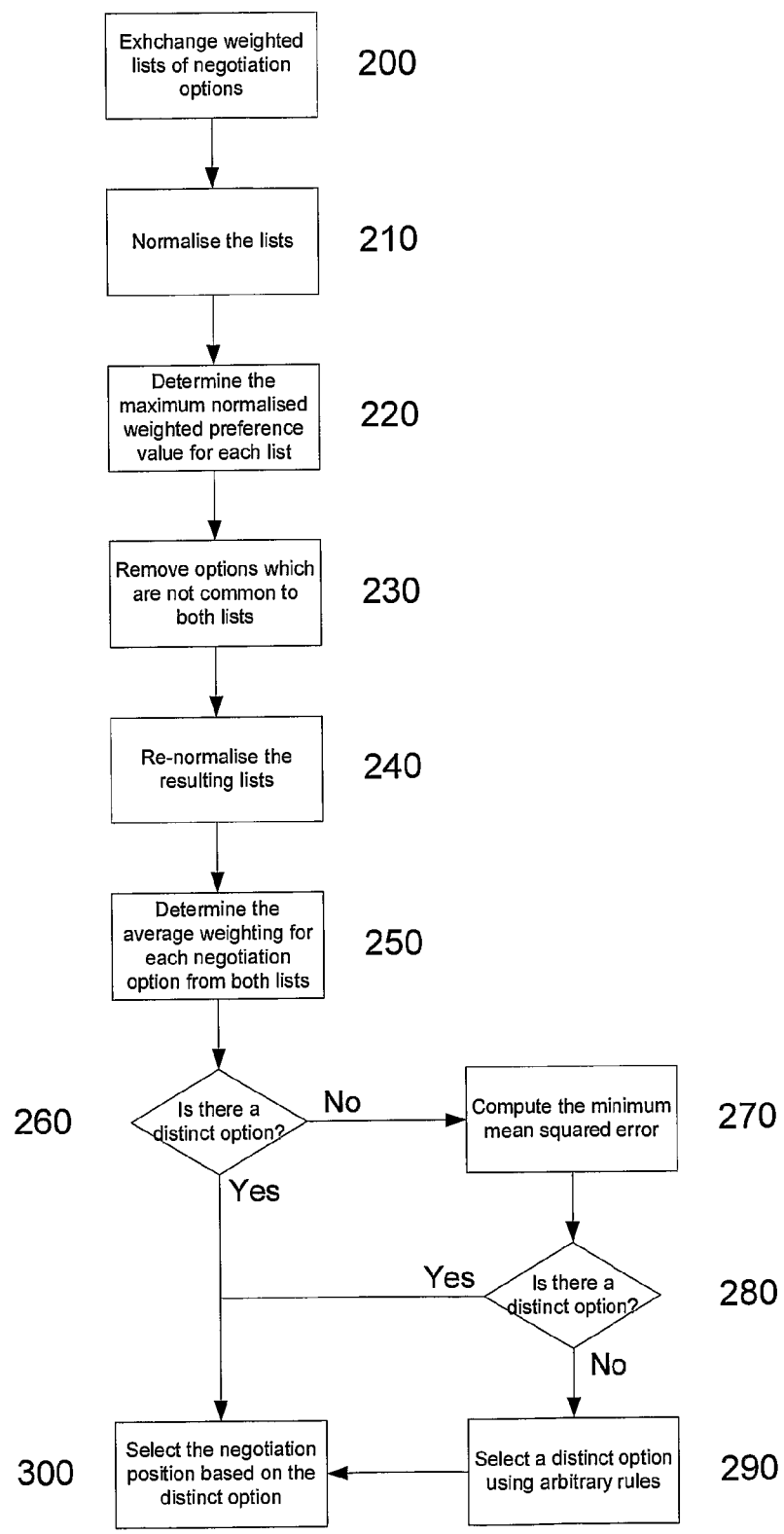
FIG. 8 is a flow chart of an example of an algorithm used by the negotiation component of FIG. 7A.

An example of an algorithm for use in performing negotiation will now be described with respect to FIG. 8. In this example, the positions associated with the negotiate components 1010, 1060 are as shown in Table 1 below.

TABLE 1

| 1010 | | 1060 | |
|---|---|---|---|
| Option | Weighting | Option | Weighting |
| A | 0.1 | C | 0.4 |
| B | 0.2 | D | 0.3 |
| C | 0.3 | E | 0.2 |
| D | 0.4 | F | 0.1 |

At step 200, the negotiate components 1010, 1060 operate to exchange negotiation positions via the In agents 1011, 1061. This results in both parties gaining access to each other's weighted list. At step 210 each component 1010,

1060, will operate to normalise each list such that the weightings in each list sum to one. In this example, table 1 shown above includes pre-normalised lists although this is not essential.

At step 220 each negotiation component 1010, 1060 will operate to determine the maximised normalised weighting for each list. In this example, the maximised weighting value is 0.4 for each list.

At step 230 each negotiation component 1010, 1060 will operate to remove options which are not common to both lists. In this case the options A, B, E and F are not common to both lists and are therefore removed to result in the generation of new lists, which are then renormalised at step 240, resulting in the lists shown in table 2.

TABLE 2

| 1010 | | 1060 | |
| --- | --- | --- | --- |
| Option | Weighting | Option | Weighting |
| C | 0.43 | C | 0.57 |
| D | 0.57 | D | 0.43 |

At step 250 each negotiation component 1010, 1060 operates to determine an average weighting for each negotiation option in both lists. In this case, the average weighting of both C and D are equal to 0.5.

At step 260, each negotiation component will operate to determine if there is a distinct option. This will occur for example if one of the options on the list has a higher weighted average than all of the other options. In this particular instance, the weighting averages are equal and accordingly, the process proceeds to step 270 to compute the minimum mean square error.

In particular, the minimum mean square error from the maximum weighted value as determined in step 220 is generated in accordance with standard techniques. At step 280 the negotiation components 1010, 1060 operate to determine if there is distinct option. Again, this may be achieved for example by determining which if any of the options has a lower minimum means square error.

In this instance, the minimum mean square error is equal to 0.01 in both cases and accordingly, the method proceeds to step 290 to select a distinct option using arbitrary rules. In one example this may include selecting a first option appearing on the list of either one or both of the components, as will be discussed in more detail below. In this example, the arbitrary rules would therefore result in the selection of option C.

Once a suitable option has been determined either at steps 260, 280, or 290, the negotiation is complete.

In the event that no preferential position is determined prior to step 290, it is necessary to ensure that each negotiate component selects the same negotiation position, and that this is performed fairly so that it does not unduly disadvantage entities implementing the components 1000, 1050.

It will be appreciated by persons skilled in the art that this may be achieved in a number of manners. For example, the algorithm could generate a pseudo random number associated with each negotiate component 1010, 1060, or with each component 1000, 1050 which are then compared to allow the negotiate list of the component with the highest number to be selected.

However, in one preferred example, selection of a negotiation position in a tied situation is determined by using the unique agent ID, which is assigned during the build process. Again, in this case, selection of the highest agent ID may again favour certain entities. Accordingly, this is avoided by calculating a number by applying a predetermined hash function to the unique agent ID associated with each negotiate component. Such a computation is guaranteed to be deadlock free since each agent has a unique ID throughout the entire system, and hashing the unique agent ID avoids the advantage that may occur from parties that enjoy consistently high agent ID numbers.

Protocols

The gathering of requirements can be broken down into protocols over which the negotiation is conducted, with different protocols defining different lists of options.

Figure 7B:
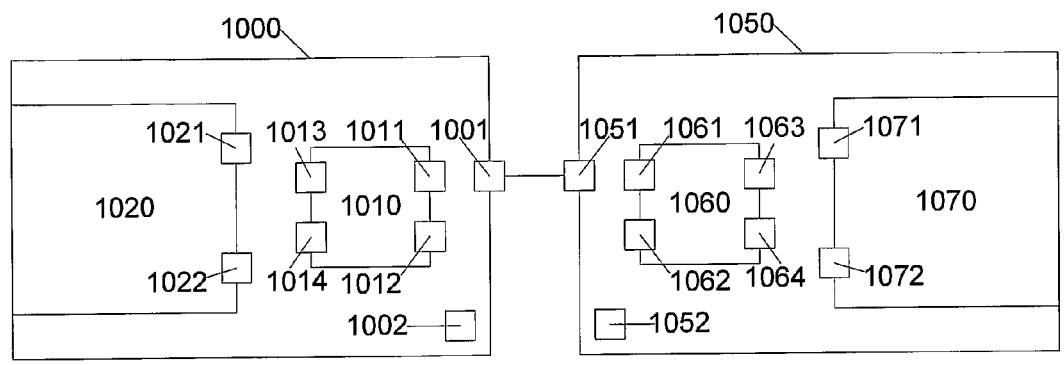
FIGS. 7B to 7D are schematic diagrams of an example of the operation of two negotiate components.
Figure 7C:
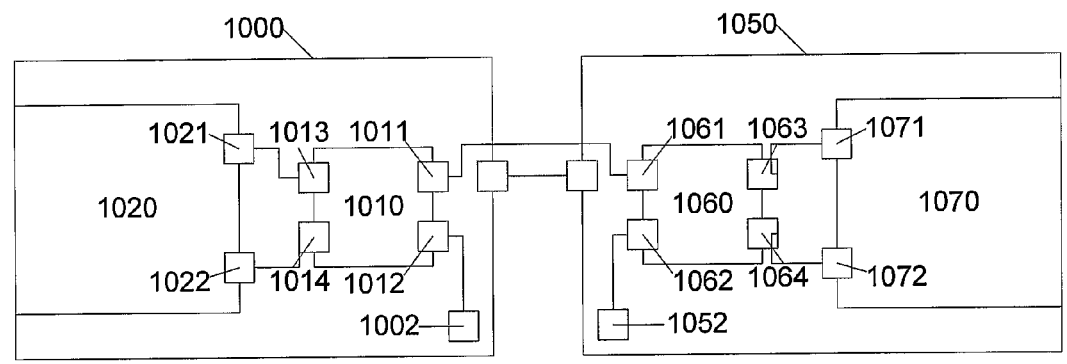
Figure 7D:
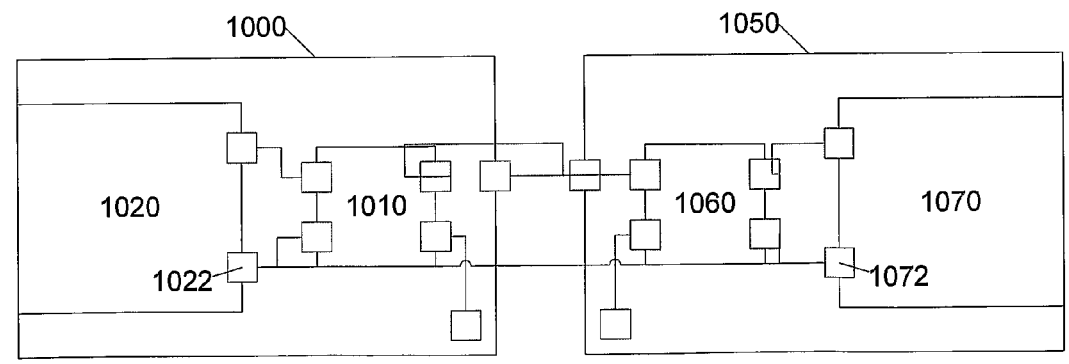

For the example given in FIGS. 7A and 7B, negotiation is over the transport methods of a number using the number protocol. There may be many transport methods available in the number protocol and these methods are registered as being part of the protocol.

A component can support outcomes in addition to the registered set which may enhance the components standing in the market by making it more flexible. However there is a minimum set of outcomes the component must support if it wants to advertise compliance with the protocol. This minimum set guarantees solutions in any negotiation between parties claiming compliance with the protocol, and accordingly, minimises the frequency of build exceptions (errors during the build process).

Decision Tree

Negotiate components can be cascaded to create a decision tree.

An example of this is shown in FIG. 9 which represents two components 1080, 1090 each of which includes two respective negotiation components 1081, 1082, 1091, 1092 connected as shown.

In this example, the two negotiate components 1081, 1091 will first interconnect and arrive at an agreement, as outlined above with respect to FIG. 7.

Once this has been completed, the value determined by the negotiate components 1081, 1091 will be transferred onto the negotiation components 1082, 1092 via the respective Value and In agents. The negotiate components 1082, 1092 will then perform further negotiation as required.

In this case, the value obtained from the negotiate components 1081, 1091 will be used by the negotiate components 1082, 1092, in selecting a respective list via the respective List agents. Thus, the outcome of the first negotiation can be used to influence the nature of the negotiation performed afterwards.

Whilst a value has been shown connected to the In agent of the subsequent components 1081, 1091, it will be appreciated that the Type agent of the previous negotiation components 1081, 1091 may be connected to a selector agent of a schematic, which may contain for example, the In agent of the subsequent negotiation components 1082, 1092. Thus, negotiation can be made to depend on the type determined by a previous negotiation.

This allows a tree of negotiate positions to be defined, with each branch in the tree reflecting the outcome of a previous negotiation.

Alternatives

As an alternative to performing negotiation, it is possible to use an enforced negotiation position. This may be achieved for example by implementing protocols which have only a single negotiation option defined. Alternatively, this may be achieved by simply removing the negotiation components so that other components communicate directly in accordance with predetermined options.

It will be appreciated that removing the option of negotiation vastly simplifies the connection process but will limit interaction between components and increase errors in the build process by making the components more brittle.

A further option is to allow errors to occur during the build process. Thus, for example, if there are no negotiation options in common between the two lists, or if no negotiation is provided for and components are attempting to, in the example, transfer numbers or data in different formats, then it is possible to generate an error during the build process.

In this example, the user of the system would be alerted to the fact that a build error has occurred allowing the build error to be fixed in some manner. This could be achieved for example by allowing the user to insert additional components to convert the format of the data as required. The system could in such cases, revert to a manual process, in which an operator, after examining the nature of the problem, constructs a custom schematic to resolve the impasse.

Multi-Point Negotiation

In addition to negotiation being performed directly between two components, it is also possible to perform multi-way negotiation between a larger number of components. An example of this will now be described with reference to FIG. 10 which shows an example of an ADD component.

In this example, the add component has three agents labelled In1, In2, and Out respectively, which are used for negotiating transport options that will be used in the design of the resulting code fragment, that at run-time will gather and deliver data for the add. A Build agent is provided for connecting to the build chain to allow the resulting code to be delivered, as will be appreciated by persons skilled in the art.

Before code can be generated by the add component, it must determine from adjacent components in the schematic how the data will be gathered and delivered. In this particular example, the manner of implementation of the add component means that many options exist for transporting the data which is to be added and for provision of the result. Accordingly, it is necessary for the add component to undergo negotiation with other components to determine the exact form of this transport, and to thereby allow the add function to be embodied in code delivered.

In one example, all the negotiations relating to transport of data can be conducted in isolation from one another. Thus for example, each agent In1, In2 and Out can negotiate with a respective component to provide a respective transport mechanism. In this instance, the code fragment generated by the add component may be adapted to add values to be provided in predetermined registers, allowing these to be combined with the result also being provided in a predetermined register. However, the operation of the add code fragment in accordance with this technique may require more instructions than necessary in order to allow the add function to be performed. This may occur for example if the values are provided using a mechanism other than registers and then must be moved into the required registers. This in turn results in a penalty in speed, memory usage and hence performance.

Accordingly, it is preferable to chain the negotiations such that the outcome of one negotiation will effect the outcome of another negotiation. Thus, chaining negotiation modifies the negotiation position of a component based on the results of earlier negotiations. This allows information to be gathered and some design options to be settled, before further negotiations are then performed, allowing an agreed negotiation position to be determined based on the favorite solutions already determined.

Chaining can be conducted in forward or reverse manners depending on the respective implementation and examples of this will now be described.

In an example of forward chaining, components which supply data via the In1 and In2 agents may have a preferred form of data transport which involves placing the data in predetermined registers. In this case, the preferred option is for these registers to be used to perform the addition. Thus, the use of a register to provide the results of the negotiation will be given a high weighting in any negotiation performed by the Out agent with subsequent components.

Thus, in this instance, because the suppliers prefer to transport data by copying it into memory registers then the add component is adapted to place a high weighting on this form of data transport for the Out agent. Assuming that the component coupled to the Out agent is also able to receive data transferred via the memory registers, then this will be determined to be the agreed negotiation position between all parties.

Similarly, in a reverse chaining method, a component coupled to the Out agent will first determine, during a negotiation procedure, the preferred form of data transport between the add component and subsequent component. For example, this may specify that it is preferred to transport data via memory registers without preference for a particular register. The add component will then raise the weighting for the negotiation position for transport of data in respective memory registers for the negotiation performed by the In1 and In2 agents.

Thus, again this can be used to ensure that the code fragments generated by the components coupled to the In1 and In2 agents provide data at run-time in predetermined (via negotiations through In1, In2) memory register locations to thereby improve the performance of the solution.

It will be appreciated by persons skilled in the art that conducting negotiations in isolation may result in the code fragment generated by the add component utilising additional instruction codes in order to implement add functionality. In particular, the add code fragment will require two instructions to move data into predetermined registers, a further instruction to perform the addition, and a final instruction to move the result to the appropriate register.

However, chaining the negotiations can result in the add code fragment only requiring a single instruction. In this case, the code fragment from the components coupled to the In1 and In2 agents place the data to be added in the predetermined registers required by the add code fragment. The add code fragment can then generate a single instruction which causes the contents of these registers to be added, with the result register also satisfying the transport agreement made with the component connected to the out agent.

Local Primitives

In use, when a schematic is implemented during a build process, components can be implemented as respective component instances by a respective component server. The component server typically embodies the internal schematic of the component that is used to construct and deliver the component service. This internal schematic represents the relative organisation of sub-components contained within the respective component, such that the result is the delivery of the component service.

It will be appreciated by a person skilled in the art that this is a hierarchical arrangement in which components implemented as sub-components within the internal schematic of a component higher in the overall schematic may themselves contain an internal schematic which defines an arrangement of sub-components.

Ultimately, however components will be provided which are not themselves made up of further sub-components and which do not therefore have an internal schematic per se. In this particular instance, the components perform data manipulations directly, for example by having an operator manually manipulate the data, or having the manipulations performed using executable code or the like.

Such components which do not have an internal schematic and do not decompose into further sub-components are generally referred to as primitive components.

A primitive component is therefore a component that cannot be further decomposed into sub-components and which is therefore itself implemented by a server which performs the data manipulation. It will be appreciated by a person skilled in the art that whilst these components are referred to as primitive components, they are not limited to simple processing and can be arbitrarily complex in the service they perform depending on the respective implementation and the complexity of the implementing server.

It will be appreciated from this that a primitive component server is itself executable code which is created by building an appropriate schematic, as will be described in more detail below. In addition to providing primitive components, there is an additional subclass of components referred to as local primitives.

A local primitive is a primitive component which is implemented as part of the internal schematic of a higher level component. In addition to being a sub-component within the internal schematic, the local primitive is implemented as a part of the component server which embodies the higher level component.

Thus, when the component server generates a component instance corresponding to the higher level component, the code representing the component instance will incorporate the functionality of the local primitives. This allows the local primitives to be implemented as part of the internal schematic with all the required data manipulations and functionality being performed by the component server itself. This in turn allows the local primitive to be rendered locally, greatly improving the performance of the system.

Thus, for example, when a component is implemented the functionality provided by the local primitive is implemented by the respective component server itself and does not therefore require service to be performed at a remote location. This in turn reduces requirements for data to be transferred from the component server to another component server elsewhere in the world, to allow the functionality of the local primitive to be implemented. This in turn reduces network traffic and avoids the need for purchase orders or the like for the respective service embodied by the local primitive.

Furthermore, by providing the functionality within the server itself, this provides a mechanism by which components can modify the behaviour of the server itself.

An example of this will now be described with reference to an alert component shown in FIG. 11A. In particular, the alert component includes an In agent and an Out agent as shown.

In use, traffic is routed through the alert component from the In agent to the Out agent and this can therefore simply be provided in any connection between two respective sub-components within the internal schematic of the component.

In use, the alert component is adapted to monitor traffic transferred therethrough and render a pop-up dialogue to the server operator in the event that a fault, or unexpected traffic, occurs. This allows the server operator to be alerted to the fact that a fault has occurred, with the pop-up dialogue box providing an indication of the nature of the fault.

As will be appreciated by a person skilled in the art, if the alert component is implemented as a component on a different component server, then the alert component server provided on a different machine would need to access the display on the parent server in order to render the pop-up dialogue box in a meaningful context. However this would introduce severe security concerns as the information regarding the operation of the server would be required by other servers in the system.

In addition to this, local primitive components can be adapted to provide access to construction time data from the server for use in calculations performed by the schematic or the like.

For example, a local primitive may be used to provide the component server implementing the schematic with an indication of the number of active instances on the server. This allows processing to be offloaded onto other secondary servers if the load for the current server looks to become unmanageable.

Additional examples of local primitives include load and save components that are required to provide load and save functionality. In particular, if a component instance is required to load a file from a remote location, then it is preferable that the load process is controlled by the server itself. Accordingly, the load component can be provided as part of the component instance, thereby allowing the component instance and hence the server to perform the respective loading operation.

Thus by ensuring that local primitives form part of the component instance itself, this ensures that the local primitive correctly interacts with the component server to perform its operations in a manner which the component server can utilise, in the above example, it therefore ensures that the file is loaded correctly based on the local settings. It will be appreciated by a person skilled in the art that this task would be far more complex if the load component were provided on a different component server.

Another example of a primitive component is shown in FIG. 11B. In particular, this example is of a watch component having an input agent In, an output agent Out and a watch agent W. In use, the watch agent will simply operate to pass through any data received at the input In, and monitor all traffic passing therethrough, in a manner similar to the alert component described above. However, in this example, the watch component is adapted to allow details of the traffic to be determined via the watch agent, for example by querying the watch component via the watch agent W.

By providing a number of watch components within the internal schematic of a component. This allows the entity overseeing the implementation of the component to monitor how the component is operating both during the build process, to allow monitoring negotiation or other agent messages, and during run time, by monitoring the payload of messages to determine the data being transferred.

It will be appreciated by persons skilled in the art that this may therefore be implemented either as a local primitive, or as a normal primitive implemented by a respective watch server, thereby highlighting that the status of a primitive component as a local primitive depends on its implementation and not necessarily the nature of the component itself.

A further point of note is the local primitives are implemented as a mini-server built into the main server. Accordingly, rather than implementing the local processing using a collection of local primitives arranged in such a fashion as to perform the required processing through purchasing and managing, and rather than implementing the many mini-servers as part of the main server, the local processing can be lumped into a custom code fragment which forms part of the executable file of the main component server. This can be used to provide a custom component server that is part primitive yet still sub-contracts.

Multi-Stage Transactions

In some situations, it is useful to be able to implement a component a number of times in succession. In order to achieve this, it is possible to construct a schematic in which the components is defined a number of times in sequence. However, it will be appreciated that in some circumstances this does not represent an adequate solution to the problem.

For example, if it required to implement loops of an undetermined length, it is not possible to simply chain together a number of components in sequence as the number of components required to perform each operation in a respective loop is unknown.

An alternative solution to this problem is to provide for multi-stage transaction operation of components, an example of which will now be described with reference to FIGS. 12A to 12D.

Figure 12A:
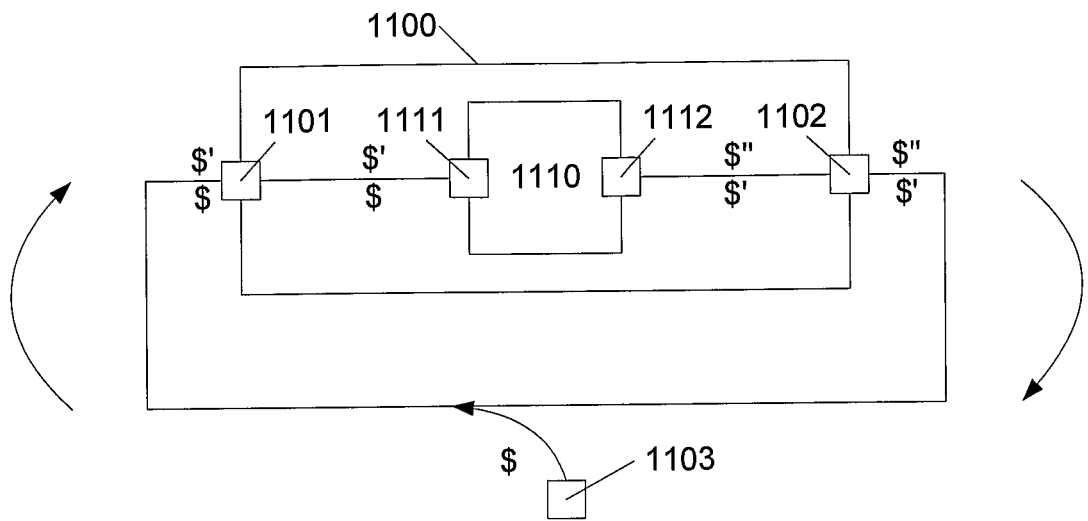
FIGS. 12A to 12D are schematic diagrams of schematics for implementing multi-stage transactions.

As shown in FIG. 12A, a component 1100 is provided having respective input and output agents 1101, 1102. The component 1100 includes a sub-component 1110 having respective input and output agents 1111, 1112 as shown. In use, it is desired to transfer a string $ from an external agent 1103 to the input agent 1101. The string is then transferred to the agent 1111 and operated upon using the component 1110. The resulting modified string $' is output via the agent 1112 and the agent 1102 and is recirculated to the input 1101 as shown allowing the string to pass through the component 1110, to be further modified $". It will be appreciated that in this configuration, the loop would be repeated constantly.

Figure 12B:
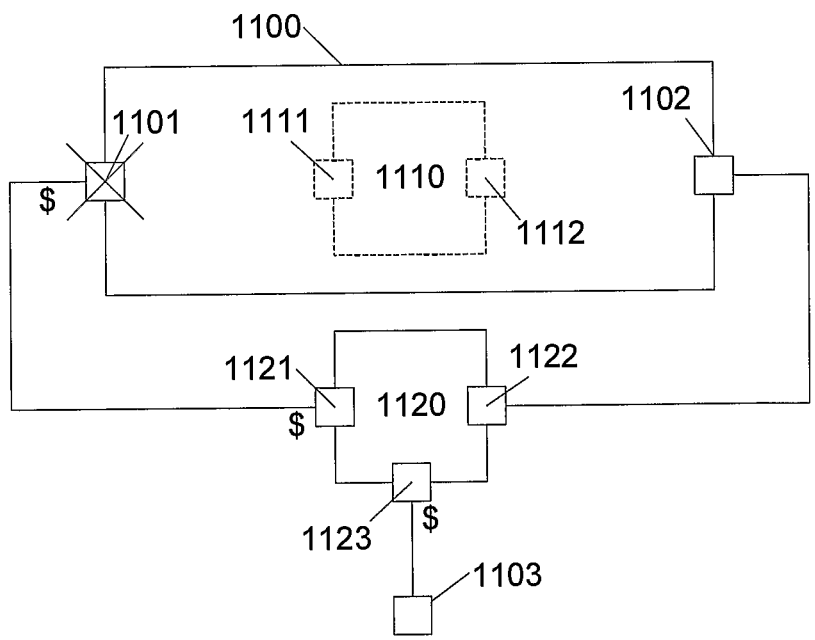

It is desirable to present the component 1100 as a single operation loop component, which therefore requires the component 1100 to implement the component 1110 an unknown number of times. To achieve this the schematic arrangement shown in FIG. 12B is used.

In this instance, the internal schematic of the component 1100 is to be destroyed after completing its operation, without destroying the component 1100 itself. This may be achieved in a number of manners depending on the implementation and will be described in more detail below.

The component 1100 is a multi-stage component in that each of its agents 1101, 1102 are able to undergo multiple transactions. This is achieved by inhibiting hand-off across the boundary of the component 1100 so that the internal schematic can be built and destroyed a number of times, without terminating the component 1100. In addition to this, the agent 1101 is also adapted to operate as a selector agent, allowing the internal schematic of the component 1100 to be selected, for example, in response to data received by the agent 1101.

In addition to this, a memory component 1120 is provided. The memory component includes three respective agents 1121, 1122 and 1123 which are interconnected within the schematic as shown. In this example, the agent 1123 operates to receive a payload containing an initial memory value, which is transferred via the agent 1121 to the agent 1101, as shown. When the memory component 1120 receives a payload via the agent 1122, the component 1120 memorises the value in the payload, and then forwards the memorised value as a payload via the agent 1121, as will be explained in more detail below.

Thus, during the build process, the agents 1101, 1121; 1102, 1122; and 1123, 1103 will interconnect as shown in FIG. 12B, by exchanging appropriate messages. At this stage the internal schematic of the component 1100 is undecided.

Once communication has been established, the agent 1123 will receive a string $ from the agent 1103, and transfer this via the agent 1121, to the agent 1101. This will typically be performed by providing the string as a payload in respective messages transferred between the agents.

At this point the agent 1101 operates to determine an internal schematic for the component 1100 and accordingly the agent 1101 is a multi-stage selector agent as indicated by the cross shown in FIG. 12B. The schematic is predefined and may depend on the contents of the payload received from the agent 1121. In this example the internal schematic includes the component 1110 as previously described.

Figure 12C:
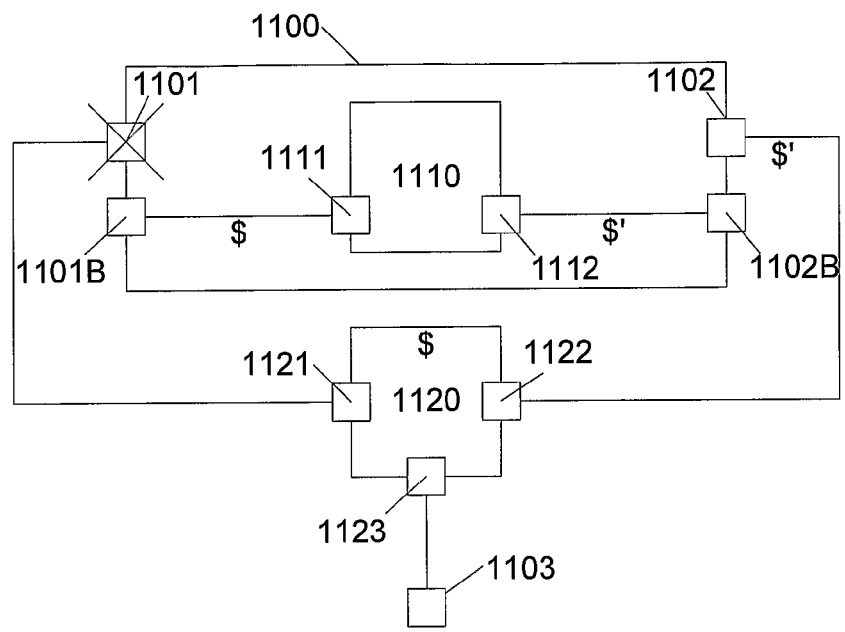

In addition to this, the multi-stage transaction agents 1101, 1102 operate to generate temporary agents 1101B, 1102B respectively. These temporary agents are single stage transactions agents that will terminate after the internal schematic is terminated. In this instance the internal schematic is built such that the agents 1111, 1112 connect to the agents 1101B, 1102B respectively, as shown in FIG. 12C.

The temporary agents 1101B, 1102B are used so that the multistage selector agent 1101 remains open by allowing payloads presented to the agent 1101 to be forwarded, via the temporary agent 1101B, onto the agent 1111, in a process referred to as "hand through". Hand through is therefore an alternative mechanism to hand off which has been previously described.

In hand through, by presenting the agent 1101B, this allows the internal schematic of the component 1100, and hence the component 1110 to successfully terminate by breaking the connection and terminating the agent 1101B whilst allowing the agent 1101 to remain open.

The string $ is transferred via the agent 1110B to the agent 1111, allowing the component 1110 to modify the string to generate a modified string $', which is transferred via the agent 1112 to the agent 1102B.

At this point the component 1100 determines that the internal schematic has performed the required processing, which is typically achieved using some form of termination mechanism inherent within the schematic itself. This may therefore be achieved using a terminate component or the like, as will be described in more detail below. In any event, the internal schematic of the component 1100 and hence the component 1110 will terminate as represented by the dotted lines in FIG. 12D. Typically this will involve a component server terminating the component instance representing the component 1110.

Figure 12D:
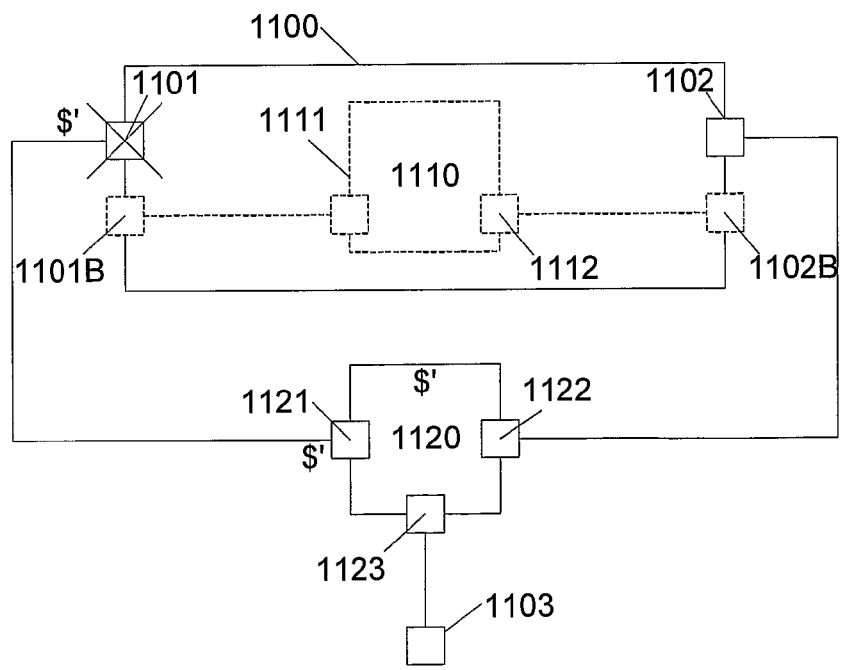

The agent 1102 will transfer the modified string $' in a message payload to the agent 1122 of the memory component 1120, thereby causing the string $ stored in memory to be replaced by the string $'. The agent 1121 will attempt to transfer the string $' to the selector agent 1101. However, the selector agent is adapted to block any incoming payloads until such time that the internal schematic has completely terminated, thereby allowing a new internal schematic to be constructed. Accordingly, the memory component 1120 will wait for a message from the agent 1101 which confirms that it is now able to construct a new internal schematic, and therefore transfers the string $' to the agent 1101, as required, and as shown in FIG. 12D.

Upon receipt of the modified string $' the multi-stage selector agent 1101 will operate to generate purchase orders causing the building of the internal schematic shown in FIG. 12C, thereby allowing the loop to be repeated.

It will be appreciated that in this example, this process is continuously repeated so the string is modified by the component 1110, which then terminates, before being repurchased to thereby modify the string again.

However, in contrast to this, the component 1100 is persistent in that it is only built a single time within a greater schematic, and is not repurchased on each iteration of the loop. Thus, the component 1100 outwardly presents a persistent component but inwardly utilises repurchased components to perform multi-stage transactions.

In order to ensure smooth operation of such loops in more complex situations, it is important to ensure that all processing by all the components in the loop is completed before the next loop iteration, to thereby avoid synchronisation problems.

For example, in the above-mentioned situation, presentation of the output string $' to the agent 1101 prior to termination of the component 1110 could cause problems.

In order to prevent this the agent 1101 is typically blocked until the component 1100 has terminated, which is achieved as will be described in more detail below.

Termination

When a component has performed the embodied services, the component instance is terminated. If a component is not terminated, when the component instance is generated on the component server this will persist indefinitely. As a result, the component server would become overloaded with used and no longer needed component instances. To avoid this components are terminated by having the implementing server close the respective component instance upon the occurrence of a suitable event.

This can occur, for example, automatically upon completion of the respective service. Previously this has been triggered by events such as hand off or completion of the services by the component instance. In this case, however, a component instance only persists for such time as it is necessary to perform its duty within the overall schematic.

However, there are a number of potential drawbacks associated with this.

In particular, once a component build is initiated, it is not possible to halt the process and repeat the implementation of some components to correct a mistake, if the components have already completed their task and terminated. In addition to this, there are occasions on which it is necessary to query components as to their current state. Further it is typical for a component to decompose a task into sub-components which completely hand-off from the parent, which in turn causes the parent, having delegated its task, to terminate.

Finally, by having components terminate automatically when they are finished providing a service can create difficulties in ensuring correct remuneration for the provision of the services.

In order to avoid this in one example, a component will not terminate until instructed to do so by a terminate command, which is typically received from a component at a higher level in a hierarchy. This functionality can be achieved by a termination component, an example of which is shown in FIG. 13. The termination component includes an agent In which is adapted to receive a notify message from other components in the respective schematic. The notify message is used to indicate to the terminate component that the component has finished its processing and is therefore no longer required.

In response to receipt of the notify message, the terminate component provides a termination order which be transferred to specified components as determined from the schematic. This will be transferred using similar mechanisms to purchase orders. Thus, the termination component may be implemented as a local primitive, causing the server implementing the component instance to transfer the terminate order to the servers implementing the components being terminated.

In addition to this, the terminate component may also operate to generate the termination order in accordance with predetermined rules. This may specify the time at which the termination order is to be sent, so that the component can complete its processing and transfer a notify message to the termination component, which then waits an appropriate amount of time, before generating the termination order.

Alternatively, this may be achieved in accordance with the external events, such that the termination component is responsive to the event to thereby cause the termination.

In addition to this, this provides a mechanism for remuneration within the system. In particular, remuneration is achieved by including some form of remuneration indicator or reference within the termination order. Accordingly, upon receipt of a termination order a component instance will operate to record the remuneration indicator allowing the entity to subsequently obtain remuneration in some manner. This will be achieved by presenting the remuneration identifier to an appropriate authority for payment, this may be achieved for example through the forum's bank.

In general, the termination component will operate to cause all the components within a respective level of a hierarchy in the internal schematic to terminate simultaneously. Thus for example, when a component is terminated, if that component includes a number of sub-components the termination component will typically provide termination orders to each of those sub-components substantially simultaneously. In this way, termination propagates through the schematic as processing is completed in an ordered manner.

Multi-Connection Functionality

An example of bundling has been previously described in our co-pending application PCT/AU03/01474.

In these forms of bundling, a known number of agents are bundled together to form a single bundled agent. The bundle agent can then be transferred to an agent on another component and subsequently de-bundled using a corresponding configuration of bundle components. It will be appreciated that in this sense, communication using the bundle of agents is achieved using an agent message whose payload is formed from a combination of payloads from agent address gathered by each of the bundle components.

When receiving an agent bundle, a component must be able to extract the agents contained therein and connect these to agents within the component as required. Thus, if a component is to correctly debundle an agent bundle, it must have knowledge of the agents included in the bundle, and the order in which the agents are provided, thereby allowing agents to be extracted from the bundle and connected to other agents as required.

To achieve this, agents are therefore typically bundled in a standardised manner, such that standard bundles having a fixed structure of agents are used. This allows predetermined arrangements of bundle components to be used in the formation and deconstruction of the bundles. Thus this can only be used in circumstances in which the number of input and output agents are predetermined.

However, in some examples it is useful to be able to provide bundling of a larger number of agents into a single agent for which the large number of individual components to support this number becomes impractically large.

Figure 17A:
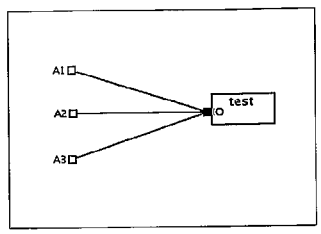
FIGS. 17A to 17E are schematic diagrams showing the use of nbundle components to provide many-to-one connections.

This may be used, for example, to connect a variable number of output agents to a single input agent, or vice versa, whilst still maintaining functionality corresponding to one-to-one connectivity. An example of this is shown in FIG. 17A.

In this example, it is desired to connect three agents A1, A2, A3 to a single IO agent of a test component. However, it will be appreciated that the use of three agents is shown for example only, and in other schematics, additional agents may be provided. Accordingly, if the test component is to be sufficiently versatile to be used in a range of schematics, the IO agent must be capable of being connected to an unknown number of agents. Thus, the test component must be able to receive a bundle of an unknown number of agents, and successfully deconstruct and interpret the bundle.

Figure 17B:
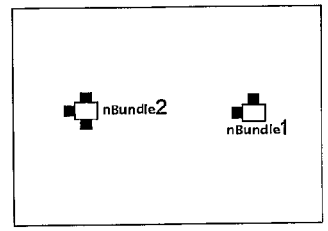

In one example, this is achieved using a modified form of bundle component, referred to generally as an nbundle component. Two examples of nbundle components are shown in FIG. 17B.

In this example, the nbundle component nbundle1 includes two agents, which notionally form an input agent and an output agent. This component is used to terminate a chain of nbundle components, as will be described below. Thus, the input agent is adapted to communicate with one of the agents A1, A2, A3, whereas the output agent is adapted to communicate with other nbundle components higher in the chain.

In contrast to this, the second nbundle component nbundle2 has three agents, which notionally form two input agents and an output agent. In this case, one of the input agents is coupled to nbundle components lower in the chain, whilst the other input agent is coupled to one of the agents A1, A2, A3. The output agent is coupled to other nbundle components higher in the chain.

Figure 17C:
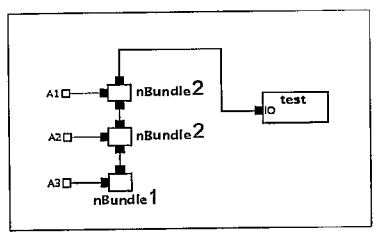

An example of how the nbundle components are combined to form a chain is shown in FIG. 17C.

In use, the operation of the nbundle components is similar to that of the bundle components previously described with a number of differences. Firstly, the nbundle components operate to block the input agents which are coupled to the agents A1, A2, A3, thereby preventing the agents A1, A2, A3 transferring any payloads to the nbundle components. This prevents communication directly between with the nbundle components and the agents A1, A2, A3 or any components associated therewith. Secondly, the nbundle components act to maintain a counter within the generated agent bundle, thereby allowing a component receiving an nbundle to determine the number of agents contained therein. The agent message is in the form of an XML file, and the counter is therefore provided as a numerical value within the file, which is identified by the use of an appropriate XML tag.

Thus, in use, the nbundle components work by collecting agent addresses of the agents being combined, starting at the bottom of the chain with the nbundle1 component. It will be appreciated by persons skilled in the art that the addresses of the agents A1, A2, A3 will be provided as part of the purchase order used to initiate construction of the nbundle components coupled thereto, as described in copending Patent Application Number PCT/AU03/01474.

Thus, the nbundle1 component will determine the agent address of the agent A3 and insert this into the payload of an agent message which is transferred to the next nbundle component in the chain nbundle2. At the same time, the nbundle1 component also provides an initial counter value "1" in the agent message, indicating that the agent bundle includes only a single agent at this time.

The agent message is transferred to the next nbundle2 component, which in this case adds the address of the agent A2, and increments the counter by "1", before transferring the agent message to the next nbundle component in the chain.

It will be appreciated from this, that the test component receives a single agent message which contains the address of the agents A1, A2, A3 and a counter value of "3".

Thus, from the perspective of the IO agent, it receives a single agent message to initiate communications, and therefore it appears as though a one-to-one agent connection is provided.

Figure 17D:
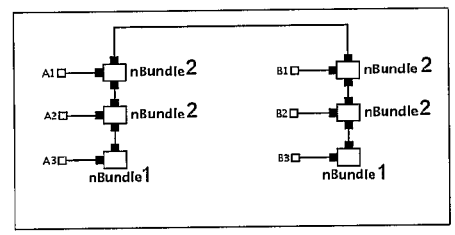

In use, the test component will implement some form of mechanism for extracting agents from the bundle. As will be appreciated by persons skilled in the art, this may be achieved using a corresponding arrangement of nbundle components, connected to respective agents B1, B2, B3, as shown for example, in FIG. 17D.

Figure 17E:
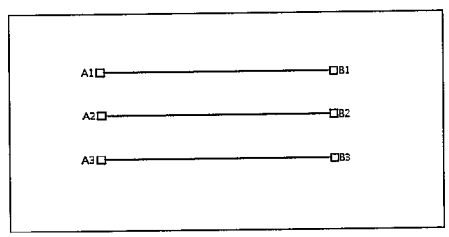

In this case, each of the nbundle components will exchange agent addresses, allowing the nbundle components to hand-off (using previously described techniques), so that the agents B1, B2, B3 and the agents A1, A2, A3 connect directly as shown in FIG. 17E. Thus, an nbundle component which receives an agent message corresponding to an agent bundle will operate to extract a first agent address therefrom, before transferring the agent message to the next nbundle component in the chain. During this process, the value of the counter is also decremented, allowing the last agent in the bundle to be identified.

In order to correctly generate the required chain of nbundles within the test component, it is necessary to be able to modify the internal schematic of the test component as it is implemented. It will be appreciated by persons skilled in the art that this can be performed in accordance with the counter value provided in the agent message received by the IO agent, thereby allowing the test component to generate a suitable chain of nbundle components, to thereby extract agents from the bundle as required.

This may be achieved via the use of selector agents and an example of this will now be described with reference to FIGS. 18A to 18E.

Figure 18A:
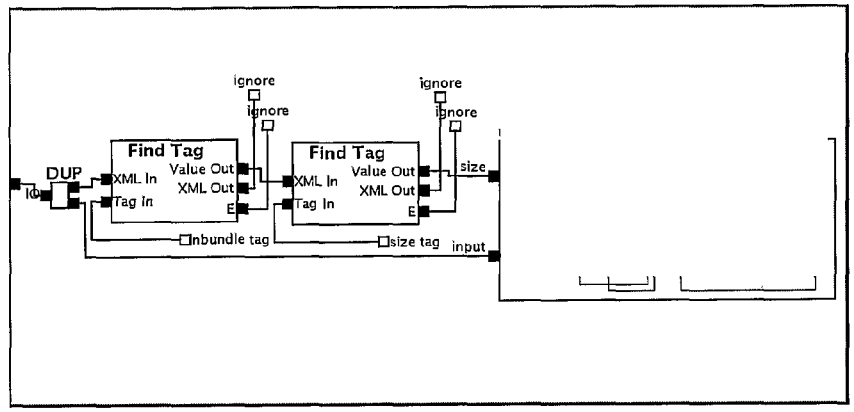
FIGS. 18A to 18C are examples of the internal schematic of the test component of FIG. 17C.

In particular, FIG. 18A shows an example of an internal schematic for the test component which utilises a DUP component, described above, and two Find Tag components, each having respective XML In, TAG In, Value Out, XML Out and error E agents. The internal schematic also includes a component labelled decision, having Size and Input agents, as shown.

In use, the two Find Tag components are connected to the DUP component, as well as nbundle tags and size tag agents as shown. The XML Out agent and the E agent are unused in this example, and as a result, are connected to internal agents of the internal schematic and which operate to allow the agents to connect with another agent and then terminate in the normal way.

In use, the agent bundle generated by the sequence of nbundle components shown in FIG. 17C is received at the IO agent shown on the left hand side of FIG. 18A. The agent bundle is transferred to the DUP component, which transfers copies of the agent bundle to the XML agent of the first Find Tag component and the Input agent of the decision component.

The Find Tag component receives the agent bundle, which is in the form of an agent message comprising an XML file. An indication of a specific nbundle tag contained within the XML file is received via the Tag In agent, and this is typically obtained from a look-up-table (LUT) or the like. The Find Tag component will operate to find the specified tag within the XML file, and transfer the value contained therein, via the Value Out agent to the second Find Tag component shown.

The second Find Tag component will operate to perform a similar procedure and receive a size tag from the size tag agent, which typically involves accessing an LUT. The size tag is provided within the value received from the first Find Tag component includes an indication of the counter value, which indicates the number of agents in the agent bundle. This value is supplied to the size agent of the decision component shown.

In use, the size agent is a selector agent which therefore operates to determine the internal schematic for the decision component in accordance with the size of the agent bundle. Thus, the incremented counter value contained within the agent message is extracted by the two Find Tag components and used to select a respective internal schematic for the decision component.

Figure 18B:
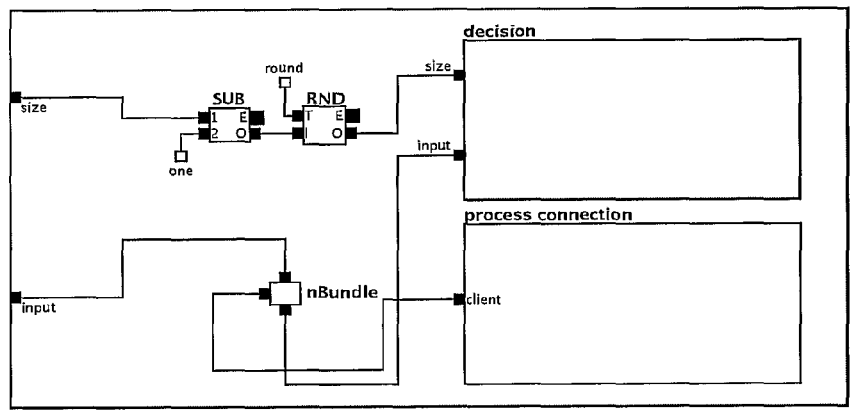

In the event that the bundle contains two or more agents, the internal schematic selected is as shown in FIG. 18B. In particular, the internal schematic includes a SUB component, a RND component, a nbundle2 component, a decision component and a process connection component, as shown.

In use, the agent bundle is transferred via the input agent to the nbundle2 component. The nbundle2 component operates to debundle the first agent in the hierarchy and transfers this to the client agent of the process connection component. Accordingly, in the example of FIG. 17C, the first agent corresponds to the agent A1 and this will be interconnected with the client agent of the process connection component. The remainder of the agent bundle is transferred to the input agent of the decision component.

Thus, this process operates to separate out the address of the agent A1, leaving the agent message with the address of the agents A2, A3.

Simultaneously, the size value received via the size agent is transferred to an agent 1 of the sub-component, which in turn operates to subtract a value, in this case "1", received at an agent 2. The resulting output value is transferred to the RND component via an agent O, and an agent I. The RND component operates to round the received value and transfer the resulting integer value from the output agent O, to a size agent of the decision component. It will be appreciated that this is required, as in this example, the SUB component generates a decimal value, whereas an integer value is required.

This is performed to indicate that an agent has been removed from the agent bundle, as described above.

Again the size agent on the decision component is a selector agent which will operate to select an internal schematic for the decision component, in accordance with the value presented at the agent size. It will therefore be appreciated that if the size of the agent bundle is still above one, then the decision component will be implemented using the same internal schematic, and will therefore operate as described above.

Thus, in this example, the address of the agent A2 is delivered to a further processor connection component, with the remainder of the agent bundle being transferred to a corresponding decision component.

Figure 18C:
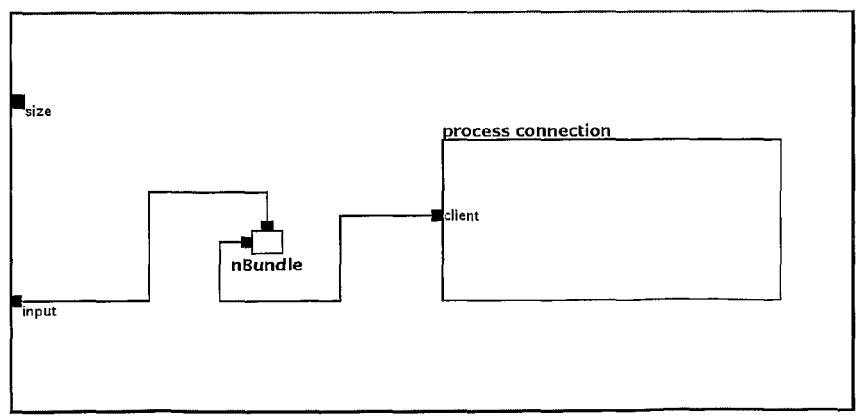

In the event that the size presented to the size agent is equal to "1", then the internal schematic of the decision component is as shown in FIG. 18C. Thus, in this case, the size agent remains unconnected and is only used for the purpose of selecting the internal schematic. The input agent is coupled to an nbundle1 component to allow the remaining agent A3 to be connected to the client agent of the process connection component.

Accordingly, it will be appreciated that the internal schematic of the test component and in particular, the repeated purchasing of the decision component, whose internal schematic is selected based on the number of agents in the agent bundle, allows any number of agents to be de-bundled successfully. This therefore allows a variable number of agents contained within a bundle to be presented to the IO agent of the test component, which then hands-off the agents to respective client agents of respective process connection components.

In use, the nbundle components will then hand off, such that the agents A1, A2, A3 connect directly with the respective client agents.

Thus, it is possible to utilise modified nbundle components to implement an agent bundle which includes a counter, thereby allowing the number of agents contained therein to be determined. This in turn allows a variable number of agents to be presented as a single agent, which in turn, effectively allows a number of agents to be connected to a single agent, as shown in FIG. 17A.

In addition to allowing simple nbundle chains to be produced, it is also possible to chain nbundle components in a hierarchical fashion to thereby implement an nbundle tree hereinafter referred to as an agent ntree.

Figure 19A:
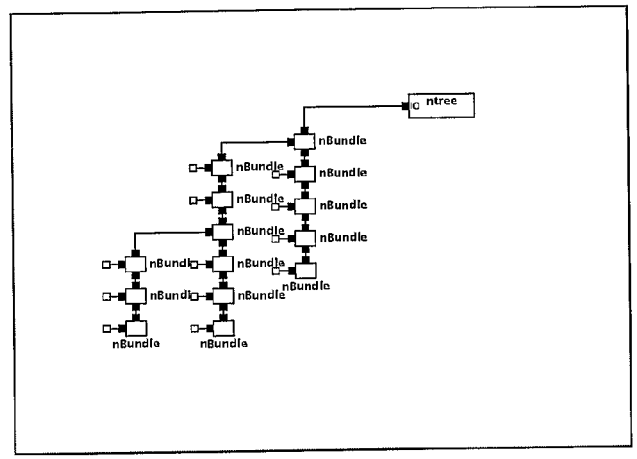
FIGS. 19A, to 19F are schematic diagrams showing examples of the use of an agent ntree.

An example of an ntree is shown in FIG. 19A. In particular, in this example, three nbundle components are interconnected in the lowest level of the hierarchy, six nbundle components are interconnected at the mid level in the hierarchy, and five nbundle components are interconnected in the highest level of the hierarchy.

In this example, the resulting final output agent is connected to an agent IO of an ntree component which operates to de-bundle the tree.

Figure 19B:
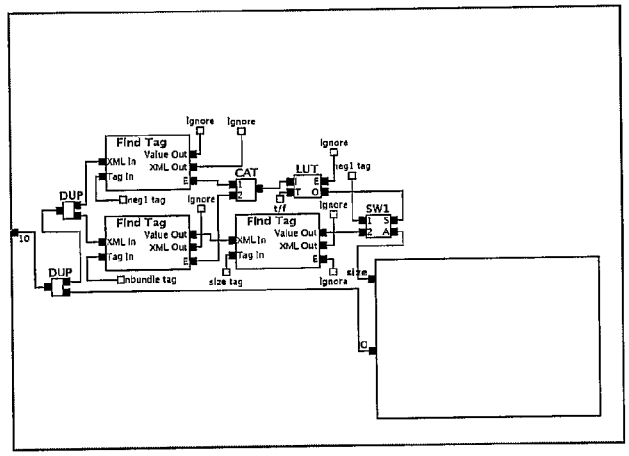

An example of the internal schematic of an ntree component is shown in FIG. 19B. In this example the internal schematic includes two DUP components, three Find Tag components, a CAT component, an LUT component, an SW1 component and an ntree component as shown.

In use, the agent tree is received at the agent IO and transferred to the first and subsequently to the second DUP components allowing to be triplicated. The agent bundle is transferred to first and second Find Tag components, as well as to an agent IO of the ntree component.

The first Find Tag component has an error agent E coupled to an input agent 1 of the subsequent CAT component which has a second input agent 2 coupled to the error agent E of the second Find Tag component. In use, error values provided by the error agents E are concatenated by the CAT component and transferred to an input agent I of the LUT component.

An output agent O of the LUT is coupled to an input agent S of the component SW1, with an input agent 2 being coupled to the value out agent of the third Find Tag component.

Operation of this internal schematic is as follows. In particular, the agent ntree provided to the first Find Tag component, is parsed to determined the presence of a neg1 tag, determined from a neg1 tag agent, as shown. The value contained within the neg1 tag and the XML determined are ignored, with an error value E being transferred to the cat 1 agent. If the neg1 tag is present, a TRUE value will be provided to the CAT component, whereas if the neg1 tag is accessed, a FALSE value will be provided.

This represents whether the agent to be processed represents an agent which requires extraction from an nbundle, as from which will occur at the end of a chain.

Accordingly, if the received agent ntree corresponds to the ntree generated by the component combination shown in FIG. 19A, then a FALSE value is returned.

Similarly, the second Find Tag component operates to search for the nbundle tag which indicates whether the agent to be processed forms an agent ntree, and indicates a TRUE or FALSE output. In this case, a TRUE value is returned.

If the agent is an agent ntree, then a value is determined and transferred to the third Find Tag component, which operates to search for a size tag and transfer the determined size value to the switch component SW1. The size value represents the size of the respective chain in the ntree, which in this case is the first chain, as described above.

It will be appreciated that the presence of the neg1 and nbundle tags is exclusive, so that the resulting concatenation will either be FALSETRUE or TRUEFALSE. In this example, the LUT component operates to convert a TRUE-FALSE or a FALSETRUE concatenation into TRUE or FALSE values respectively.

The switch component SW1 operates to examine the TRUE/FALSE value. In the event that a TRUE is determined, then this indicates that the received agent is to be processed, and the value neg1 is to be transferred from the input agent 1 to the output agent A. Otherwise, the size value received at the input agent 2 is transferred to the output agent A.

As in the previous examples, the size agent on the ntree component is a selector agent which is used to select the internal schematic of the ntree component.

Figure 19C:
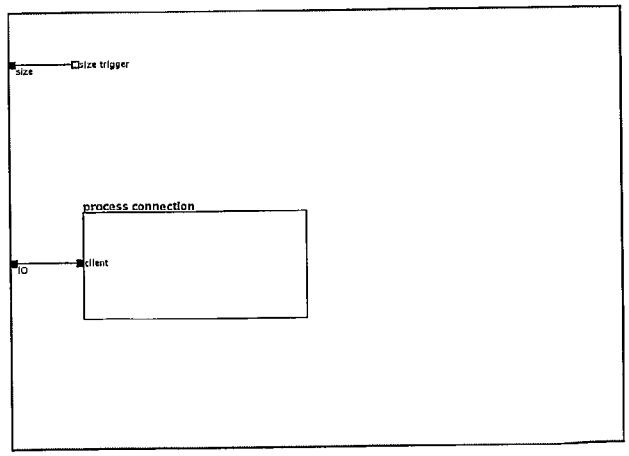

In this instance, if the size value received corresponds to a neg1 value, this indicates that the next agent is to be processed, and accordingly, the internal schematic shown in FIG. 19C is selected, allowing the agent to be connected directly to the process connection component. This is achieved in a manner similar to that described above, with hand-off of intermediate components being performed as required.

Figure 19D:
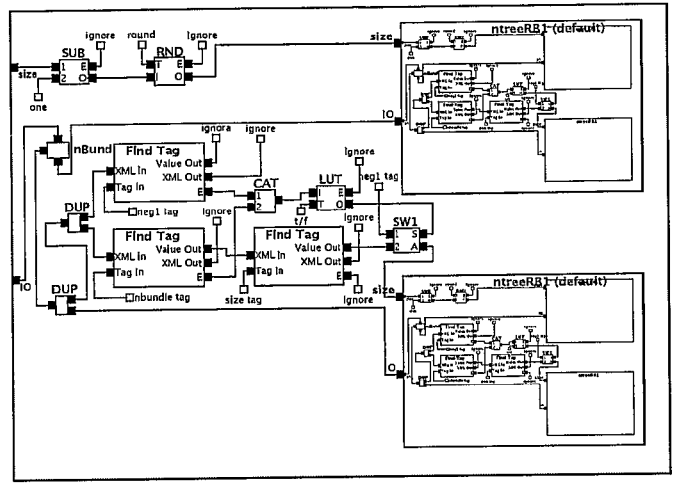

In the event that the size value received is greater than one, then the internal schematic selected is as shown in FIG. 19D.

In this instance, the agent ntree is transferred from the IO agent to an nbundle component, which extracts an agent, which is transferred to the first DUP component, and hence to a further DUP component, three Find Tag components, a CAT component, an LUT component and an SW1 component, which are in the configuration described above with respect to 19B.

It will therefore be appreciated that this operates to examine the extracted agent, and determine if this is an agent to be processed, a further part of the agent ntree, which in this case will the second level in the ntree hierarchy. In the former case, the operation is as described above with respect to FIG. 19C, whereas in the second case, this is used to determine a value which is used to select an ntree component internal schematic as currently being described.

In addition to this, the next part of the chain, which in this example, is the next agent in the highest level in the hierarchy, is extracted and transferred to the IO agent of a subsequent ntree component as shown. In addition to this, the received size value is reduced by one and rounded to an integer by the SUB and RND components. This size is again used to select a respective internal schematic.

In the event that the size value is "1", this indicates that this is the final agent of the agent ntree to be considered. Accordingly, the size agent selects the internal schematic shown in FIG. 19E.

In this case, the schematic operates to extract the final agent and determine if this corresponds to an agent to be processed, or a subsequent level in the hierarchy.

Figure 19E:
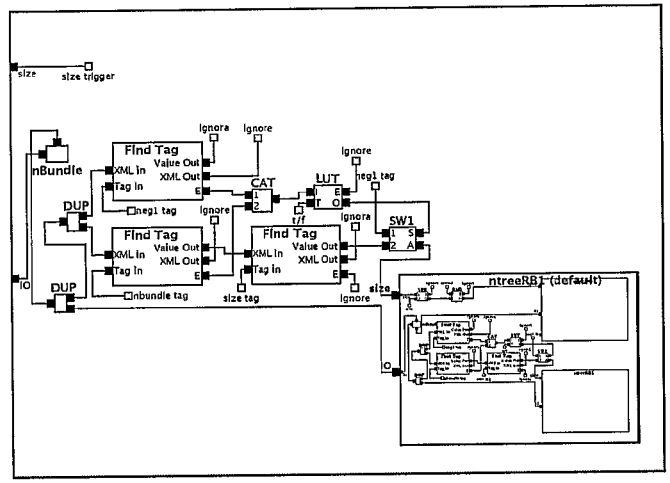

In the event that the agent is another level in the hierarchy, the size of the selected chain is determined, so that the internal schematic of the ntree component is the internal schematic shown in either FIG. 19D or FIG. 19E. Otherwise the internal schematic shown in FIG. 19C is selected and the agent is processed.

Figure 19F:
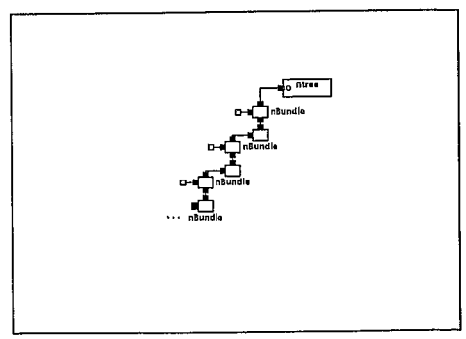

As shown in FIG. 19F, it is possible to hide unlimited additional connections in a single bundle which can then be handled by use of appropriate selector agents provided on an internal command component of a suitable component for handling the bundle. Thus, this allows many to one, one to many, or many to many connections, having variable numbers of agents to be implemented.

When a component supports ntree connections another component with a single agent to the connection can exploit a property of the ntree to create new connections as and when needed using internal processing. It is important to note that any dynamic extensions to a given nbundle chain will be labelled processing on the given nbundle chain until such time as the chain is complete.

Thus, while it is not possible to dynamically extend a given nbundle chain to achieve new connections as needed, it is possible to supply a complete bundle chain of two agents one of which is used for processing and the other reserved in case other connections are needed.

In the case when another connection is needed the process is repeated in that a complete two agent nbundle chain can be attached to the unused input again allowing one agent to be used for processing and reserving the other for further expansion as detailed in FIG. 19F.

Persons skilled in the art will appreciate that numerous variations and modifications will become apparent. All such variations and modifications which become apparent to persons skilled in the art, should be considered to fall within the spirit and scope that the invention broadly appearing before described.

Multi-Point Connections

In most of the examples described above each agent is adapted to interconnect with only one other agent. In this example, if multiple connections are required, this is achieved by way of bundling.

However, as an alternative to this, a multi-point connection agent can be provided which is capable of interconnected with a number of different agents simultaneously.

Figure 20A:
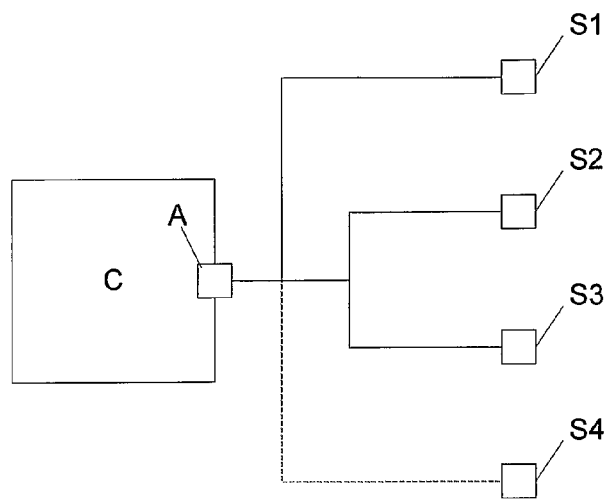
FIGS. 20A to 20C are schematic diagrams showing examples of multi-point connections; and, FIGS. 21A to 21C are schematic diagrams showing examples of server construction.

An example of this is shown in FIG. 20 in which a first agent A of component C is adapted to selectively interconnect with a number of agents S1, S2, S3, S4.

In order to achieve this when an agent is interconnected with two or more other agents in a schematic, the agent is defined as a multi-point agent. This may be achieved by way of options that will be described in more detail below, and the component supplier can therefore select whether an agent in a single or multi-point agent.

In any event, an agent is modified to allow the agent the receive messages from a number of different agent addresses as required. To achieve this, the purchase order received by the component C includes addresses of the agents to which the agent A is to connect. Thus, for example, if the purchase order includes the addresses of the agents S1, S2, S3, this will cause the agent A to provide multi-point connectivity, thereby allowing the agent to exchange messages with each of the agents S1, S2, S3.

The manner in which the agent A interacts with the agents S1, S2, S3 will depend on the functionality of the respective component as will be appreciated by a person skilled in the art.

In the event that an additional agent S4 needs to be added during a build process, a separate protocol is required as the purchase order for the component C has already been acted upon by the component. Accordingly, an additional purchase order or other suitable message must be transferred to the component server implementing the component C to allow the additional agent address to be added to the agent list associated with the agent A.

This may be achieved either by transferring the message via the root server. However, the address of the agent A may not be known by the component implementing the agent S4, and so alternatively the message can be transferred via intervening components during the build process.

Figure 20B:
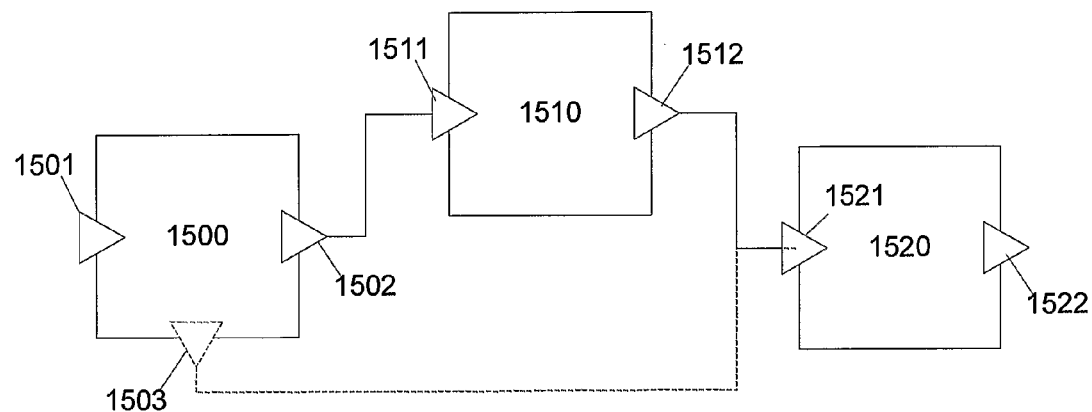

An example of this will now be described with reference to FIG. 20B. In this example a schematic is initially constructed with three components 1500, 1510, 1520, each having respective input and output agents 1501, 1502; 1511, 1512; 1521, 1522. In this example, the agents are represented as triangles allowing directionality to be implied.

In any event, in this example, the component 1500 is coupled to the component 1520, via the agents 1502, 1511 and 1512, 1521. Once the build in is in progress and component servers corresponding to each component 1500, 1510, 1520 have been constructed, the component 1500 may determine that a direct connection to the component 1520 is required.

In this case, the component 1500 generates a new agent 1503 having a corresponding address. The component 1500 generates an agent message, which is transferred to the component 1510, who forwards this to the component 1520. The component 1520 receives the request and determines that the agent 1521 is to connect the agent 1503. Accordingly, the component 1520 will modify the agent to allow multi-point connectivity to be performed, and provide details of the address of the agent 1503. This allows the agents to interconnect as shown by dotted lines.

Ordering

In one example, an agent can operate by communicating with different agents in turn. Accordingly, if an agent is to connect to many other agents, it is necessary to ensure that communication is performed in an appropriate order.

For example, if a number of agents each produce code fragments which are then sent to a single agent to allow the code fragments to be combined by an appropriate component, it may be necessary that the code fragments are received in a particular order.

Figure 20C:
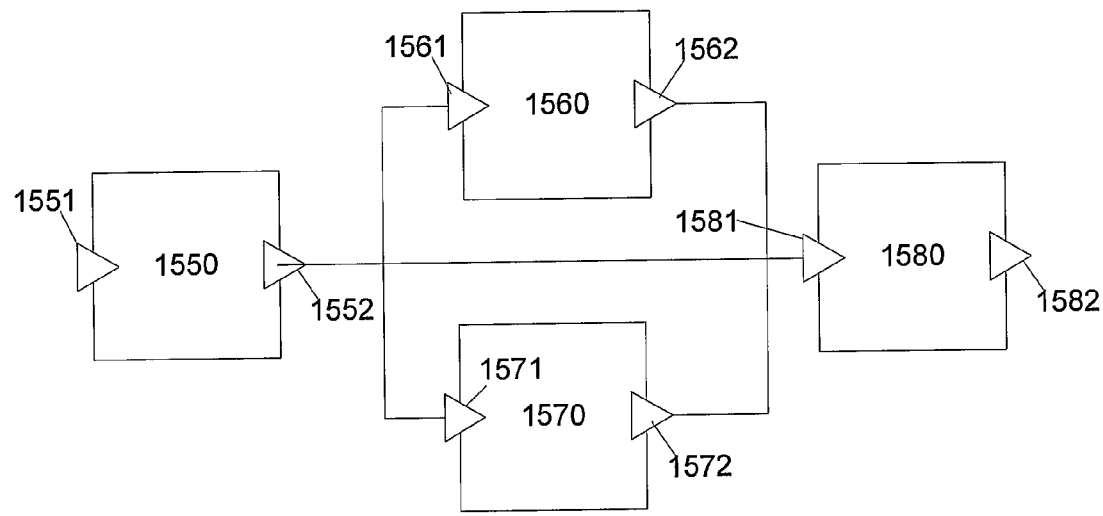

The ordering may be implicit within the construction of the schematic. An example of this is shown in FIG. 20C. In this example, four components 1550, 1560, 1570, 1580 each having respective input and output agents 1551, 1552; 1561, 1562; 1571, 1572; 1581, 1582 are connected as shown.

In any event, in this instance the component 1550 provides an output to each of the components 1560 and 1570. As a result of this, there is implicit ordering in the communication between the components in that 1550 will have completed its task and provided an output to the component 1580 prior to either to the components 1560, 1570 being implemented. Accordingly, in this instance the agent 1581 is adapted to receive a message from the agent 1552 prior to the agents 1562 and 1572. Thus, this series arrangement of the component 1550 with respect to the components 1560, 1570 provides implicit ordering.

In contrast, each of the components 1560, 1570 could implement a respective data manipulation services in parallel thereby providing output to the agent 1581 simultaneously. To prevent this happening some form of ordering may be implemented for example as part of a negotiation process during the build.

Multi-Point Negotiation

When a multi-point agent is negotiating with a number of different agents this could be done of any one of a number of manners.

For example, this could be done by negotiating with each of the agents in turn. So, in the example described above in FIG. 20B, the agent A could first negotiate with the agent S1 and establish a negotiation position. In this instance, the agents S2, S3 may be forced to adopt this negotiation position. Alternatively, agent A could determine a number of remaining negotiation positions with the agent S1, allowing negotiation with the agent S2 to be based on the remaining negotiation position.

In either case, the result of a previous negotiation may prevent a subsequent negotiation position being agreed. To avoid this occurring, it is desirable in some cases to perform negotiation with a number of agents simultaneously, thereby allowing a common negotiation position to be reached which is common for all of the agents. It will be appreciated that can be achieved using a modified form of the algorithm described above.

It will be appreciated that the negotiation process may be used to control ordering, by including a preferred communication order indication as a negotiation position.

Additionally the negotiation process may be influenced by ordering. In the example in FIG. 20C, then there may be a reason for establishing a negotiation position between the components 1550, 1570 prior to establishing a position between the components 1550, 1560, for example to allow certain context dependencies to be provided.

For example, if there is a higher degree of context dependency between the component 1550, 1570 then it may be advantageous to performed communication between these components prior to before between components 1550, 1560.

In order to achieve this, the negotiation process may reflect the degree of context dependency which can be achieved with each other component in the multi-point connection, allowing negotiation to be performed on the basis of this result. It is also possible to define coordinated groups so that for example an agent may transfer a message to all agents in a first group simultaneously and then a second message to all agents in the second group simultaneously. It will be appreciated that this can be implemented by grouping agents addresses in the purchase orders or by performing appropriate negotiation.

Order in this embodiment is determined by the parent since the parent establishes the links between sub-component's agents. Each agent receives a list from the parent at purchase time with the order established. It is the parent's responsibility to provide the link information and hence the order.

Component Server Construction

In general, each component is implemented utilising a component server which is formed from executable software hosted by a suitable processing system, as previously described. The purpose of the component server is to allow a component instance to perform the desired data manipulation service, which may typically include generating a code fragment.

As each component server is itself formed at least partially from executable code, it can be generated utilising a suitable schematic, which when built creates the code needed to implement some or all of the required data manipulation operations for the component. The construction of the component server may cause the component to be implemented either automatically, or manually by presenting a suitable GUI to an operator, and may involve the use of one or more sub-components to perform at least some of the required functionality.

In general, the construction of a server may involve two different types of implementation, as will now be described, although in practice the two techniques are generally provided in conjunction, as will become apparent from the description.

In the first implementation, the component server may operate by building a suitable schematic each time a component instance is to be performed. In this instance, the component server will therefore be in the form of an executable program which causes a suitable schematic to be loaded and built. This allows the component server to select and implement sub-components on a per use basis, so that an appropriate selection of sub-components suitable for the parent component context is implemented each time the parent component is implemented.

This provides a significant degree of flexibility for the component as it allows different schematics and components to be used depending on the context, and other factors. This flexibility can be incorporated into the schematics by using appropriate selector agents and non-code-producing processing components as previously described. Thus the server merely interprets the schematics to implement each parent component. However, a disadvantage of this technique is that a lot of the processing is sub-contracted which not only increases the cost of implementing the component but increases the time as well.

As an alternative to this, a component server can be formed from an executable program that is capable of providing the desired processing natively to thereby achieve the required flexibility. Such a component server is therefore created by constructing a schematic which can create executable code embodying the required functionality. This allows the component server to be created by building a schematic a single time and then executing the resulting code each time the component is used in a build process. This reduces the need for non-code-producing sub-components to be purchased on a multiple repeated basis.

However, in order to provide the desired range of functionality, it is typically necessary for the server to incorporate a variety of implementation options within the executable code. This can be used for example to allow the component to deliver context dependent code fragments, or the like as has previously been described.

As will be described in more detail below, in practice a combination of the two approaches is used, with a large part of the server being implemented as executable code, and with sub-components being implemented as required. However, for the purpose of clarity, the following examples, set out with respect to FIGS. 21A to 21C will focus on limit cases in which the server is formed either by building a schematic each time it is implemented, or by constructing code in a single build process, which can then be subsequently executed as many times as required.

Figure 21A:
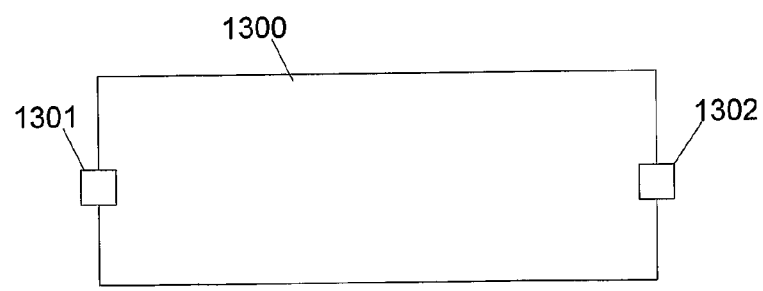

In this example, the purpose is to build a component server for providing a component which when implemented generates an instruction for adding two numbers. Accordingly, a representation of the ultimate component to be implemented by the server is shown in FIG. 21A. As shown the schematic includes an add component 1300 having a negotiation input 1301 and a code agent 1302.

When used in a build, the add component is adapted to provide a different add instruction via the code agent 1302 depending on the results of negotiation performed with one or more other agents.

Figure 21B:
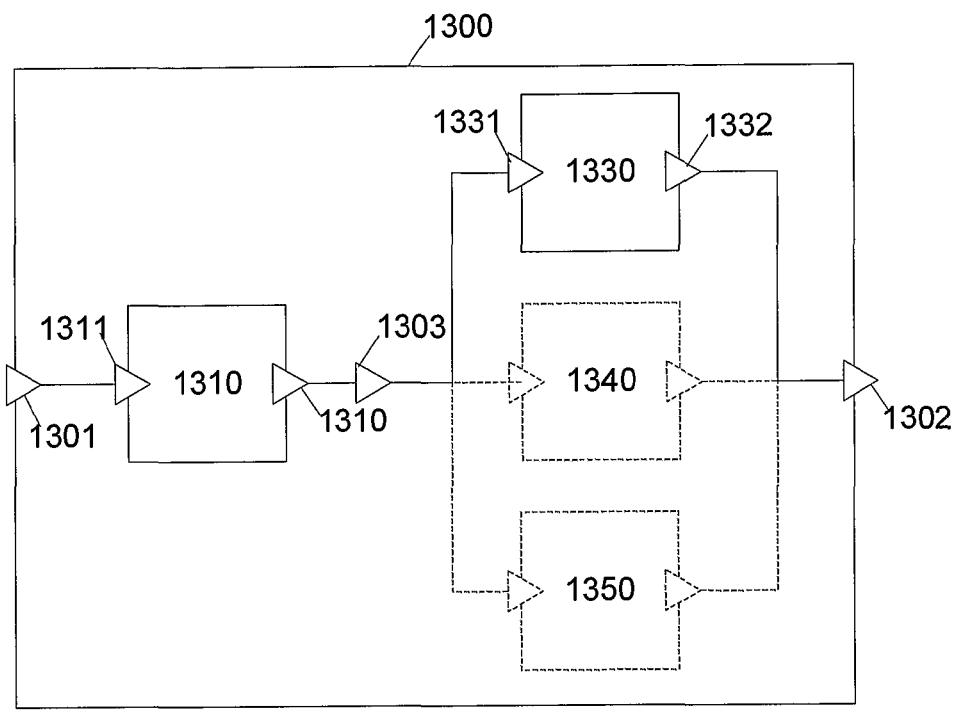

If this is to be implemented by sub-components that are implemented each time the component is to be implemented, the component server can be represented by the schematic shown in FIG. 21B.

The add component 1300 includes a number of sub-components including a negotiate sub-component 1310 having a negotiation agent 1311 coupled to the negotiation agent 1301, and a result agent 1313. The result agent 1313 is coupled to a selector agent 1303 which is in turn selectively coupled to one of three add instruction sub-components 1330, 1340, 1350 which is built on demand.

In use, when the add component is purchased, the schematic shown in FIG. 21B is implemented allowing the negotiation component 1310 to perform the negotiation and select a corresponding one of the add instruction components 1330, 1340, 1350 based on the results of the negotiation. In this example, the selector agent selects the add instruction component 1330, which generates an add instruction based on the results of the negotiation received via agent 1331, transferring the code fragment via the agent 1332 to the code agent 1302.

It will be appreciated from this that each time the code is to be generated, the negotiation component 1310 is used to select an appropriate negotiation position and provide an output. This is therefore a processing component that produces a result which is then used to purchase a selected one the three add instruction components 1330, 1340, 1350 which generate an appropriate add instruction. Thus, in this example, the sub-components 1330, 1340, 1350 are code generating components.

In contrast to this, if the add component server is to be implemented wholly as executable code, then an example of the schematic used could be similar to that shown in 21C.

In this example, the schematic 1400 representing the add component includes an algorithm component 1410 having a list input 1411 to couple to an internal list agent 1401. The algorithm component includes a code output 1412 coupled to an component 1450, via an input agent 1451. Three add instruction components 1420, 1430, 1440 have output agents 1422, 1432, 1442 coupled to the input agent 1451. The component 1450 includes an output agent 1452 which is coupled to an input agent 1461 of a build component 1460, which in turn includes an output 1462 coupled to an internal output agent 1402. Two agent components 1470, 1480 and a server code component 1490 have respective output agents 1472, 1482, 1492 coupled an input agent 1463 of the build component 1460, as shown.

In use, when the schematic is built, a series of purchase orders, or other messages, are generated and transferred to the entity stations which are to implement the respective components 1400, 1410, 1420, 1430, 1440, 1450, 1460, 1470, 1480 and 1490. The purchase orders include addresses of the agents to which each component is to connect. Accordingly, each of the entity stations 5 will execute appropriate code to generate a component server, which operates to provide the required functionality.

The component server will include appropriate agents, which generate messages to establish communication with corresponding agents generated by the other component servers. A process of negotiation is performed between the components 1410, . . . 1490, similar to that described above, and which is not described for clarity, to allow the components 1410, . . . 1490 to determine a context.

The algorithm component 1410 will operate to receive a list representing negotiation positions, via the list agent 1411, from the internal list agent 1401. The negotiation list represents the negotiation positions which are to be provided by the end add component 1400. The negotiate component 1410 then generates a code fragment which is provided via the code agent 1412 to the component 1450. When executed, the code fragment will implement the negotiate algorithm described above allowing negotiation to be performed on the basis of the list.

The add instruction components 1420, 1430, 1440, operate to generate add instructions and transfer these to the component 1450. The component 1450 generates a code fragment which, which when combined with the binary code output by each of the other components, and executed, will allow the add component 1300 to select an appropriate one of the add instructions, based on the result of the negotiation. This may therefore be considered analogous to a binary instruction for implementing an if type statement, but implemented as an instruction.

Additionally, the agent components 1470, 1480 operate to generate code, which when executed will implement agent functionality. In this case, each agent component 1470 will generate unique code for each agent depending on the properties the agent is to have. It will be appreciated that this is achieved by having the agent components determine their context during the negotiation process. Thus, for example, the agent component 1470 may determine that it is to provide the agent functionality for the negotiation agent, by negotiating with the build component, and generate a custom code fragment on that basis.

Similarly, the server code component 1490 generates any other code fragments required to complete the code required to build the component server.

The agent and server code fragments are provided to the build component 1460, which operates to combine the code fragments and provides the resulting code to the internal agent 1402. The resulting code, which forms the complete executable server, is made available to the purchaser, allowing them to execute an add component server which operates to generate an add instruction based on the results of a performed negotiation.

The above example represents an over simplification of the process of server construction in that typically many more components would be used. Thus, for example, the server code component 1490 is useful for the purposes of the example, but would in practice typically consist of many of components which have been specifically selected for the purpose of building code used in implementing the component server for the add component 1300. Thus, whilst the component 1490 could, in theory, be a single component which generates a basic server code fragment, typically far more efficiency and optimisation of the generated code will result if a custom code fragment is generated by the use of an appropriate combination of selected components.

Similarly, each of the components 1410, . . . 1490 will also typically be a number of components in a suitable arrangement, and consequently the schematic may typically include hundreds of components. It will be noted that the same may also be true in the example above in FIG. 21B, as each of the components shown in the example may represent a number of components, or be formed by implementing sub-components.

Figure 21C:
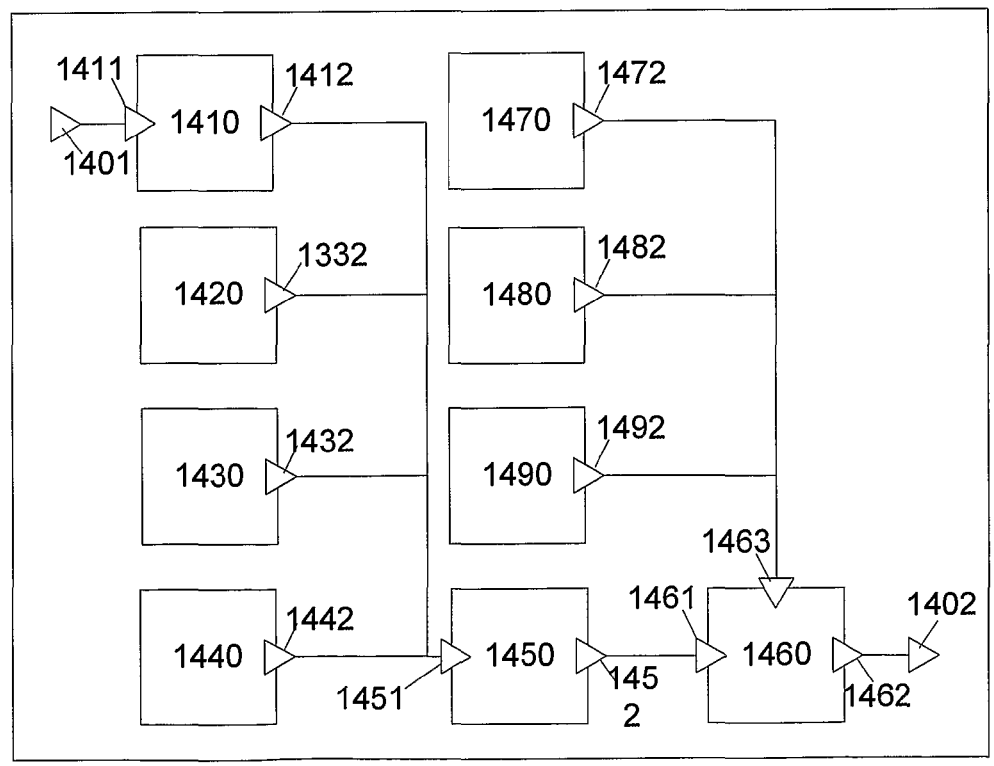

In any event, in the second example shown in FIG. 21C, each of the components is purchased a single time, with the result being executable code which is capable of receiving a list of negotiation positions, providing a response to complete negotiation, and then outputting an appropriate add instruction. Accordingly, this implements the functionality required by the add component 1300 shown in FIG. 21A entirely as executable code.

A point to note in the examples above is that although the second example uses only code generating components, this is for the purpose of clarity only, and to highlight the difference of the approaches that may be used to provide components. In practice, a schematic may include a range of both processing and code generating components. Thus, for example, negotiation in the second example of FIG. 21C could be implemented by having negotiate components provided in the schematic, to allow negotiation between the components used to generate the code. These negotiation components could be processing components, but would only be implemented once during the server build, and not each time the server is executed.

In any event, the above example is simplistic, and typically the range of different add instructions that need to be catered for by the end component server may need to be far larger, therefore requiring a significantly greater complexity to the schematic needed to create the component server.

In the above example, the resulting component server uses a decision process to generate the range of add instructions. In practice, the number of decisions that need to be implemented within a schematic will be far higher, and if the decisions are dependent on each other, as will typically be the case, this can form a decision tree structure within the internal schematic.

In this case, each branch in the decision tree represents a variation in the resulting code fragment generated by the component server embodied in the schematic. Each branch is formed from a respective sequence of components, which when implemented generate a code fragment which when executed as part of the resulting server executable code, allow the server to provide certain functionality.

This therefore provides a mechanism for allowing the server to implement a range of different functionalities, such as generating a range of different code fragments, which in turn allows the server to provide context dependency, options (which will be described in more detail below), or the like.

An additional effect of this is that the complexity of a server can be increased by adding additional branches, in the form of additional component sequences, into the schematic. This allows component suppliers to initially use even relatively simple schematics for constructing servers, although the resulting components will only embody limited functionality, or the ability to handle a few contexts.

However, as the entity adds to the complexity of the server schematic, for example as they gain additional knowledge regarding the functionality the component is providing, they can modify the original schematic by adding additional sequences of components, and effectively adding a branch to the decision tree. This allows component servers to be developed incrementally, thereby helping the degree of specialisation that can be achieved, which in turn helps further optimise the code fragment generated by the component when it is used.

As also mentioned above, server implementation would typically use a combination of the approaches shown in FIGS. 21B, 21C, by having part of the server schematic build each time the server is executed, and by having other parts formed from executable code generated as described with respective to FIG. 21C. this can be used to allow parts of the server functionality to be achieved by building an internal schematic, or even implementing sub-components individually, either each time the server is implemented, or only in required circumstances.

This may allow custom functionality to be provided in the event that an option, negotiation position, or other context is defined which the end server cannot implement, and which requires a custom schematic to be built. This is also used to allow the functionality of sub-components to be incorporated into the server, without requiring any knowledge of how the sub-component is implemented.

Thus, in the case of the add component above, the add component supplier generating the add component server may discover that they can only create executable code that can generate add fragments in limited contexts. In this case, a third party specialist supplier or suppliers may be called upon to deliver one or more specialised sub-fragments, through the use of appropriate sub-components, which when properly combined assist in providing a add instruction solution in specialised contexts.

To achieve this, the add component supplier designs the schematic of the server such that when the resulting server code is executed, the code will operate to determine if the context is a specialised context. In this case, the server code generates a purchase order or other appropriate message, and uses this to request implementation of one or more of the specialised sub-components. This ties the sub-component into the system such that they too may discover their more lowly context. This allows the add component server to extend its flexibility by utilising the flexibility afforded by the sub-components both directly, by contracting a sub-component, and indirectly though selection of one specialised sub-component over another.

Accordingly, the executable code embodying the component server performs processing to determine if sub-components are required, and if so, then operates to generate purchase orders, and interact with the generated sub-components, as necessary.

In this example, whether or not the specialised add component is purchased is a decision made by the component server, and will therefore typically correspond to a respective branch on the decision tree. Accordingly, different branches may include different sub-components, thereby ensuring that sub-components are purchased only as required, for example depending on the context.

In addition to implementing sub-components, a similar technique also allows internal schematics to be used to allow combinations of sub-components to be implemented. In this case, the internal schematic used could again be selected on the basis of a decision tree implemented by the server code. This therefore corresponds to incorporating selector agent functionality described above as internal native processing within the server code.

By applying this specifically to code generation, it will be appreciated that low level components can operate to generate extremely efficient instructions, for performing specific tasks, in a context dependent manner, to thereby optimise the efficiency of the instructions. Higher level components use these highly flexible specialised instructions, and by modifying or combining them with other instructions, form more complex solutions in a wider range of contexts while still delivering highly optimised code.

Higher in the server hierarchy, it is thus possible to deploy servers of arbitrary size by drawing on the flexibility and specialist capability of the supply chain of components that permit a deeply integrated efficient solution.

Options

In order to increase the flexibility of components, component suppliers may allow a number of options to be implemented as part of the component, thereby vastly increasing the range of functionality provided by the component.

Options may be any one of a number of forms and may be predefined or undefined depending on the component suppliers preference. An option allows a purchaser of a component to specify certain details regarding the component's operation.

Thus for example, if a component includes an input the component supplier can specify a number of options regarding different types of data that can be received via the input, such as allowing the input to receive a fixed length string or an undetermined length string.

In order to achieve this, the component supplier must implement their component server in a manner suitable for providing the options which are to be available to the end user. Thus, it will be appreciated that the component server may typically need to embody a range of different implementations, which can be achieved using a suitable decision tree structure, as discussed above in the component server construction section.

In any event, details of the available options can be defined as part of the specification. As a result, when a user loads a selected component into a schematic, and attempts to configure available options associated with the selected component, this will signal to the entity supplying the selected component that options are to be defined. This in turn allows the entity to provide details of available options, and make suitable arrangements for implementing these.

This is typically achieved by executing a component server corresponding to the selected component. When the user indicates options are to be defined, this signals to the component server, which causes a dialogue box to be presented to the user detailing the available options. When the options have been selected the component server effectively creates a new component based on these options, returning a specification for the new component to the user, allowing the new component to be provided in the schematic. Changes to the component may include resizing, or colour format, more or less agents, renaming or so on.

It will be appreciated by a person skilled in the art that the option selected by the user will influence the manner in which the component is implemented and will therefore influence the resulting executable code fragment generated by the respective component.

From this it can be seen that the provision of component option is to some extent analogous to defining additional negotiation positions. In this instance however instead of having the negotiation controlled by the components themselves, the options are set by a user. This therefore allows a user's requirements for the system to be taken into account.

It will be appreciated that as the component options are selected by the purchaser of the component, then in a hierarchical arrangement a component will be responsible for setting the options associated with any sub-component.

A further feature which will be appreciated by the person skilled in the art is that options can be left undefined by the component supplier. In this instance, this allows operators to define functionality required by the component.

An indication of this can then be transferred to the component supplier allowing the component supplier to arrange for a suitable suggested implementation. This will typically be achieved in a stage prior to construction by performing a partial discovery to determine the context before suggesting a suitable configuration to the purchaser. While this would typically require a manual intervention, some or all of the process may be automated by accessing a prepared table of suggestions based on the determined context Protocol Update In order to provide additional security for component providers, it is possible to provide a protocol update system. In this instance, this allows the communication protocols used by components to communicate, such as the format of agent messages, and purchase orders, as well as any encryption, or the like, to be updated. This can be used to provide security by preventing attacks on component servers and the utilisation of fraudulent purchase orders in an attempt to reverse engineer the functionality of an individual's provided component.

In order to achieve this, the component schematic used in creating a component server includes a protocol component which generates a code fragment defining the communications protocol used.

When implementing a protocol update the protocol and hence the protocol components are updated. The protocol components are only distributed to authorised users of the system thereby restricting communication to authorised users.

When a component supplier receives an updated protocol component the component supplier can update the schematics representing the component server by incorporating the new protocol component and rebuilding the component server.

As an alternative to modifying the schematic each time the protocol is updated, the protocol component used in the schematic could automatically access a secure server to obtain details of the latest protocol each time the server is built. As a result, when the component server is built, security is embedded as part of the executable file this vastly reduces the security of the servers and helps reduce attacks and attempts at fraudulent transactions over the forum.

A further alternative is for the component supplier to construct two stage schematic, one stage of which provides code for protocol interpretation, with the other stage providing the remaining server functionality. In this case, it will be appreciated that only the protocol part of the schematic needs to be rebuilt with the resulting executable code simply being written over the previous protocol interpretation code in the server program. In this manner a dynamic protocol can be provided. This allows the protocols to be updated at periodic intervals, such as each day or week as well as to allow updates and improvements to the protocol.

To allow components to function correctly in the event that an update has not been received an overlapped period may be provided where two protocols are running simultaneously this will also allow any pending jobs to complete if a protocol update has occurred part way through a build.

Context

As described previously, the context of a component is used to control the manner in which the component can be used to perform its particular function. This can therefore correspond to generating different binary code representing a different instruction each time the context is different. Alternatively, it may constitute loading a different internal schematic when implementing a component.

In either case, with the component communicating with its counterparts via appropriate agents, this allows the component to discover the information it needs to support its implementation. This context can include a range of different factors and aspects, including for example:

the presence of more than one of the supplier's own components in the schematic, which may influence the resulting code fragments of some or all components of this type;
the presence or absence of other components in the schematic;
specific requirements for the particular context;
agreements with other components;
options defined for the component;
location and availability of resources; and,
the target environment on which the executable will be run.

Persons skilled in the art will appreciate that numerous variations and modifications will become apparent. All such variations and modifications which become apparent to persons skilled in the art, should be considered to fall within the spirit and scope that the invention broadly appearing before described.

APPENDIX A

Two specific examples utilising the concepts described above will now be described in more detail.

First Specific Example

An example of the use of multi-stage transactions to allow a countdown counter to be implemented will now be described with reference to FIGS. 14A, 14B and 14C.

Figure 14A:
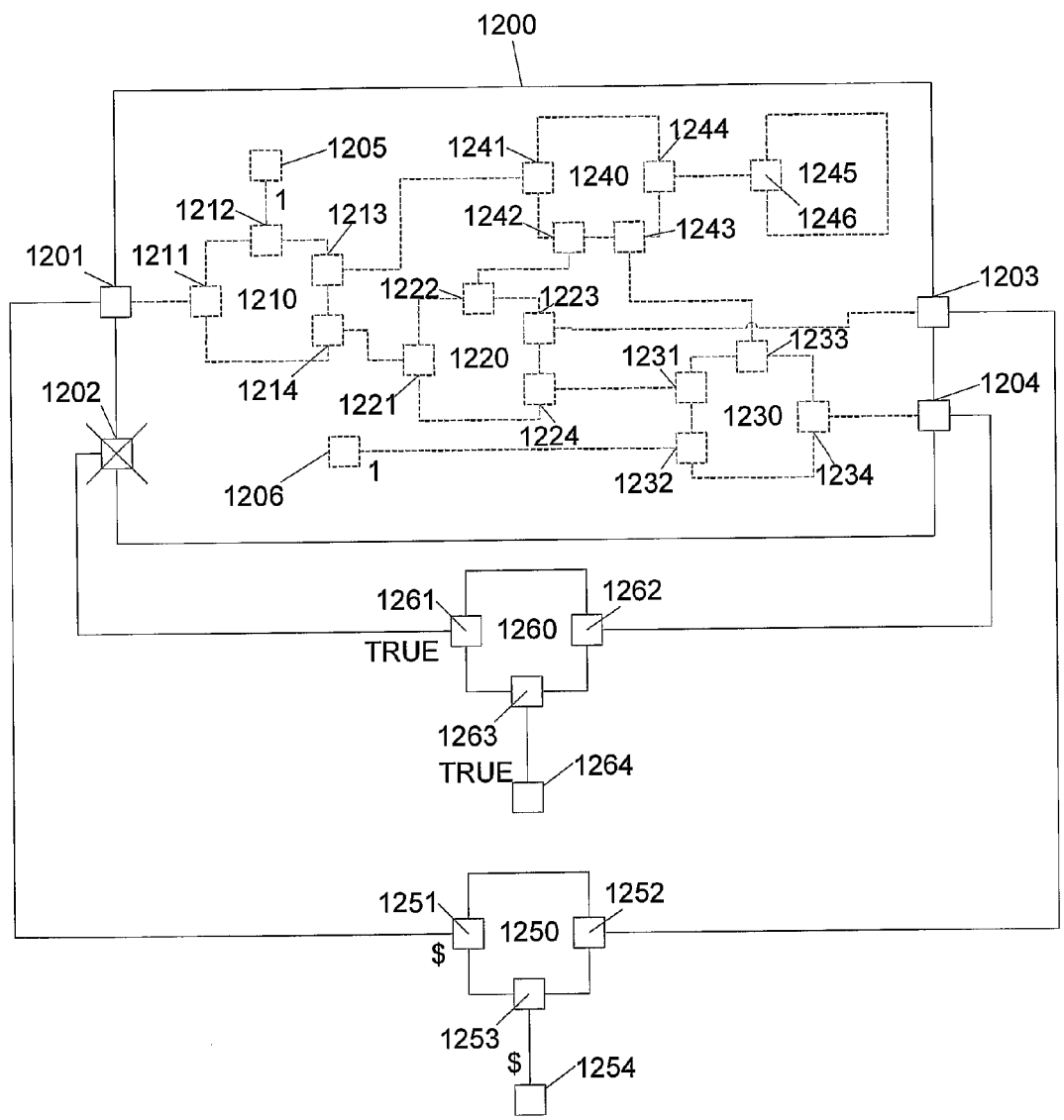
FIGS. 14A to 14C are schematic diagrams of a first specific example demonstrating termination, and multi-stage transactions.

FIG. 14A shows a multi-stage component 1200 having four agents 1201, 1202, 1203, 1204 as shown. In this instance the agent 1202 is a multi-stage selector agent.

When implemented, the component 1200 will include an internal schematic having five sub-components 1210, 1220, 1230, 1240, 1245 each including respective agents 1211, 1212, 1213, 1214; 1221, 1222, 1223, 1224; 1231, 1232, 1233, 1234; 1241, 1242, 1243, 1244; 1246 which interconnect as shown. Initially the internal schematic is undetermined and this is therefore shown in dotted lines.

In addition to this, two external components 1250 and 1260 are provided. The components 1250, 1260 are memory components an example of which has been previously described. The components 1250, 1260 include respective agents 1251, 1252, 1253; 1261, 1262, 1263. The agents 1253, 1263 coupled to external agents 1254, 1264, which may be provided on other components, or the root server, and are required merely to supply values for initialising the respective memory components with a value.

An internal agent 1205 of the component 1200 is also provided in order to present a value, in this case "1", to the component 1210, via the agent 1212.

An internal agent 1206 of the component 1200 is also provided in order to present a value, in this case "1", to the component 1230, via the agent 1232.

In this example, the operations are performed on a string, with the component functionality being as follows:

Component 1210—subtract value from string
Component 1220—duplicate received string
Component 1230—compare string to value
Component 1240—logical AND
Component 1245—termination component
Component 1250—memory component
Component 1260—memory component In particular, as shown in FIG. 14A the component 1200 receives a string $ from the agent 1254 via the memory component 1250. Similarly, the agent 1202 receives a true value from the agent 1264 via the memory component 1260.

Figure 14B:
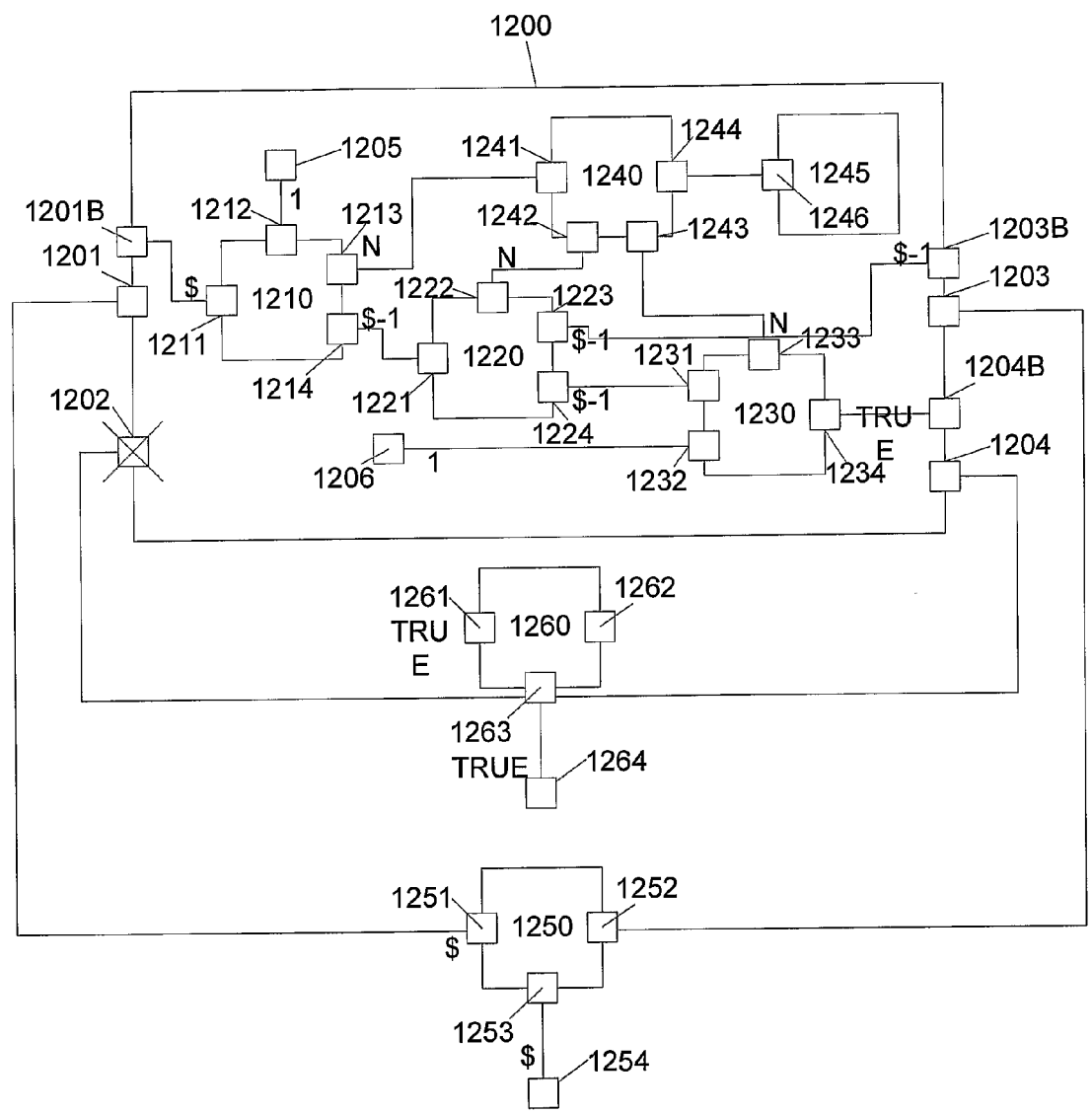
Figure 14C:
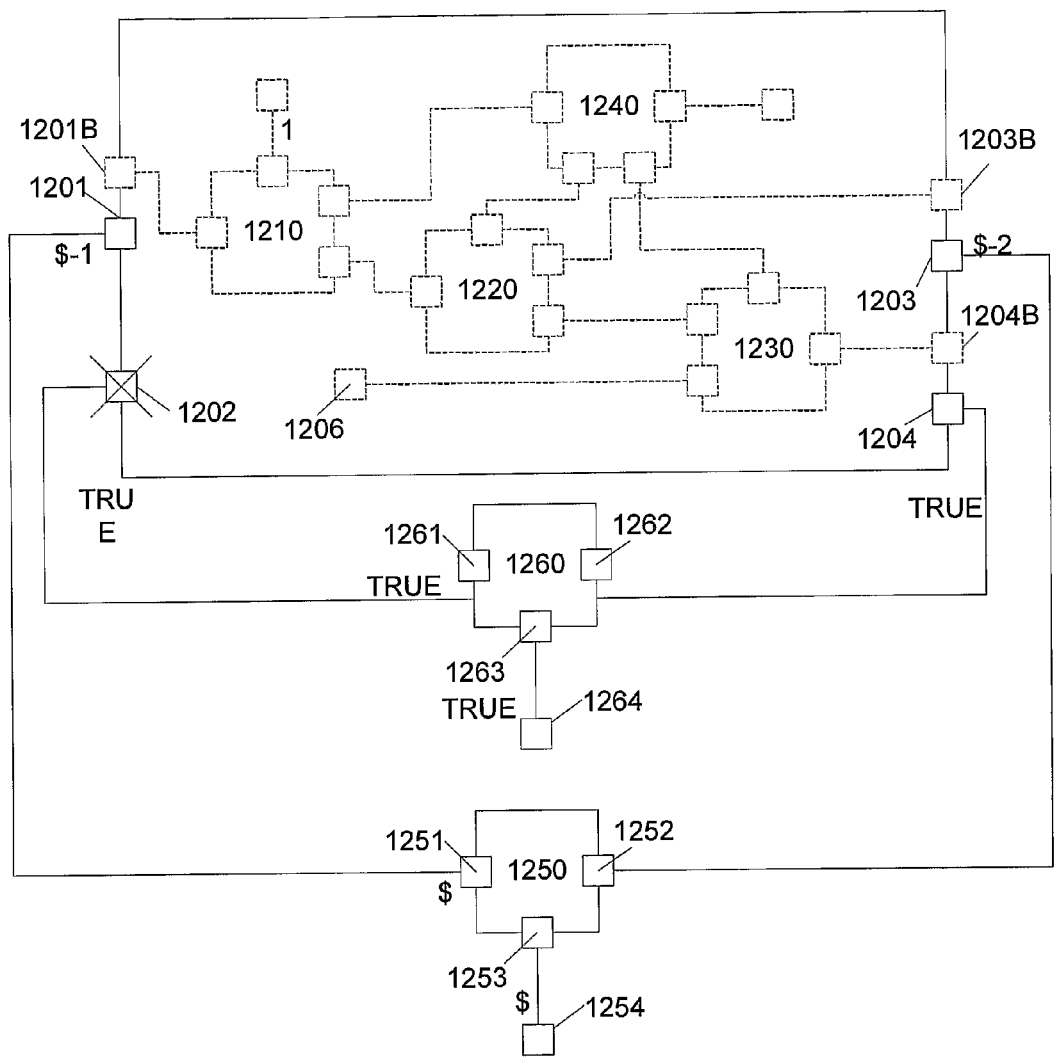

The selector agent 1202, will trigger the generation of the internal schematic shown in FIG. 14B in accordance with the received true value. The agents 1201, 1203, 1204 will operate to generate temporary single stage transaction agents 1201B, 1202B, 1203B, 1204B as shown. In particular, these agents are coupled respectively to the agents 1211, 1223, 1234, with 1202B remaining unconnected in this example.

The value $ is provided to the component 1210 which acts to subtract the value provided by the agent 1205 to thereby present the value $-1 at the agent 1214. Once sure the transmission is completed, which is determined by receiving an acknowledgement message from the component 1220, confirming receipt of the value $-1, the component 1210 generates a notify which is transferred to the logical AND component 1240. The component 1220 operates to receive the output from the component 1210 and duplicate this providing the string $-1 at the agents 1223 and 1224. Once these values have been successfully received by the agents (1252 via) 1203B, (1220B), 1231, as indicated in respective acknowledgement messages, the duplicate component 1220 then transfers a notify message to the AND component 1240.

The component 1230 operates to compare the value of the received input $-1 to a predetermined threshold, which in this case is the value "1" received via the agent 1232, from the internal agent 1206.

In this case, the component 1230 is therefore a "greater than or equal to" component, such that if the value $-1 is greater or equal to the value received at the agent 1232, which in this case is the value "1", then the component 1230 will generate a "TRUE" output at the agent 1234. Otherwise a "FALSE" value is generated.

In this case, assuming that the comparison is successful the TRUE value is output via the agent 1234 as shown. The TRUE value is then provided to the agent 1262, via the agent 1204B, 1204 with the comparison component 1230 transferring a notify to the AND component 1240, once it is confirmed that the TRUE value has been received via by the agent 1262.

Once the AND component 1240 has received a notify from each of the components 1210, 1220, 1230, the AND component will generate a message which is transferred to the termination component 1245. This may be in the form of a notify message, or any other message. In any event, the message causes the terminate component 1245 to terminate the internal schematic, thereby causing the components 1210, 1220, 1230, 1240, 1245 and the agents 1201B, 1202B, 1203B, 1204B, to terminate. This is achieved by transferring a termination order to the component server implementing the respective component instances.

The memory components 1250, 1260 will store the values $-1 and TRUE, and transfer these to the agents 1201, 1202 once the internal schematic is fully terminated, and the agents 1201, 1202 are unblocked. This process will be repeated until such time as the input provided to the component 1230 is lower than the threshold value. At this point, the component 1230 is adapted to generate a FALSE output via the agent 1234. The FALSE output will be returned via the agent 1204 to the input selector agent 1202, via the memory component 1260.

In one example, the selector agent 1202 is adapted to respond to the FALSE value to select an alternative internal schematic for construction. This will typically therefore be used to provide an output indication that the loop has ended successfully. This can therefore be used to trigger subsequent actions by the component 1200, or other components, as will be appreciated by persons skilled in the art.

In any event, it will be appreciated from the above that the component 1200 provides basic countdown functionality.

Second Specific Example

A specific example of a schematic incorporating the functionality described above will now be discussed in more detail.

Figure 15A:
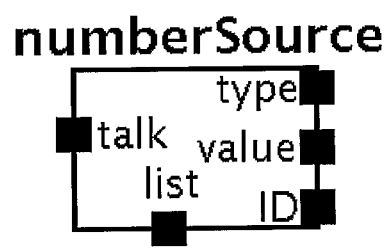
FIGS. 15A to 15D are schematic diagrams of a number source and number sink components.
Figure 15C:
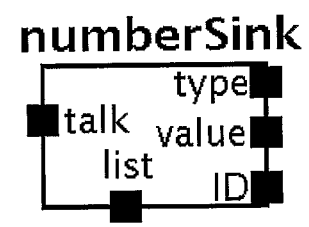

In particular, FIG. 15A shows a number source component having talk, list, type, value and ID agents. In use, the number source is adapted to communicate with the number sink shown in FIG. 15C, which also includes respective talk, list, type, value and ID agents.

In use, the number sink and source components are adapted to communicate via the talk agent, which represents the only means of communication between the two components. The talk agent operates to transfer a talk bundle, representing a number of bundled agents, thereby allowing the sink and source components to determine a common number transport format, which will allow the source component and sink component to design code respectively that ensure compatibility when information is transferred between the. For example if the parties agree to transport the number in a register, number source will ensure it is placed in the agreed register, while number sink knows to retrieve the value from the agreed register.

In this case, the sink and source components are adapted to perform the negotiation in accordance with a determined context, which in this case is based on the respective ID values supplied to the sink and source components via the respective ID agents. This can be used the to determine if the sink and source components are to deliver code that will be adjacent to each other in the hierarchy as the location is indicated by the ID value which is assigned during commencement of the build process.

Figure 15B:
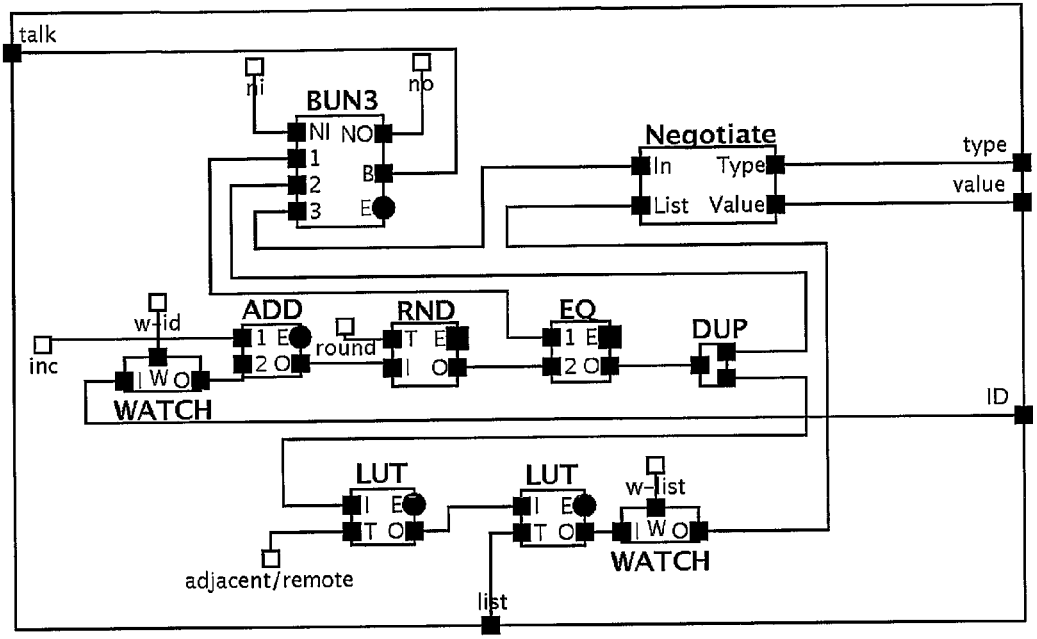
Figure 15D:
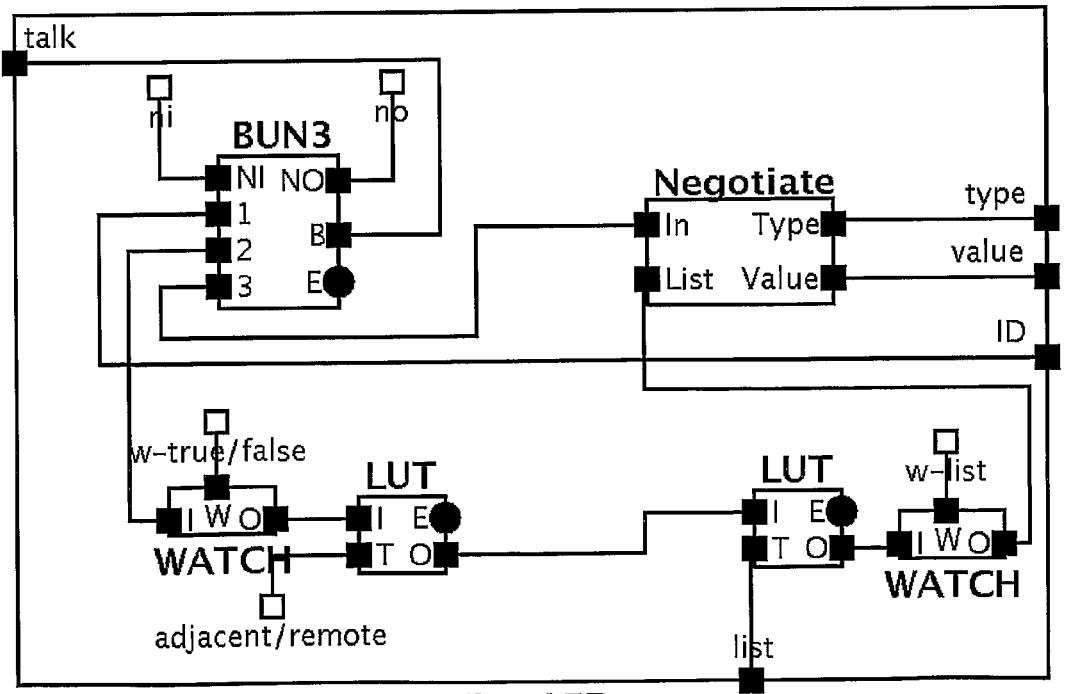

The manner in which this is achieved will now be described with respect to the internal schematics of the source and sink components shown in more detail in FIGS. 15B and 15D respectively.

In particular, the internal schematic of the components utilise the following sub-components:

Negotiate component—as previously described this provides negotiation services;

LUT—this utilises four agents including an input agent I a table agent T, and output agent O and optionally an error agent E which indicates an error. In use, an input received via the agent I is used to access a look up table via the table agent T with an indication of an output being provided via the output agent O;

Watch—the watch component, which has been previously described, can snoop traffic to provide a watch facility for diagnostic purposes;

Bun 3—the Bun 3 is a bundle component described in the co-pending application set out in PCT/AU03/01474, which operates to receive a bundle of agent messages via the agent B and provide separate messages via the agents 1, 2 and 3 formed from parts of the bundle;

ADD—mathematical add;

RND—mathematical round;

EQ—mathematical equals;

DUP—duplication.

Operation of the number source and sink components will now be described.

In use, the sink and source components will establish communication by exchanging talk bundles via the talk agents. The bundle components Bun3 will determined hand-off can be performed as follows.

The agents 1 hand-off so that ID agent of the sink component is connected to the agent 1 of the EQ component in the source component.

The agents 2 hand-off so that output of the DUP component in the source component is connected to the agent I of the watch component in the sink component.

The agents 3 hand-off so that In agents of each negotiation component are interconnected.

As a result, when ID values are received via the respective ID agents. The source ID value will be increased in value by 1 using the ADD component, rounded off by the RND component, and then compared to the sink ID value in the EQ component. In this case, if the assigned ID values differ by only one, then this indicates that the sink and source agents are adjacent to each other in the construction hierarchy.

The results of this comparison are duplicated by the DUP component and transferred to the first LUT in each of the sink and source components as shown, such that each LUT component will then access a LUT via the table agent, which will provide a value indicative of the relative positions in the schematic. This is then transferred to the second LUT, which obtains a negotiation list from the external list agent in accordance with this value. Accordingly, the selected list will depend on whether or not the sink and source components are adjacent.

The negotiate components then exchange list and negotiate as described above to determine a common negotiation option. The results of the negotiation are provided via the type agents, with hand-off being subsequently performed to allow the value agents of the sink and source components to be interconnected. A value received by the value agent of the source component, can then be supplied to another component via the value agent of the sink component.

An example of the use of the number sink and source components will now be described with reference to FIGS. 16A to 16E. This example uses the following additional components:

Build ASM—this is a component that assists in communications to the build system by allowing easy access for code delivery via the Code agent and processor and state information via the State In and State Out agents. The build ASM also provides an indication of the position in the build system via the ID agent.

Header—this component appends a header to code received via the build agent, allowing functioning code to be output via the Code Out agent.

Bcat—this component splits the complex build agent such that the output from many code producing components can be concatenated within the build system.

Figure 16A:
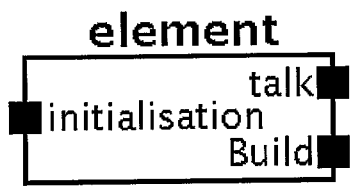
FIGS. 16A to 16E are schematic diagrams of a second specific example demonstrating negotiation and context dependency.

FIG. 16A shows an element component having respective initialisation, talk and build agents. In use, the element component is adapted to reserve some memory, and receive an initialisation value for the reserved location via the initialisation agent. To achieve this, the element component negotiates a position via the talk agent, to allow the memory value to be used by subsequent components, and generate a code portion based on the results of the negotiation. The internal schematic of the element component is shown in FIG. 16B.

Figure 16C:
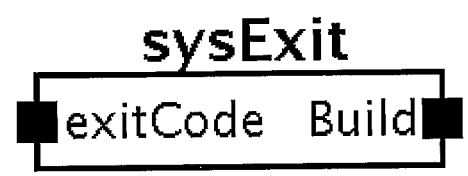
Figure 16B:
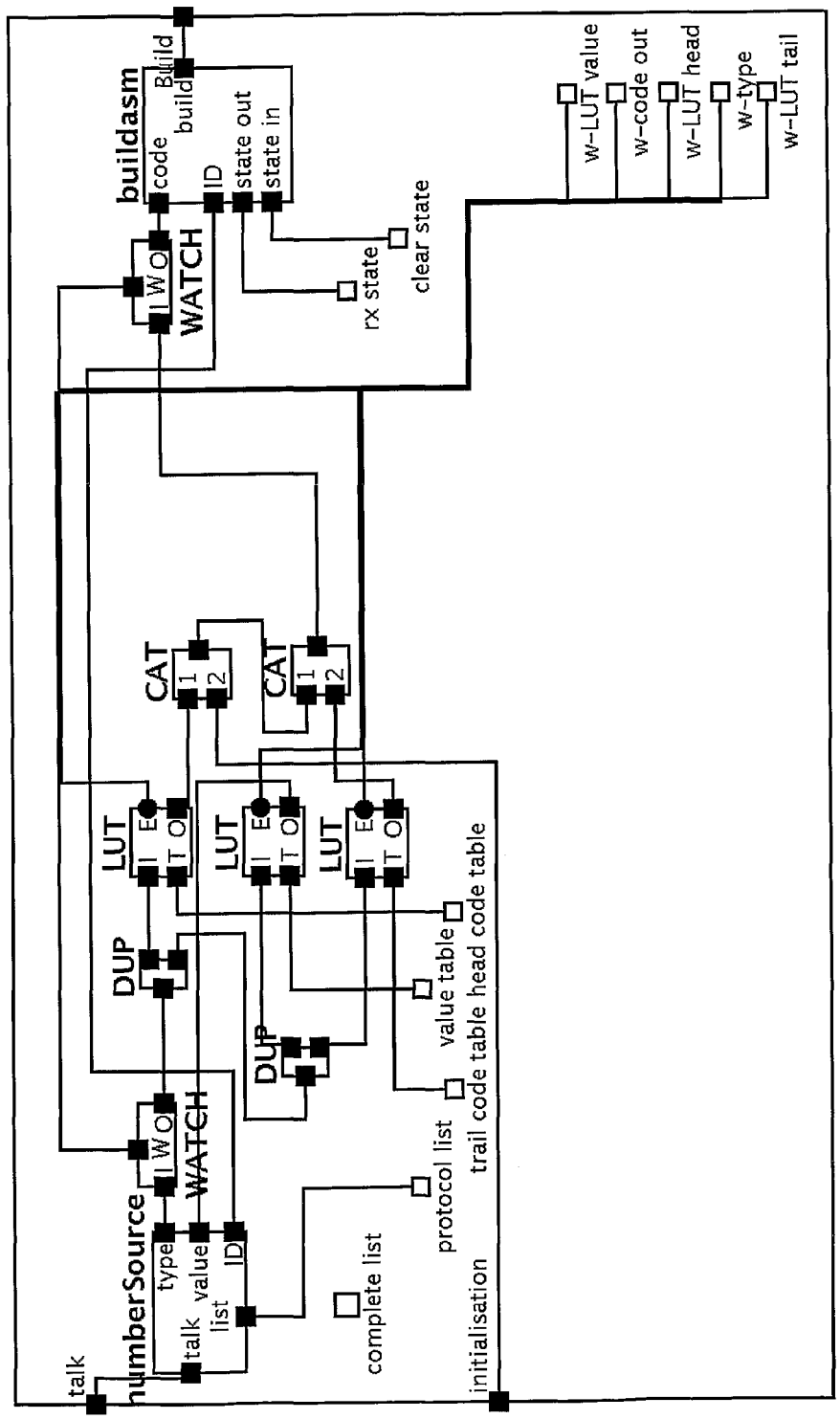
Figure 16D:
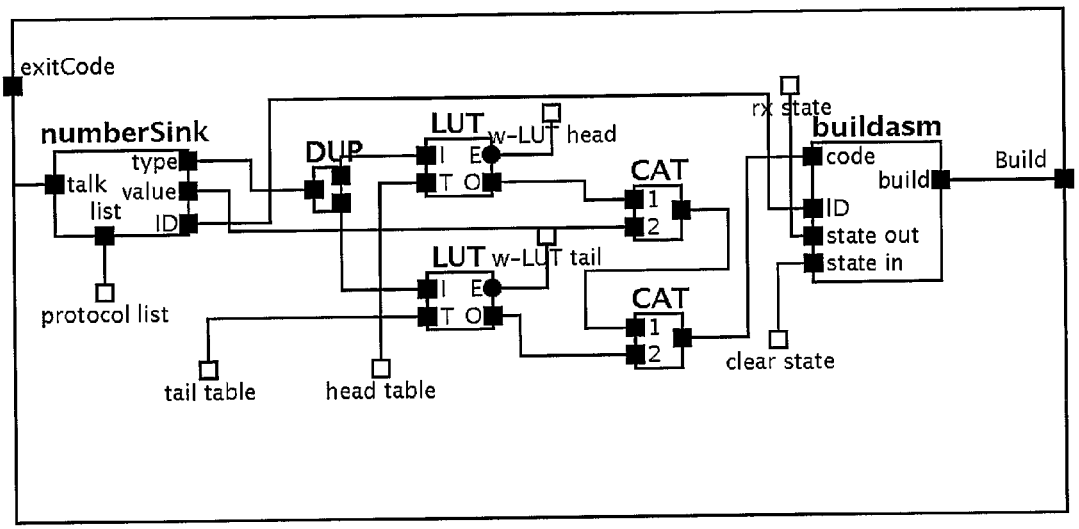

FIG. 16C shows a sysexit component having respective exitcode and build agents. In use, the sysexit component is adapted to negotiate via the exitcode agent, and generate code which causes an operating system to terminate the application with the specified exit code. The internal schematic of the sysexit component is shown in FIG. 16D.

Figure 16E:
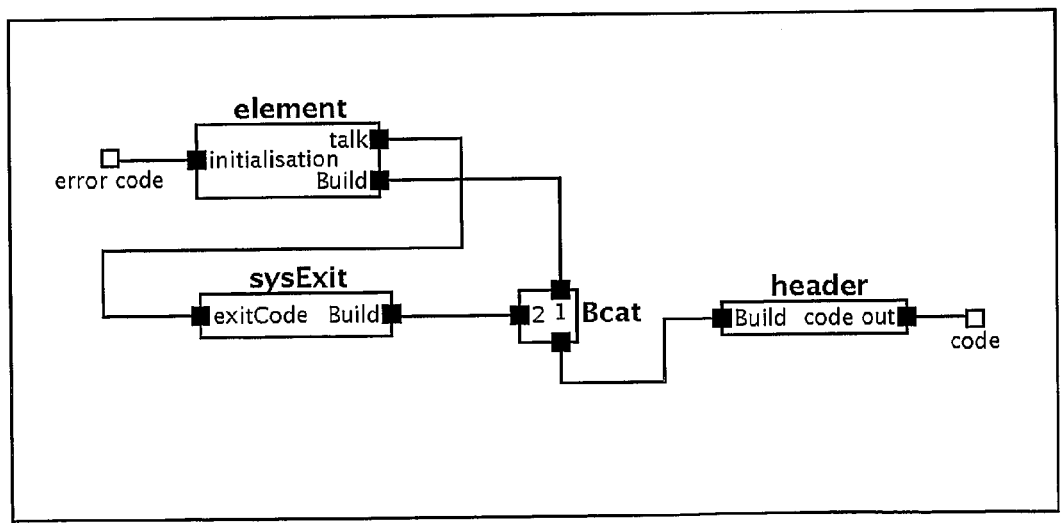

The element and sysexit components are combined as shown in the schematic in FIG. 16E, to allow the schematic to generate executable code in response to the indication of an error code value by the error code agent shown. This executable code will cause an operating system to terminate the program with an error based on the error code value received via the initialisation agent.

In use, the schematic is constructed, with component instances corresponding to the components element, sysexit, Bcat and header, and the associated sub components being implemented by respective servers. The agents of the components then establish communication, with the procedure being as follows.

1) A build bundle is created by the header component, from which will be extracted the code for delivery via the internal agent code;
2) The build bundle is propagated via the Bcat bundle to the build agents of the element and sysexit components;
3) The build bundle is used by the respective build ASM components, which extract the ID value and transfer this to the source and sink components respectively;
4) The sink and source components operate as described above to determine if they are adjacent in the schematic;
5) In the element component:
 (a) the determined negotiation option is duplicated twice by the DUP components and transferred to the three LUT components;
 (b) the LUT components access respective tail code, value code and head code tables, and output the head and tail code to the CAT components, and the value code to the number source;
 (c) the number source optionally provides the value code to the number sink in the sysexit component;
 (d) the CAT components prepend and append the head code and tail code to form the code solution that will reserve some memory, initialise it, and deliver a copy as agreed during negotiation, and provide the solution to the code agent of the build ASM component;
 (e) the build ASM component incorporates the resulting code into the build bundle which is transferred to the Bcat component;
6) In the sysexit component:
 (a) the determined negotiation option is duplicated by the DUP component and transferred to the two LUT components;
 (b) the LUT components access respective tail code, and head code tables, and generate corresponding outputs which are transferred to the CAT components;
 (c) the CAT components prepend and append the head code and tail code to the agreement received from the number source in the element component to construct the code solution and provide the solution to the code agent of the build ASM component;
 (d) the build ASM component incorporates the resulting code into the build bundle which is transferred to the Bcat component;
7) The Bcat component concatenates the code from the element and sysexit components and transfers the result to the header component; and,
8) The header component generates a header, and provides the output code.

Thus, in one example, the schematic shown in FIG. 16E creates executable code that primarily makes a trap call to the operating system to terminate the program. Such a program is of little use in practice but for the purpose of this example serves to highlight the role of negotiation in the code design.

The Sysexit component must design code that, when run, places two parameters in processor registers eax and ebx respectively and further design code to trap to the operating system. Designing this code is largely straight forward however the second parameter destined for ebx is the subject of negotiation with another party, which in this case is the component Element.

The Element component, via the agent talk and the Systexit component via the agent exitCode must negotiate how this second parameter is to transported so that the Element and Sysexit components can design the appropriate code. The Element component must design code to reserve memory, initialise this memory and deliver the parameter. The Sysexit component on the other hand must design code to receive the parameter and place it into the appropriate register so that the trap call to the operating system is successful.

It will be appreciated that if the Element and Sysexit components are positioned next to each other in the schematic then processor registers are permitted to be used as transport. The best option from the point of view of Sysexit is to utilise ebx for the purposes of transport since this removes the need to design code that will move the parameter into ebx which is the requirement of the trap call to the operating system. Thus Sysexit would place a priority on trying to secure register transport in ebx as the outcome of any negotiations with the Element component.

Thus the sysexit schematic will typically reflect that the preferred negotiation option is for the second memory location.

However, in the event that the components are not adjacent to each other, then intermediate components may require use of second memory register. In this case, this would not therefore represent a suitable outcome of the negotiation to simply place the value in the second register as it may be changed by code generated by other components.

An example of generated code will now be described.

For ease of explanation, this will be described with respect to the generation of assembler code, although it will be appreciated that any code including machine code could be used. Furthermore, in this example, the code is adapted to be used on a Linux based system which therefore requires the placing of the value "1" in the memory register eax, and an interrupt value 0x80, to cause a system exit. In this example, the code is designed to cause a process to exit with an error code "42". Accordingly, in this case, the value "42" is provided via the error code agent at commencement of the build process. In the event that the element and sysexit components are adjacent, and negotiation has determined ecx as the transport register, then the element component will write the value "42" to ecx. In this case, the element component generates the code portion:

```
SECTION  .data
datum dd  42
SECTION .text
    mov  ecx,[datum]
```

The sysexit component determines the value ecx during the negotiation process, and therefore generates the following code portion, which transfers the value in register ecx to ebx, before generating the required exit commands:

```
mov  ebx,ecx
mov  eax,1
int  0x80
; end of sys_exit
```

These code portions are concatenated with a header to provide the code:

```
BITS 32
GLOBAL _start
SECTION .text
_start:
SECTION  .data
datum dd  42
SECTION .text
    mov  ecx,[datum]
    mov  ebx,ecx
    mov  eax,1
    int  0x80
; end of sys_exit
```

In the event that the element and sysexit components are adjacent, a better solution would be for sysexit to favour ebx, such that the value datum is written directly into the memory location ebx by the code generated by the element component. Thus the coded portion generated by the element component is:

```
SECTION  .data
datum dd  42
SECTION .text
    mov  ebx,[datum]
```

The sysexit component then generates the code portion which simplifies to:

```
mov  eax,1
int  0x80
; end of sys_exit
```

These code portions are concatenated with a header to provide the code:

```
BITS 32
GLOBAL _start
SECTION .text
_start:
SECTION  .data
datum dd  42
SECTION .text
    mov  ebx,[datum]
    mov  eax,1
    int  0x80
; end of sys_exit
```

In order to achieve this, an example of the negotiation lists used by the sysexit component are shown below. In this example, the negotiation lists are provided in the form of an XML file, although this is not essential to the implementation and will not therefore be described in any detail. Furthermore, in these examples, only a limited number of negotiation options, corresponding to transfer of the error code as an unsigned 32 bit value, and limited to provision of the value in a register is shown.

In particular, if the sysexit component determines it is adjacent to the element component, the negotiation list selected is:

```
    <option>   <value>unsigned_32_actual_eax</value>
<weight>4</weight> <type>compound</type> </option>
    <option>   <value>unsigned_32_actual_ebx</value>
<weight>9</weight> <type>compound</type> </option>
    <option>   <value>unsigned_32_actual_ecx</value>
<weight>4</weight> <type>compound</type> </option>
    <option>   <value>unsigned_32_actual_edx</value>
<weight>4</weight> <type>compound</type> </option>
    <option>   <value>unsigned_32_actual_edi</value>
<weight>4</weight> <type>compound</type> </option>
    <option>   <value>unsigned_32_actual_esi</value>
<weight>4</weight> <type>compound</type> </option>
    <option>   <value>unsigned_32_actual_ebp</value>
<weight>4</weight> <type>compound</type> </option>
    <option>   <value>unsigned_32_actual_mem</value>
<weight>3</weight> <type>compound</type> </option>
    <option>   <value>unsigned_32_actual_stack</value>
<weight>3</weight> <type>compound</type> </option>
```

This therefore places a priority of provision of the value "42" in the register ebx, by assigning it the highest weighting "9". However, the weighting "9" is replaced by a weighting "4", then there is no preference for the register used, and accordingly, the register will be selected based on the preferred negotiation position of the element component, or will be determined using arbitrary rules, as previously described.

It will be appreciated that in the event that the components are not adjacent, then it would be typical to provide an alternative transport mechanism which does not rely on the use of registers, such as writing the value to a pre-agreed memory location, as will be understood by persons skilled in the art.

In any event, in the above example list, it will be appreciated that the register ebx is more likely to be selected than other registers, and this is the preferred option for the sysexit component, as less code is then required to implement the required functionality. The above example highlights how the resulting code that is generated depends on the outcome of the negotiation process, and that furthermore, the negotiation process depends on the context provided by the schematic. Accordingly, the resulting code is context dependent.

In the above example, the process of providing the value "42" in ebx actually results in shorter code than other options, and therefore represents context optimised code.

As a further option, in the event that the element and sysexit components are not adjacent, then a number of negotiation options are available all of which may be equally useable. In this case, by varying the option selected each time the process is performed, which may be achieved for example in accordance with a pseudo random number, hashing of the agent IDs, or the like, the code generated may also be varied each time a build is performed. This provides additional protection to the entities providing the respective components as it makes reverse engineering the functionality of the components more difficult, as described in the copending application.

The claims defining the invention are as follows:

1. A method of generating executable code for performing desired functionality, the method being performed using a processing system including at least a memory, stack and registers, the method including:
    a) defining a component combination based on the desired functionality, the component combination being indicative of:
    b) components to be implemented; and,
    c) connections between the components;
    d) causing components in the component combination to be implemented, wherein at least some of the components communicate using the connections and generate executable code fragments, at least two of the components communicating to determine a context, the determined context being dependent on one or more other components in the defined component combination, the determined context including an allocation of one or more registers for use by one or more of the executable code fragments at run-time, and one or more of the executable code fragments being generated at least partially based on the determined context to thereby allow the one or more executable code fragments to operate in accordance with the context at run-time, the determined context further including the state of at least one of the registers, stack and memory, and the determined context further including at least one of:
        i) agreements with the one or more other components in the defined component combination;
        ii) a result of negotiation with the one or more other components in the defined component combination; and,
        iii) random factors;
    e) combining the generated executable code fragments to thereby form the executable code, the executable code being formed by concatenating the executable code fragments in a manner defined by at least the determined context; and,
    f) providing the executable code to a processing system, such that execution of the executable code by the processing system causes the processing system to perform the desired functionality.

2. A method according to claim 1, wherein the executable code is used to implement a component.

3. A method according to claim 1, wherein the executable code is formed by concatenating the executable code fragments in a manner further defined by at least one of:
    a) the component combination;
    b) one or more agreements between components; and,
    c) one or more negotiation positions.

4. A method according to claim 1, wherein the executable code fragments are combined by at least one of:
    a) one or more of the components; and,
    b) a processing system.

5. A method according to claim 1, wherein the method includes causing the components to manipulate data portions provided in a data sequence, the data portions being fragments of executable code, and wherein the manipulations include:
    a) Adding data portions into the sequence at a predetermined location;
    b) Moving data portions from a first location to a second location within the sequence;
    c) Removing data portions from the sequence; and,
    d) Modifying data portions in the sequence.

6. A method according to claim 1, wherein the method includes causing the components to negotiate to determine their respective contexts.

7. A method according to claim 1, wherein the method includes making the executable code fragments context dependent by at least one of:
    a) dithering;
    b) meshing; and,
    c) obscuring.

8. A method according to claim 1, wherein the method includes, for at least one component, generating one or more agents for communicating with one or more agents of other components.

9. A method according to claim 8, wherein the agent communicates with the two or more other agents in a determined order.

10. A method according to claim 9, wherein the order is defined by at least one of:
    a) the component combination; and,
    b) one or more negotiation positions.

11. A method according to any one of the claim 1, wherein the method is performed using a processing system coupled to one or more component processing systems via a communications network, each component processing system being adapted to implement one or more respective components.

12. A method according to claim 11, wherein each component processing system implements a component server formed from executable code, and which causes the component processing system to perform at least one of:
    a) a predetermined data manipulation service; and,
    b) generation of a respective executable code fragment.

13. A method according to claim 11, wherein the method includes, in the processing system, and for each component in the component combination:
    a) receiving a component specification; and,
    b) generating, using the component specification, a component request, the component request being transferred to a component processing system, thereby causing the implementation of a component server corresponding to the component.

14. A method according to claim 13, wherein the method includes, causing each component processing system to:
    a) implement at least one agent; and,
    b) cause the at least one agent to communicate with one or more agent implemented by one or more other component processing systems.

15. A method according to claim 14, wherein the method includes providing connection data representing agent connections to the component processing systems, thereby allowing the at least one agent to communicate with the one or more other agents.

16. A method according to claim 14, wherein the connection data includes addresses for the one or more other agents, the addresses being indicative of an address to which an agent message can be transferred to thereby allow the agents to communicate.

17. A method according to claim 14, wherein the component request includes the connection data.

18. A method according to claim 11, wherein the method of determining the component combination includes, in the processing system:
   a) selecting components from a list of available components; and,
   b) defining connections between respective agents of the components.

19. A method according to claim 18, wherein the method includes causing the processing system to:
   a) generate a graphical representation of the one or more selected components; and,
   b) manipulate the graphical representation in response to input commands received from a user to thereby define the component combination.

20. A method according to claim 18, wherein the method includes:
   a) determining if a selected component has one or more options; and,
   b) in response to a successful determination:
      i) setting one or more of the options; and,
      ii) transferring an indication of each set option to the component processing system used in implementing the corresponding component.

21. A method according to claim 20, wherein the method includes:
   a) determining one or more options from a component specification;
   b) setting one or more of the options; and,
   c) determining an updated component specification based on the set options.

22. A method according to claim 18, wherein the method includes, causing a second processing system to:
   a) determine details of a number of components; and,
   b) provide the list of available components to the user via the first processing system, using the details.

23. A method according to claim 22, wherein the details include component specifications, including at least one of:
   a) an indication of a respective data manipulation service;
   b) a graphical representation of the component; and,
   c) an indication of any connections required with other components.

24. A method according to claim 22, wherein the method includes causing the second processing system to:
   a) determine performance information, the performance information being representative of one or more criteria regarding the implementation of the components;
   b) provide the performance information to a user, the user selecting the components in accordance with the performance information.

25. A method according to claim 24, the performance information including at least one of:
   a) An indication of the entity implementing the component;
   b) An indication of the geographical location of the entity;
   c) An indication of the duration for implementing the component;
   d) An indication of a cost associated with implementing the respective component; and,
   e) A rating, the rating being indicative of the success of the component.

26. A method according to any one of the claim 22, wherein the method includes generating revenue by charging a cost for the use of each component.

27. A method according to claim 26, wherein the method includes:
   a) providing at least some of the revenue to a respective entity implementing the component; and,
   b) having the operator of the second processing system retain at least some of the revenue.

28. A method of generating executable code for performing desired functionality by implementing a component combination, the component combination being based on the desired functionality, the method including, in a processing system including at least a memory, stack and registers:
   a) determining from the component combination;
      i) components to be implemented; and,
      ii) connections between respective ones of the components;
   b) for each component, generating a component request, requesting the implementation of the component, the component request including connection data representing any required connections;
   c) transferring the component requests to component processing systems thereby causing at least some of the component processing systems to communicate using the connections and generate executable code fragments, at least two of the component processing systems communicating to determine a context, the determined context being dependent on one or more other components in the defined component combination, the determined context including an allocation of one or more registers for use by one or more of the executable code fragments at run-time, and one or more of the executable code fragments being generated at least partially based on the determined context to thereby allow the one or more executable code fragments to operate in accordance with the context at run-time, the determined context further including the state of at least one of the registers, stack and memory, and the determined context further including at least one of:
      i) agreements with the one or more other components in the defined component combination;
      ii) a result of negotiation with the one or more other components in the defined component combination; and,
      iii) random factors;
   d) receiving the executable code fragments from the component processing systems; and,
   e) combining the executable code fragments to thereby form the executable code, the executable code being formed by concatenating the executable code fragments in a manner defined by at least the determined context.

29. A method according to claim 28, wherein the method includes receiving the fragments in a predetermined order.

30. A method according to claim 28, wherein the method of determining the component combination includes:
   a) selecting components from a list of available components; and,
   b) defining connections between respective agents of the components.

31. A method of generating executable code for implementing a component server for providing a data manipulation service, the method being performed using a processing system including at least a memory, stack and registers, the method including:
a) determining a component combination, the component combination including at least two component sequences, each component sequence representing a respective manner of providing the data manipulation service, the component combination being indicative of:
i) components to be implemented; and,
ii) connections between the components;
b) causing components in the component combination to be implemented, wherein at least some of the components communicate using the connections and generate executable code fragments including at least one executable code fragment corresponding to each component sequence, at least two of the components communicating to determine a context, the determined context being dependent on one or more other components in the defined component combination, the determined context including an allocation of one or more registers for use by one or more of the executable code fragments at run-time, and one or more of the executable code fragments being generated at least partially based on the determined context to thereby allow the one or more executable code fragments to operate in accordance with the context at run-time, the determined context further including the state of at least one of the registers, stack and memory, and the determined context further including at least one of:
i) agreements with the one or more other components in the defined component combination;
ii) a result of negotiation with the one or more other components in the defined component combination; and,
iii) random factors;
c) combining the generated executable code fragments to thereby generate executable code, the executable code being formed by concatenating the executable code fragments in a manner defined by at least the determined context; and,
d) providing the executable code to a processing system, such that execution of the executable code by the processing system causes the processing system to implement the component server by executing at least one of the generated executable code fragments corresponding to each component sequence, to thereby provide the data manipulation in the respective manner.

32. A method according to claim 31, wherein the executable code includes a mechanism for selecting which executable code fragment is executed.

33. A method according to claim 32, wherein the component combination includes a selection component sequence which when implemented causes the generation of a selection executable code fragment, and wherein when the component server is implemented, the selection executable code fragment selects one of the executable code fragments for execution.

34. A method according to claim 32, wherein the executable code fragment selection is context dependent.

35. A method according to claim 34, wherein the context reflects the context in which the data manipulation is to be performed.

36. A method according to any one of the claim 32, wherein the executable code fragment selection is achieved dependent on the result of negotiation between the component server and one or more other component servers.

37. A method according to any one of the claim 32, wherein the executable code fragment selection corresponds to an option associated with the manner in which the data manipulation service is to be provided.

38. A method according to claim 37, wherein the option is selected by an entity requesting implementation of the component server.

39. A method according to claim 31, wherein the component server is used to implement a resulting component which is used as part of a resulting component combination.

40. A method according to claim 39, wherein the resulting component includes one or more associated options definable by an entity implementing the resulting component combination, and wherein the options are used to select which executable code fragment is executed.

41. A method according to claim 31, wherein the data manipulation service includes the generation of a resulting executable code fragment, and wherein the resulting executable code fragment is dependent on the executable code fragment which is executed.

42. A method of generating executable code for implementing a component server by implementing a component combination, the component combination being based on desired data manipulation service, and including at least two component sequences, each component sequence representing a respective manner of providing the data manipulation service, the method including, in a processing system including at least a memory, stack and registers:
a) determining from the component combination;
i) components to be implemented; and,
ii) connections between respective ones of the components;
b) for each component, generating a component request, requesting the implementation of the component, the component request including connection data representing any required connections;
c) transferring the component requests to component processing systems thereby causing at least some of the component processing systems to communicate using the connections and generate at least one executable code fragment corresponding to each component sequence, at least two of the component processing systems communicating to determine a context, the determined context being dependent on one or more other components in the defined component combination, the determined context including an allocation of one or more registers for use by one or more of the executable code fragments at run-time, and one or more of the executable code fragments being generated at least partially based on the determined context to thereby allow the one or more executable code fragments to operate in accordance with the context at run-time, the determined context further including the state of at least one of the registers, stack and memory, and the determined context further including at least one of:
i) agreements with the one or more other components in the defined component combination;
ii) a result of negotiation with the one or more other components in the defined component combination; and,
iii) random factors;
d) receiving the executable code fragments from the component processing systems; and,
e) combining the executable code fragments to thereby form the executable code, the executable code being formed by concatenating the executable code fragments in a manner defined by at least the determined context, the executable code, when executed by a suitable processing system, causing the processing system to implement a component server, the component server executing at least one of the generated executable code fragments to thereby provide the data manipulation service.

43. A method of generating executable code for performing desired functionality, the method being performed using a processing system including at least a memory, stack and registers, the method including:
- a) defining a component combination based on the desired functionality, the component combination being indicative of:
  - i) components to be implemented; and,
  - ii) connections between the components;
- b) in a build process:
  - i) causing components in the component combination to be implemented, wherein at least some of the components communicate using the connections and generate executable code fragments, at least two of the components communicating to determine a context, the determined context being dependent on one or more other components in the defined component combination, the determined context including an allocation of one or more registers for use by one or more of the executable code fragments at run-time, and one or more of the executable code fragments being generated at least partially based on the determined context to thereby allow the one or more executable code fragments to operate in accordance with the context at run-time, the determined context further including the state of at least one of the registers, stack and memory, and the determined context further including at least one of:
    - (1) agreements with the one or more other components in the defined component combination;
    - (2) a result of negotiation with the one or more other components in the defined component combination; and,
    - (3) random factors; and,
  - ii) combining the generated executable code fragments to thereby form the executable code, the executable code being formed by concatenating the executable code fragments in a manner defined by at least the determined context; and,
- c) following the build process, providing the executable code to a processing system, such that execution of the executable code by the processing system causes the processing system to perform the desired functionality, wherein the components are only used in the build process.

44. A method of generating executable code for performing desired functionality, the method being performed using a processing system including at least a memory, stack and registers, the method including:
- a) defining a component combination based on the desired functionality the component combination being indicative of:
  - i) components to be implemented; and,
  - ii) connections between the components;
- b) causing components in the component combination to be implemented, wherein at least some of the components communicate using the connections and generate executable code fragments, at least two of the components communicating to determine a context, the determined context being dependent on one or more other components in the defined component combination, the determined context including an allocation of one or more registers for use by one or more of the executable code fragments at run-time, and one or more of the executable code fragments being generated at least partially based on the determined context to thereby allow the one or more executable code fragments to operate in accordance with the context at run-time, the determined context further including the state of at least one of the registers, stack and memory, and the determined context further including at least one of:
  - i) agreements with the one or more other components in the defined component combination;
  - ii) a result of negotiation with the one or more other components in the defined component combination; and,
  - iii) random factors;
- c) combining the generated executable code fragments to thereby form the executable code; and, the executable code being formed by concatenating the executable code fragments in a manner defined by at least the determined context; and,
- d) providing the executable code to a processing system, such that execution of the executable code by the processing system in the absence of the components causes the processing system to perform the desired functionality.

* * * * *